US009626713B2

(12) United States Patent
Natarajan

(10) Patent No.: US 9,626,713 B2
(45) Date of Patent: Apr. 18, 2017

(54) METHOD FOR RAPID DEVELOPMENT OF SCHEDULE CONTROLED NETWORKABLE MERCHANT ECOMMERCE SITES

(71) Applicant: Sundaram Natarajan, Fremont, CA (US)

(72) Inventor: Sundaram Natarajan, Fremont, CA (US)

( * ) Notice: Subject to any disclaimer, the term of this patent is extended or adjusted under 35 U.S.C. 154(b) by 502 days.

(21) Appl. No.: 14/231,025

(22) Filed: Mar. 31, 2014

(65) Prior Publication Data

US 2014/0297437 A1    Oct. 2, 2014

Related U.S. Application Data

(60) Provisional application No. 61/807,214, filed on Apr. 1, 2013.

(51) Int. Cl.
*G06Q 30/06* (2012.01)
*G06Q 30/02* (2012.01)

(52) U.S. Cl.
CPC ..... *G06Q 30/0635* (2013.01); *G06Q 30/0264* (2013.01)

(58) Field of Classification Search
CPC .... G06Q 30/06; G06Q 30/02; G06Q 30/0631; G06Q 50/188; G06Q 30/0635
USPC ...... 705/21, 16, 26.7, 26.8, 14.71, 80; 726/1
See application file for complete search history.

(56) References Cited

U.S. PATENT DOCUMENTS

| 2010/0251144 | A1* | 9/2010 | Shaty | G06F 21/50 715/760 |
| 2011/0243553 | A1* | 10/2011 | Russell | G06Q 30/0631 398/25 |
| 2011/0314371 | A1* | 12/2011 | Peterson | G06F 21/645 715/234 |
| 2013/0325636 | A1* | 12/2013 | Carter | G06Q 30/02 705/14.71 |

OTHER PUBLICATIONS

Natarajan, Sundar (as WebSlides), "FremontFlowers", Apple app released on iTunes by Inventor on Jan. 28, 2014, http://itunes.apple.com/us/app/fremontflowers/id689066844?mt=8.

(Continued)

*Primary Examiner* — Vanel Frenel
(74) *Attorney, Agent, or Firm* — Stephen E. Zweig

(57) ABSTRACT

An improved computerized ecommerce method, optimized for smaller merchants such as florists who often provide seasonal perishable gifts that require local delivery, and who often desire to form cooperative networks with local merchants offering related gift services, as well as other related merchants such as other florists in more distant locations. The web server based method allows merchants to easily set up non-static (time variable) websites that automatically provide schedule driven promotions. New products can be quickly uploaded from smartphones, and sophisticated time and location aware algorithms can compute accurate delivery costs and make such costs transparent to customers. Other participating merchants can be easily added to the system to form local and distant cooperative merchant networks. The system simplifies customer use of promotional offers by cross checking customer URL versus promotion lists. Recipient gift appreciation is optimized by providing interfaces to allow customer designed gift cards and messages.

20 Claims, 49 Drawing Sheets

(56) References Cited

OTHER PUBLICATIONS

Natarajan, Sundar (as WebSlides), "GotFlowers" Apple app released on iTunes by Inventor on May 7, 2013 https://itunes.apple.com/us/app/gotflowers/id634194338?mt=8.

* cited by examiner

Ecommerce customer (buyer) designing custom
gift card using their web browser or mobile app

METHOD FOR RAPID DEVELOPMENT OF SCHEDULE CONTROLED NETWORKABLE MERCHANT ECOMMERCE SITES

CROSS REFERENCE TO RELATED APPLICATIONS

This application claims the priority benefit of U.S. provisional application 61/807,214, "METHOD FOR RAPID DEVELOPMENT OF SCHEDULE CONTROLLED NETWORKABLE MERCHANT ECOMMERCE SITES", inventor Sundaram Natarajan, filed Apr. 1, 2013; the complete contents of which are incorporated herein by reference.

BACKGROUND OF THE INVENTION

Field of the Invention

This invention is in the field of internet web server facilitated ecommerce and mobile ecommerce apps for handheld computerized devices.

Description of the Related Art

As internet technology has advanced, more and more commerce is done using computerized devices that connect with various commerce computerized data servers, often web servers, over the internet. Such internet facilitated commerce services are generally referred to as ecommerce.

Although many large corporations, such as Amazon.com, eBay, and the like have transformed commerce through the use of large scale banks of servers, which offer a large range of online products, certain areas of commerce have not advanced as quickly. In particular, smaller scale local merchants such as florists, bakers, party supply vendors, and the like, who often may offer local delivery of various perishable products such as flowers and perishable foods, often for gift purposes, have been less well served.

As a result, often these various local merchants must expend a considerable amount of time, energy, and money creating and updating their own individual ecommerce websites. To assist in this process, certain prior art ecommerce software packages, such as the open source OsCommerce® system, and other systems such as Magento®, are available that provide a prefabricated software ecommerce framework for merchants to set up their own online ecommerce systems. However these prior art prefabricated ecommerce framework software systems still require a considerable amount of customization to optimize. Indeed they are often so complex that usually use of skilled programmers is required to produce good results.

An additional problem that various local merchants, in particular gift merchants such as florists, have is that there is often a need for merchants in one geographic area to cooperate with merchants from another geographic area. Such merchants may have loyal local customers that tend to assume that the merchant has an ability to extend its local services further than may actually be the case, and who turn to the local merchant for assistance for things such as delivering gifts to more distant locations.

Thus, for example, in many third party beneficiary contracts such as gifts, a customer/buyer may wish to work with a local florist to arrange for a more distant florist to deliver a gift of flowers to a third party beneficiary type recipient such as a relative, friend, or business associate.

In an effort to meet these consumer expectations, some local merchants such as florists sign up for relatively high overhead services, such as FTD florist, that allow the florists and their customers to access a central website, and contract with florists located closer to the recipient's location to deliver a standardized series of floral arrangements. However such services come at a cost. Because only a limited range of standardized floral arrangements are made available, it is all too often the case that the florists that happen to be located near the delivery area cannot or would prefer not to deliver the advertised floral arrangements. Further, the prior art delivery charge methods tended to hide the true costs of delivery from the customer, and also tended to impose unrealistic delivery cost expectations on the delivery florist. Thus further improvements in the area of ecommerce technology, in particular for local merchants such as florists that provide gift type perishable products that may also have to be delivered, would be desirable.

BRIEF SUMMARY OF THE INVENTION

The invention is based, in part, on the overall vision of delivering a highly automated, flexible, and easy to use ecommerce system, optimized for the needs of local merchants such as florists that often deliver perishable products (often gifts). The system is designed to be simple enough that even merchants who are relatively unskilled in computer technology can maintain their ecommerce systems with minimal amounts of time, effort, and money.

The invention may be particularly useful for the gift industry where the buyer and the recipient are two different entities and for situations where either same day delivery or scheduled delivery is desired. Some of the various aspects of the invention include:

Calendar or other schedule based automatic website updates: The invention is based, in part, on the insight that for many local merchants of perishable products, particularly when delivery is part of the purchase, and particularly when the products may be gifts, have a large fraction of their orders occur on a predictable schedule. In particular, a large percentage of purchases occur on a calendar type schedule based on important secular or religious holidays, such as Christmas, Hanukkah, New Years, Valentine's Day, Chinese New Year, Easter, and the like.

During these peak event times, it often is useful for the merchant to at least partially customize their website with various event specific banners and other graphics and text, as well as various products or services focused on these particular events. Thus florists, for example, may wish to promote corsages at graduation times, bouquets of roses at Valentine's Day, put up ecommerce website banners commemorating Easter, and so on.

Because these scheduled events can be predicted in advance, and have a known sequence and duration, in one embodiment, the invention provides a calendar based scheduling service, as well as various online artistic tools enabling the merchant to quickly customize their website with calendar controlled banners, and calendar controlled product offerings. This allows the merchant to set up a timed series of event specific banners and other event specific web features that automatically update the merchant's ecommerce website to reflect these events. Once set up, the merchant's ecommerce website can then remain automatically current throughout the year with a minimal need for further manual updating.

Sophisticated delivery cost estimation engine: The invention is also based, in part, on the insight that particularly with regards to local delivery; often the merchant's actual delivery costs are highly variable depending on day, time of day, and exact geographical locations of the merchant and the recipient. Prior art ecommerce services, particularly for small merchant mediated deliveries, failed to sufficiently keep track of such costs. This had unfortunate consequences for all parties concerned. For example, a florist that had to accept an order with an unrealistically low delivery cost would be tempted to recoup at least some of the extra delivery costs by substituting a cheaper product. Thus the buyer might order a fancy bouquet, but pay an unrealistically low delivery cost. The recipient might in turn receive a substandard bouquet. Despite all this, the merchant might still end up with an inadequate profit.

To help prevent situations such as this, the invention further provides a sophisticated delivery cost customization engine or set of algorithms that allows the merchant to precisely dial in more realistic time and location variable delivery costs, provide more realistic delivery cost calculations, and make these costs available to the purchaser (typically ecommerce purchaser). The net result is that the purchaser can make intelligent delivery decisions, and the delivery merchant is adequately compensated for the true costs of delivery. The delivery merchant thus has less incentive to compensate for unrealistic delivery costs by substituting lower quality products.

Addition of new products in minutes using smartphone apps: The invention is also based, in part, on the insight that many local merchants are creative and innovative individuals who often have both the desire and ability to come up with various creative variations on otherwise standard products. However due to the cumbersome nature of present day ecommerce systems, the burden on the local merchant to customize their website to adequately showcase these spontaneous creations tends to inhibit this creativity. Again using the floral industry as an example, a local florist may come up with a creative and cost effective new floral arrangement in a few minutes; but if it takes hours of work to then advertise the new floral arrangement on the florist's ecommerce website, then that creative new floral arrangement may never see the light of day.

In another embodiment, to address this problem, the invention utilizes modern smartphone or mobile computerized tablet technology to provide easy to use ecommerce website maintenance apps. These apps allow merchants to utilize the smartphone's camera to photograph or take short video clips of their creations, tap in a new product listing, and upload a new product to their ecommerce website in a few minutes or less.

Easy formation of ecommerce networks with other participating merchants: The invention is also based, in part, on the insight that local merchants often need to cooperate with other merchants. These other merchants can be other local merchants or artisans, or may be more distantly located merchants and artisans.

For example, a local florist and a local baker may find it advantageous to cross promote each other's products and services on each other's websites so that, for example, a purchaser who wishes to send a gift of flowers could also have a cake delivered at the same time, and vice versa. Additionally, again using the floral industry as an example, different florists in geographically different locations may wish to join forces to form their own network of connected floral services.

The invention's merchant networking capability allows merchants to spontaneously form various formal and informal networks. The invention's merchant networking capabilities can operate automatically and, apart from merchant sign up, can then require little or no additional human intervention or overhead. Alternatively an administrator can facilitate this process as desired.

As a result, due to fact that there are little or no middleman fees, the invention's merchant networks can operate with high efficiently. At the same time, by joining forces, an originating merchant, such as a florist, in one area of the country can send business to another recipient/delivery merchant (i.e. another florist) in another area of the country, and pocket a decent commission for this. However because there is otherwise no middleman to extract fees from the system, enough money remains that the distant delivery merchant can still provide a high quality requested product at a satisfactory profit margin as well.

In another embodiment, the invention also provides an easy to implement system and method to allow formation of such informal merchant networks. As a result, everyone, purchaser, first originating merchant, second recipient/delivery merchant, and the ultimate gift or product recipient is more likely to be satisfied due to the high efficiency and lack of middleman costs of the system.

No purchaser effort promotional code system: The invention is further based on the insight that prior art mechanisms of providing promotional codes for purchases were too cumbersome. According to prior art, if a company such as Intel received a group promotional code for a discount off of purchases (e.g. 10% off), the employees of the company would have to obtain the Intel promotional code and provide it to the merchant in order to receive discounts. However according to the invention's improved methods, the invention's ecommerce web server can optionally link these promotions directly with the originating ecommerce customer's URL or email address (here for example, web browser purchases originating from Intel, or Intel purchaser email addresses) from which the product purchase had originated. The system can then use the product purchase URL or email address to automatically assign promotional product price or shipping discounts, thus reducing purchaser effort.

Recipient delivery and gift customization: The invention is also based, in part, on the insight that although many such local merchant ecommerce based purchases will be for gifts for others, often such gifts need not be surprise gifts. When such gifts are not surprise gifts, it can often be further desirable to give the gift recipient at least some advance notice of the gift, as well as at least some ability to modify the time that the gift arrives, and even potentially modify the nature of the gift. Thus for example, a recipient of flowers can get an advance email or SMS notice of the gift, along with a link to the invention's ecommerce website, and may be able to redirect the time or day of arrival to a more appropriate time or day of arrival, thus ensuring that the flowers arrive when the recipient is not on vacation.

Alternatively a recipient of a gift for a first flavor or type of cake might modify the cake to a more preferred type or flavor. In another embodiment, the invention also provides for such an ability to notify the recipient electronically, and to allow at least partial modification of the gift by, for example, going to the local merchant's website and selecting various alternative delivery or gift type options.

Easy customer gift card customization: The invention is further based on the insight that at least with regards to gifts; often the gift recipient values the thought (i.e. affection, good intentions) behind the gift as much or more than the gift itself. However present industry practice of only providing entry of text into otherwise standardized gift card designs somewhat defeats this purpose. The invention further provides an easy to use user interface that allows the purchaser of the gift to custom design the art of the gift cards delivered with the gifts, as well. Thus, for example, gift cards can appear to be hand drawn with customer generated handwriting and customer generated or selected art or doodles, further providing evidence of the purchasers' thought behind the gift. These artistically customized gift cards can further enhance the mutual satisfaction of both the gift giver and recipient.

Thus in one embodiment, the system may be an ecommerce method and system, which can be optimized for smaller merchants such as florists who often engage in seasonal perishable gifts that require local delivery, and who often need to form cooperative networks with local merchants offering related gift services, as well as other related merchants such as other florists in more distant locations. The invention's web server based method allows merchants to easily set up non-static (time variable) ecommerce websites that automatically provide schedule driven promotions. New products can be easily entered into the website using smartphones to photograph and then upload along with product descriptions. More sophisticated time and location aware algorithms can more accurately compute accurate delivery costs, and can also make such costs transparent to customers, resulting in more intelligent purchases and increased satisfaction. Other participating merchants can be easily added to the system to form cooperative local and distant merchant networks. The system can further simplify administration of promotions by cross checking customer URL versus promotion lists. Additionally, recipient gift appreciation may be further optimized by providing interfaces to allow customer designed gift cards and messages with customer handwritten text and sketches.

Other features, such as the ability to operate multiple automatically customized cloned ecommerce websites (for higher sales and search engine customization), and automatic posting of product updates to online social networks, will also be described.

Although in some embodiments, the invention may be operated on a peer-to-peer basis, with data decentralized and exchanged among a number of cooperating merchant ecommerce servers, in a preferred embodiment, a single database may be used to drive at least the high level aspects of the system. Although this single database may also store and retrieve various types of data from a variety of merchant servers, at least on a temporary basis, in the single database embodiment, the single database will generally end up holding some or even all of the data needed to manage the system. This single database can also be used to create various merchant/administrator control panels, manage uploads and downloads from various smartphone apps, as well as to help implement various merchant point-of-sale systems.

BRIEF DESCRIPTION OF THE DRAWINGS

FIG. 11 shows how the system may store a variety of different merchant designed banners, and automatically switch to showing various banners on various days of the year. Here for example, the system shows a Valentine's Day banner on Valentine's Day, a Chinese New Year banner around the time of the Chinese New Year, and so on.

FIG. 15 shows how the merchant can use the system settings to specify the merchant's days and times of standard delivery service, as well as extended days and hours of delivery service for additional charges.

FIG. 16 shows how the merchant can also select countries or other geographical areas of service. Here, for example, a merchant located on the border between the US and Canada, and potentially serving both countries, can select a geographic zone (e.g. US/Canada) using a pull down menu.

DETAILED DESCRIPTION OF THE INVENTION

As previously discussed, the invention is designed to allow rapid setup and modification of ecommerce websites, particularly ecommerce websites optimized for the unique needs of local merchants who deliver perishable products and gifts, such as florists, bakers, and the like. The invention is designed so that it can be easily used by users with minimal computer and programming skills. The system is further designed so that merchants can maintain the system using only standard web browsers, and apps running on standard handheld internet connected computerized devices such as smartphones (e.g. the popular iPhone Android series phones), tablet computers, laptop computers, desktop computers, and the like.

Some of the novel aspects of the system, as previously discussed, include calendar based automatic website updates, a more sophisticated delivery cost estimation engine, an ability for merchants to add new products to their ecommerce sites, using simple to use smartphone apps, in only a few minutes, easy formation of ecommerce networks with other participating merchants, simplified, no customer effort, promotional code system, improved recipient delivery time and gift customization, easy customer gift card customization, and other improvements to be discussed. Additional aspects also include automated search engine optimization features, ability to automatically manage multiple merchant "echo" ecommerce websites, and ability to automatically push product updates to various social media sites.

Figure 1:
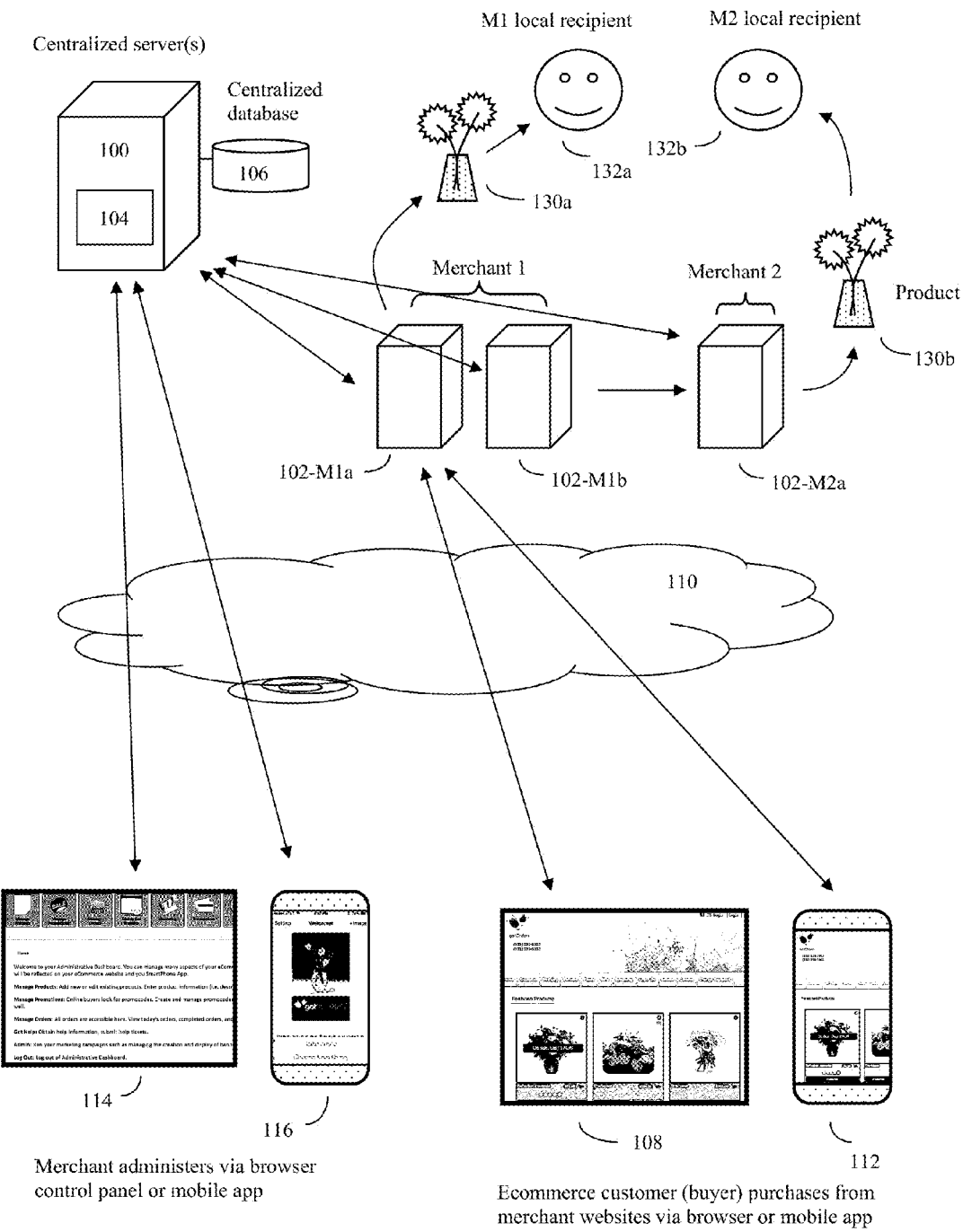
FIG. 1 shows an overview of the system. The main component of the system exists in the form of internet web server ecommerce software. Merchants, purchasers, and recipients can interact with the web server ecommerce software using standard web browsers or apps running on various computerized devices such as smartphones.

FIG. 1 shows an overview of the system. The invention can be considered to be, in part, as an improved computer implemented method of conducting ecommerce.

In some embodiments, the invention may be a method of managing at least one schedule driven dynamic layout ecommerce website for at least one merchant (usually a plurality of cooperating merchants). In a preferred embodiment, at least one processor (often located in centralized server 100) utilizing centralized database (106) and automated website creation software (104) (which will be described in more detail shortly) will manage at least the high level organization of the system. In particular, this centralized server (100) and centralized database (106) can be used to configure at least one (and usually multiple) schedule driven dynamic layout ecommerce websites. FIG. 1 shows these websites as being run on other servers (e.g. 102-M1a, 102-M1b, 102-M2a) that are different from the centralized server (100). However because servers can run multiple websites, and one machine can run multiple virtual machines, each running their own servers, this need not always be the case.

Figure 2A:
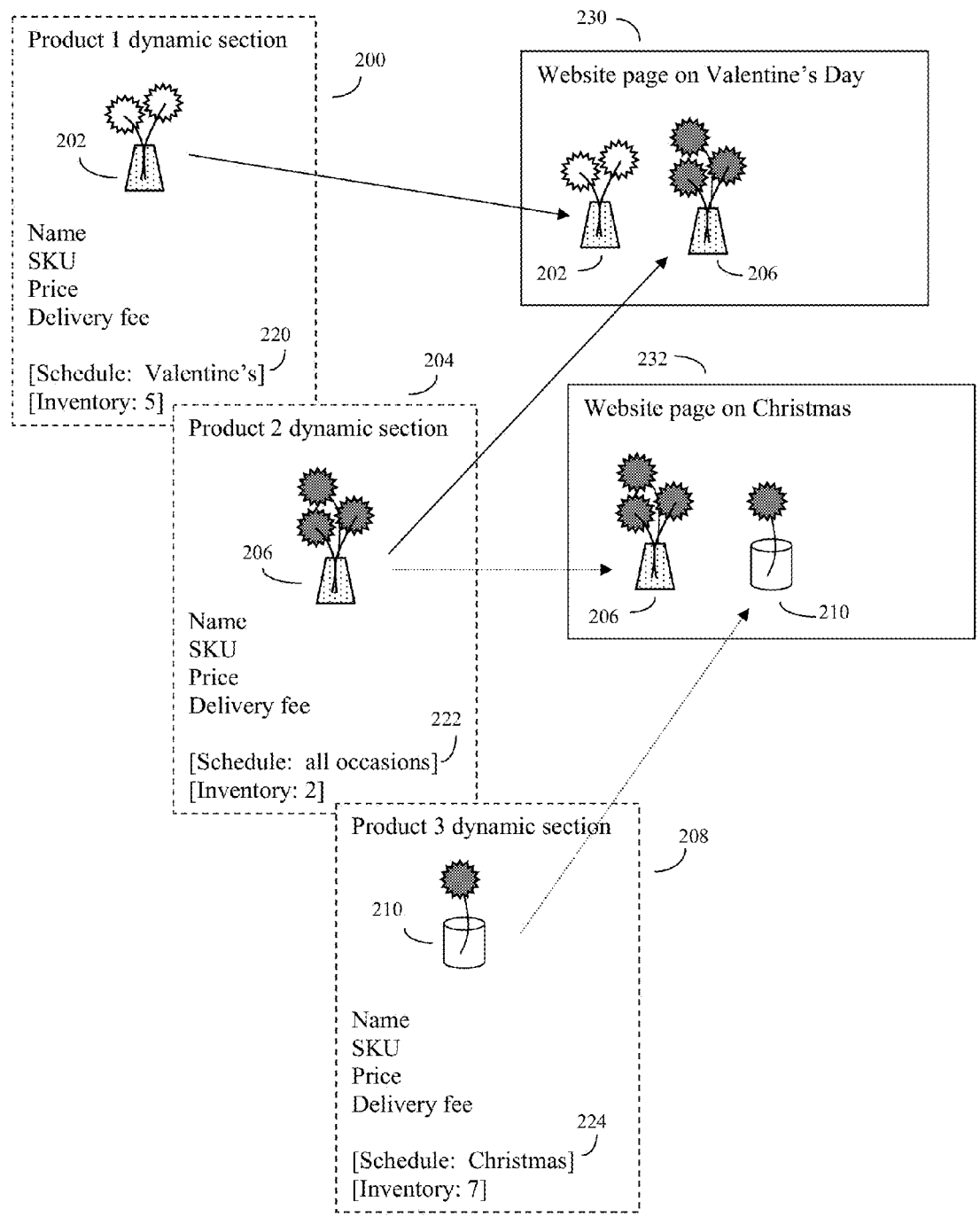
FIG. 2A shows an example of how the invention can assemble product data from various dynamic sections (from database memory) to construct different types of ecommerce webpages depending on the server's clock/calendar, and a previously stored calendar schedule of product availability.

In a preferred embodiment, these ecommerce websites will typically have at least some web pages composed or made up of various dynamic sections. These dynamic sections, which are shown in more detail in FIG. 2A, are generally associated with various corresponding products (e.g. FIG. 1: 130a, 130b) and product data. This will often be done on a one product per dynamic section basis. This product data may comprise information such as a description of the product (product description, which can include both text as well as images and video of the product), product price (which may vary according to a time schedule, inventory availability, merchant entered variables, promotions, and other parameters), one or more Stock Keeping Unit (SKU) identifier(s), product inventory information (e.g. how many in stock, or how many product components in stock), and product availability schedule (often a calendar schedule) showing days or times when the product is available. Additionally information as to which merchant has the product in stock, and location from which the product may be shipped, may also be included in the product data.

Other data, which may be stored in the form of product data, or in the data for the merchant associated with a given product, can again include the location where the product is shipped from (often the location where the merchant for that particular product is located). The other data may also include shipping information for that product shipping location. This can include shipping prices, as well as various delivery times and location constraints. Various shipping price modifiers (e.g. promotions, price varying as per delivery time, price varying as per shipping location, price varying according to various other merchant entered parameters) can also be included. Relative to FIG. 1, a specific example here would be the shipping price as determined by the time and address where the product (130a) should be delivered to the recipient (132a).

Note that this shipping information, and the computed shipping price, will often be quite sensitive to the product shipping location (often the location of the merchant that has the product) as well as the recipient's location. Thus the computed shipping price to ship product (130b) to recipient (132b) may be quite different than the shipping price to ship product (130a) to recipient (132a). The system may also be configured to either not accept the possibility of some product location shipping destinations, such as the possibility of shipping product (130a) to recipient (132b); or suggest alternative merchants or products instead. Often the system will be configured to try to optimize selection of merchants and products so that at least among cooperating merchants all enrolled in the system, merchants located closer to the recipient destination will often be given at least a higher weighting in the selection process.

Put alternatively, the product delivery time and location constraints can be viewed as imposing product delivery charge and surcharge information for certain delivery times and locations, relative that product's shipping location.

As previously discussed, in a preferred embodiment, this product data (usually for a plurality of products) will be stored in a centralized database (106). For convenience, often this product data (and other data as well) can be entered or updated (usually by the merchant or a designated agent of the merchant) using various methods, such as a web browser based administrator webpage (114) or mobile app (116) run on various types of computerized devices, and usually connected to the server (100) and centralized database (106) via a network connection such as an Internet connection (110).

Figure 2B:
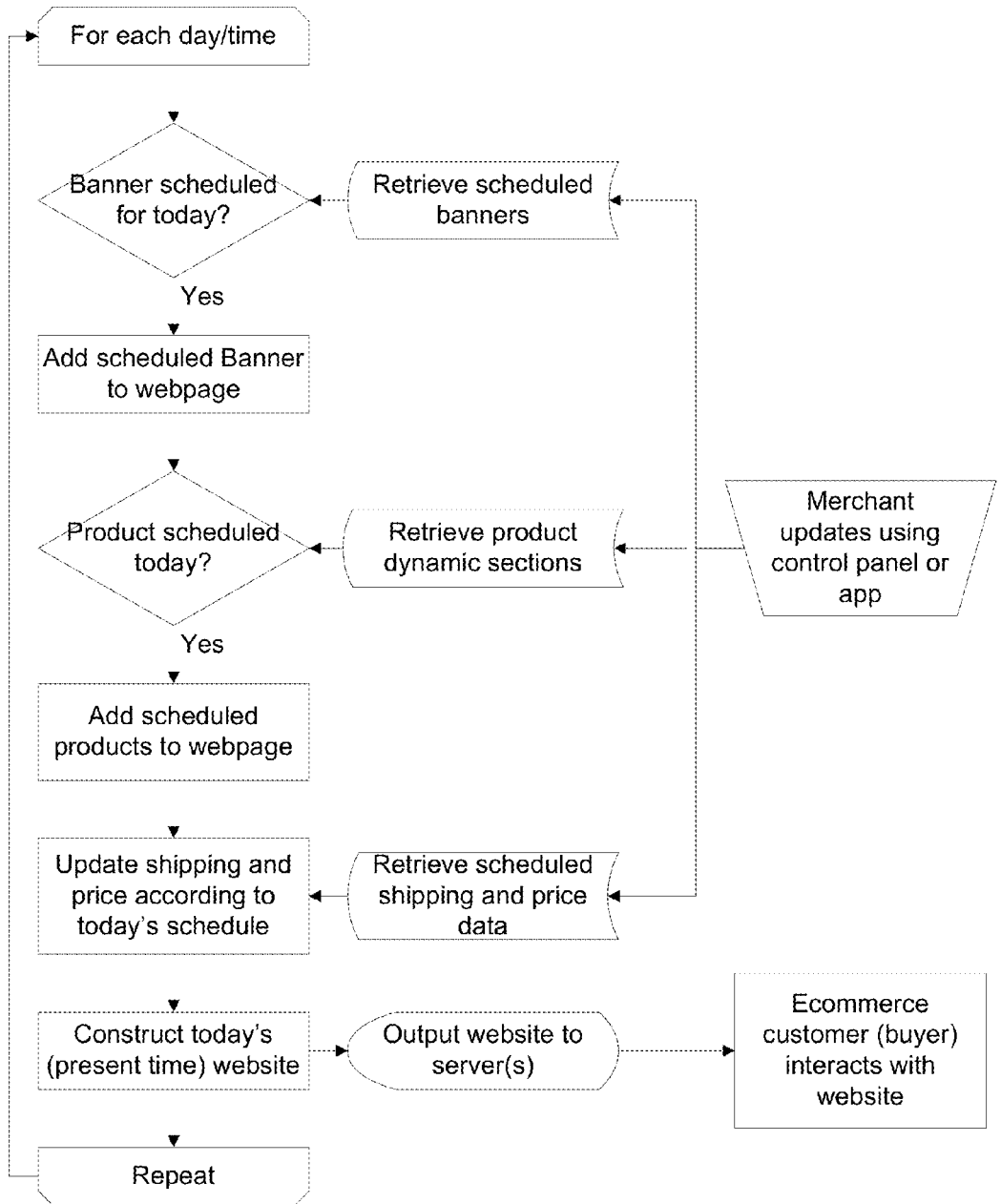
FIG. 2B shows a flow chart giving a rough overview of how the invention's schedule driven system operates, and how this operation may be controlled by a merchant using a control panel such as an administrator web page.

For each dynamic section (see FIG. 2: 200, 204, 206) associated with a corresponding product, a computer processor (either located in a centralized server 100, or alternatively located in a different ecommerce website controlled by the centralized server 100, such as 102-M1a, 102-M1b, 102-M2a) will examine the product data, according to a time schedule (often calendar based) for those scheduled times (e.g. Valentine's day (220), all occasions, (222), Christmas (224)) that these various products are available. The system will generally also examine the available inventory for these products, or the various product components, as well.

If the processor and software determine if that a particular product has a scheduled time of availability, and if the product (or its various components) are also in inventory (usually the inventory of a particular merchant local to either the ecommerce customer-buyer or recipient), then the processor and software will configure the ecommerce website or websites to display these dynamic sections.

For example, in FIG. 2A, assume that a merchant has three potential products. Product 1 (200), (202) is a floral arrangement scheduled to appear around Valentine's Day. Product 2 (204), (206) is a floral arrangement that is scheduled to appear at all times. Product 3 (208), (210) is a floral arrangement that is scheduled to appear around Christmas. Here photographs of the products are shown as (202), (204), (206), and the dynamic sections (that contain the product data) associated with these products are shown as (200), (204), (208). Note that these dynamic sections generally exist as data structures in computer memory.

Although the term "dynamic section" is used to help convey the underlying data transfer mechanisms that may be used, note that there are alternative ways to structure this data in memory, and these specific examples are not intended to be limiting.

In this example, also assume that the merchant has the components of all three products (here the flowers and vases for all floral arrangements) in stock at all times. According to the invention, the system will examine the various dynamic sections associated with each product. When the system's time (calendar day) is around Valentine's Day, the system will determine that dynamic sections (200) and (204), but not (208) should be used to construct the ecommerce website page (230). When the system's time (calendar day) is around Christmas, then the system will determine that dynamic sections (204) and (208), but not (200) should be used to construct a somewhat different ecommerce website page (232). See FIG. 2B for a flow chart of this process.

Put alternatively, at the proper schedule times, and if the product is in inventory, the system will use at least some data (e.g. images 202, 206) from the dynamic sections associated with the corresponding ecommerce product on at least one web page of an ecommerce website (e.g. page 230), but otherwise not display data (e.g. image 210) from the non-scheduled or out of inventory dynamic sections (e.g. 208) associated with that corresponding ecommerce product.

Note that in some embodiments involving different but cooperating merchants, if merchant 1 does not have the product in inventory, his website may thus not (at least initially) not show that product, while the website of a different merchant in the system, say merchant 2 (M2) may show that product. However if the ecommerce customer then identifies that the recipient has an address near the location of Merchant 2, the system may (in some embodiments) then start to automatically display products carried by Merchant 2 on Merchant 1's website. This optional scheme can be useful in order to encourage the customer to order the product without changing websites, and with minimal extra expenditures of the customer's time and energy. Merchant 1 and 2 can work out various fee split arrangements to handle this type of situation, and these fee splits can also be handled in an automated manner. Other automated methods of informing the customer that merchant 2 is carrying the desired product may also be used.

Figure 2C:
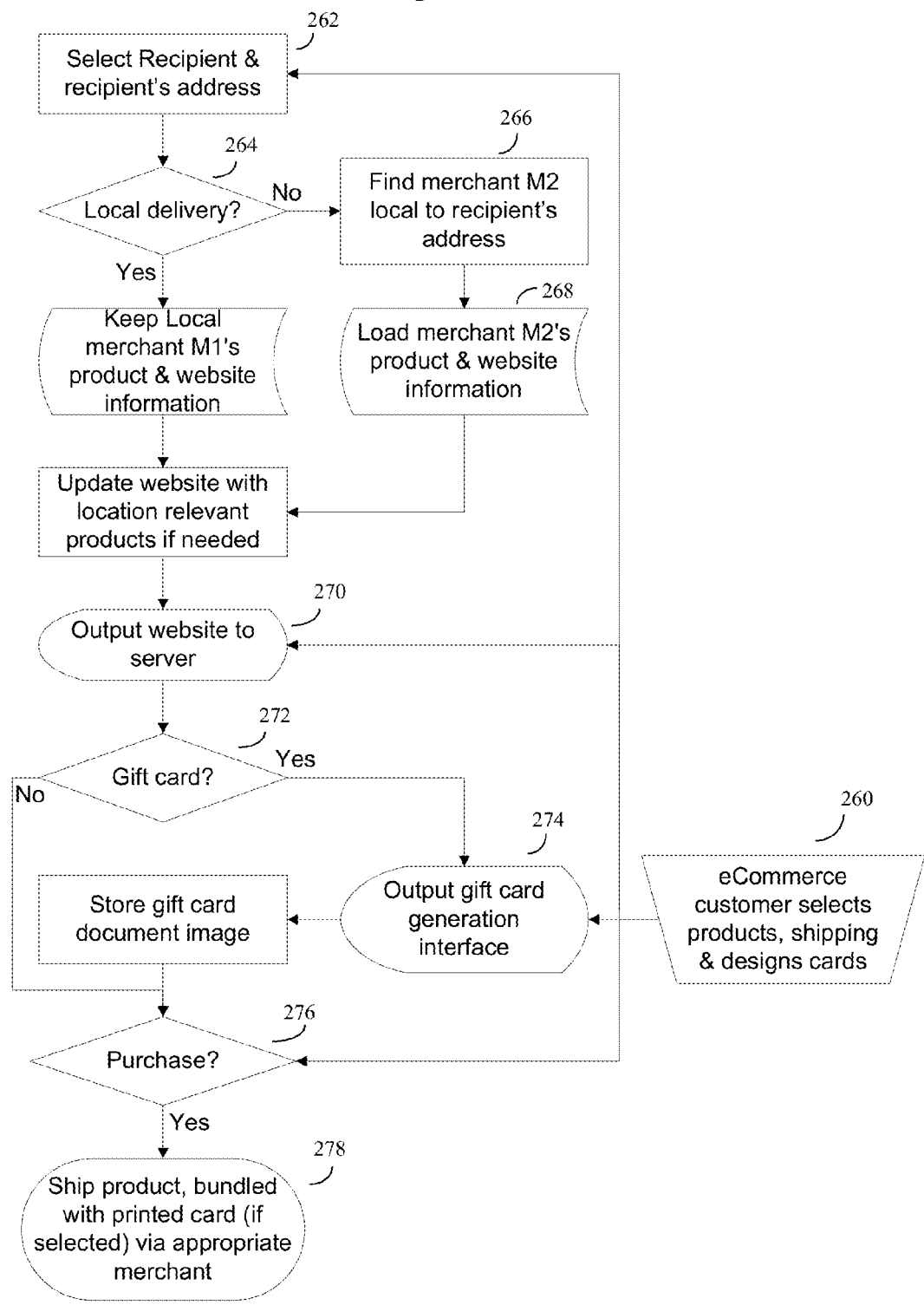
FIG. 2C shows a flow chart showing how an ecommerce customer can interact with the system's schedule driven ecommerce web pages, select products that can be delivered by either a local merchant or a remote merchant (located near the recipient), and also customize a product gift card as desired.

Returning to FIG. 1, in typical use, an ecommerce customer, usually interacting with the website using a web browser (108) or app (108) run on an Internet connected computerized device, will provide a product purchase request. This product purchase request will usually include a product identifier such as an SKU, as well as a requested delivery location and delivery time. Either the server hosting the website (e.g. 102-M1*a*), or often a server located on the centralized server (100), or a combination of the two will use at least one processor (e.g. computer processor, microprocessor) to determine a preferred shipping location for the requested product or products. The system will also examine the product delivery time and location constraints relative, to the shipping location of the product(s). The system will then use this information (e.g. requested delivery location and delivery time relative to the product shipping location to compute product delivery surcharges for the product(s). The system will also automatically display the product delivery charges and surcharges on the website as well. This way the ecommerce customer can make informed tradeoffs between cost of the product, and the impact of various delivery locations and times on shipping costs, before completing the purchase. A flow chart of this part of the process is shown in FIG. 2C.

Thus when the ecommerce customer (108), (112) purchases the product using the ecommerce website (e.g. 102-M1*a*), the system can use at least one processor (which may be located on (104) or (102-M1*a*), or both) to record the sale the product(s), the product shipping location, changes in product inventory data at the product shipping location as well as requested product delivery time and requested delivery location. In a preferred embodiment, this information will be stored in the centralized database (106).

The system will also generally use at least one processor (which again may be located on either the centralized servers (100), or on other ecommerce web servers such as (102-M1*a*) to transmit notification of product sale to the ecommerce customer. Additionally, notice of the sale (along with the other relevant information such as shipping information) will also be transmitted to at least one computerized device associated with distribution of product from the product shipping location. Again using FIG. 1 as an example, if merchant 1 is shipping the product (130*a*) to recipient (132*a*), and the computerized devices (114), (116) are M1's computerized devices, then the notice of sale and shipping information can be transmitted to (114) or (116).

Thus in essence, many of the invention's methods are as previously taught in parent provisional application 61/807,214, the contents of which are incorporated herein by reference. As before, a main part of the invention's methods may be implemented by ecommerce web server software running on a cloud service (100) and a central database (106) comprised of one or more internet connected web servers. The invention software may comprise website software and apps (102), a rules engine (104), and a multi-vendor product database (106). Customers (e.g. buyers) can interact with the invention's ecommerce system through various methods, including using web browsers (108) running on various standard computerized devices connected to the server/cloud service (100) via the internet (110), and standard smartphone or tablet computer apps (112) running on standard smartphones and tablets (e.g. iPhone, Android devices etc.) and connected to the cloud service (100) via a wireless interface and usually also via the internet (110) as well.

Merchants will usually also connect to the cloud service (100) via either standard web browsers or apps running on standard internet connected computerized devices (114). Often specialized web pages provided by cloud service (100) that provide an administrator panel (control panel) or interface for the merchant. As will be discussed, the invention also provides a method by which merchants can also quickly (within a few minutes) upload photos and descriptions of new products and add them to their ecommerce sites using apps running on standard smartphones or tablet computers (116).

FIG. 2C shows a simplified flow chart showing the data flow for some aspects of the invention. In this example, customers (260) can login to the merchant's ecommerce website by various methods, including direct login and by other methods, such as logging in through various social networks such as Facebook. In some embodiments, the customer may also give the system access to the customer's friends list, thus allowing the ecommerce system to extract useful information pertaining to milestone events for friends, such as birthdays, and remind the customer of these events.

By either login event, assuming that the customer is interested in using the system to purchase a gift, the customer can enter in the gift recipient's name and address (262).

In normal use, often the customer is working with a local merchant (originating merchant) website to complete the gift. However in the event that the gift recipient is too far away, then the merchant in turn may forward the gift information to a remote merchant who will then complete the transaction. Alternatively, and often in the case where a suitable local merchant is not available, the system may allow the user to directly select the remote merchant. In yet another embodiment (shown in FIG. 2C), the system may automatically (262) determine a suitable remote merchant (M2) (266), and automatically load the remote merchant's product data, shipping data, and other information (268) and display it on the website (270) without forcing the ecommerce customer to switch to the remote merchant's website.

Thus there are various alternatives to handle out-of-area deliveries. The customer may use the invention's server or cloud based service to manually request that the system find various preferred merchants within a certain radius of the recipient's address, or this can be done automatically. The system can then provide the customer with information pertaining one or more various participating merchants within this geographic area. The buyer can then select products of interest and use the system's checkout function to purchase the product.

Put alternatively, as previously discussed in some embodiments, the system may handle a plurality of cooperating merchants (here exemplified again by merchant 1 and merchant 2 in FIG. 1), each carrying at least some common products or commonly configurable products (e.g. 130a, 130b).

In these embodiments, the system may be configured to transmit product purchase requests received from a first ecommerce website (103-M1a) under first merchant control by a first merchant (merchant 1) to a second ecommerce website (102-M2a) under second merchant control by a second merchant (merchant 2). Generally this second ecommerce website (102-M2a) will be oriented (or run by) a merchant who serves a geographic area closer to the requested recipient delivery location (132b) than the geographic area served by the merchant that runs the first ecommerce website (102-M1a).

Since both merchants are fully participating in the system, each can be assumed to have previously uploaded the product data and product delivery time and location constraints for their respective locations to the centralized database (106).

Thus the system can use the product data and product time and delivery constraints uploaded by the second merchant, along with the product's requested delivery time and location, and compute the second merchant's price and product delivery charges and surcharges. The system can then display this second merchant (Merchant 2's) price and product delivery charges and surcharges Merchant 1's website (102-M1a), thus giving a potentially seamless way of working with Merchant 2. As previously discussed, the fee splits for this arrangement can also be handled by the system, so that Merchant 2's portion of a payment made on the Merchant 1 website (102-M1a) can be transferred automatically to Merchant 2 as desired.

Gift Cards

Figure 46:
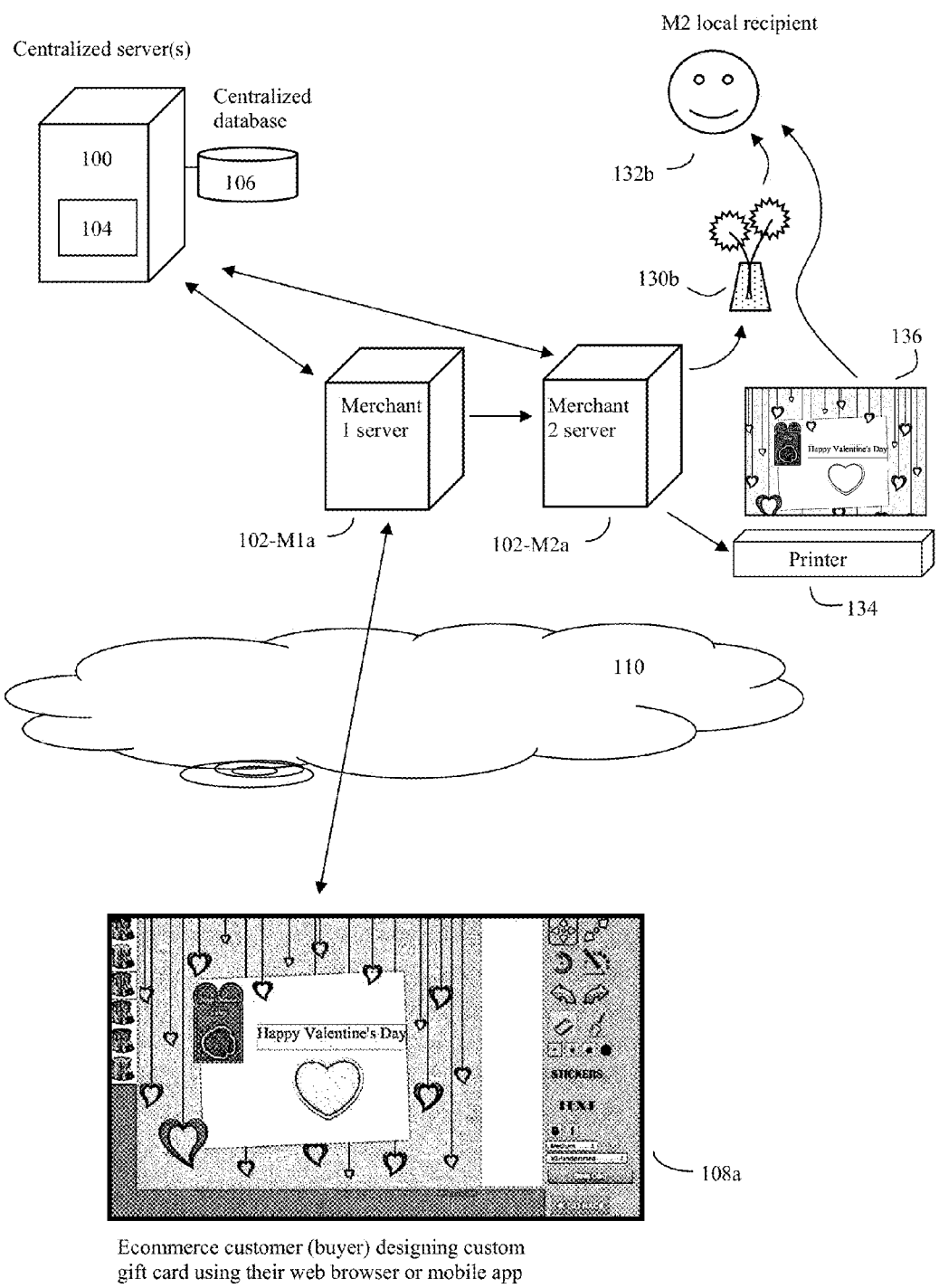
FIG. 46 shows an example of an ecommerce customer customizing the design of a gift card. The system then directs the remote merchant, who is responsible for delivery of the associated product, to print out and deliver the gift card along with the ordered product.

As shown in both FIGS. 2C and 46, in some embodiments, the system can also enable the customer to optionally (272) create customized gift cards, intended to be delivered to the recipient along with the customer selected product(s) (e.g. a bouquet of flowers with a custom gift card attached). Here the customer can, for example, design a gift card according to their own customized graphics, uploaded images, text, and hand (e.g. driven by the customer's mouse, or finger movement on a touch sensitive screen) written drawings, script, and lettering. This may be implemented by various computer software graphical packages and tools with gift card interface (274) designed to be manipulated using the customer's computerized device. In one embodiment, these tools may be based on methods previously discussed in copending application Ser. No. 13/441,781, the contents of which are incorporated herein by reference. See FIG. 46 for more information.

When the customer then purchases (276) the product and the associated gift card, the delivery merchant can then print out this handmade customer generated card and deliver it to the recipient along with the product/gift (278).

Upon payment processing, in some embodiments the system can then send an order to the cloud server (100) that contains the necessary information pertaining to the originating merchant, remote merchant, product information, promotional details, and the like.

Note that although it is contemplated that the bulk of the sales will be done by customers interacting with the system using web browsers and apps using their network connected computerized devices, in some embodiments, it is also useful to provide a point-of-sale interface to allow the merchant to conduct the sale as well. This can be helpful, for example, for when customers call or email, or for customers that may be showing up in person at the merchant's store or other facility.

In a preferred embodiment, this point-of-sale interface can also be web based, either as part of the administrator control panel, or as a different web interface. Here again it is often useful to have this point-of-sale work directly with the centralized database (106) as well.

For such point-of-sale interfaces, it is also useful to further provide, often as part of the product data, various types of product sales recommendation information that is associated with at least some of these products. Thus for example, the point-of-sale interface can be configured to enable a merchant (or authorized clerk), to also provide this product sales recommendation information when the merchant is using the point-of-sale system. This product sales recommendation information can be short text messages such as "We are short on red flowers and have a surplus of yellow flowers, please recommend yellow flower arrangements" or other data intended to remind or guide the merchant or clerk while operating the point-of-sales system. The merchant or clerk can then discuss various possibilities with the client, and then enter the relevant purchase data directly into the system via the point-of-sale interface. Thus the point-of-sale interface will generally be a superset of the ecommerce customer interface, in that it may also show some business proprietary or confidential information that might not normally be available to the average ecommerce customer.

Figure 3:
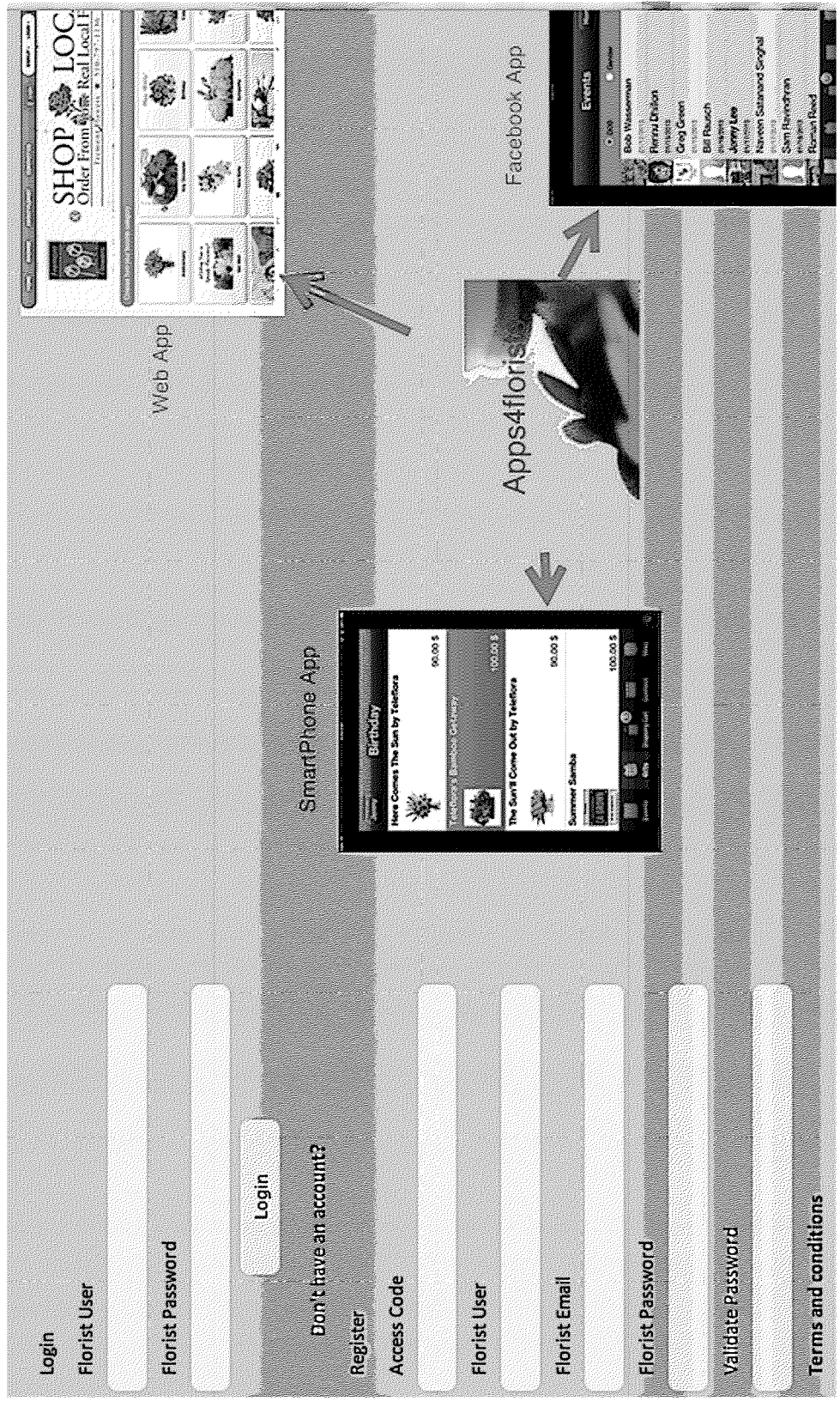
FIG. 3 shows the ecommerce system' merchant administrator "finder" screen, which can function as the system login page for the centralized server and database. The merchant will often interact with the invention's server software via the merchant's web browser, which in turn will allow the merchant access to various control panel (administration panel) web pages by which the merchant can configure and administer the merchant's particular ecommerce site.

To set up the system, merchants will generally login to the administrator interface (114). This login process is shown in FIG. 3. FIG. 3 shows the finder screen, which is the system login page. In this example, the login page is also showing a brief graphic overview of the various merchant options that the system may make available to the merchant.

Returning to FIG. 1, in some embodiments, customers (e.g. 108) may use a merchant's (booking merchant's) ecommerce website (102-M1a) to order a product for delivery outside of the merchant's (here merchant 1's) service area. Here, as previously discussed, the system can be configured to examine the recipient address, and recommend one or more other merchants (such as merchant M2) that have service areas that cover the recipient's address.

In the case where these remote merchants are participating in the system, then the system can automatically show the remote merchant's product data and delivery data, and transmit orders directly to the other merchant's computer system. Here, for example, Customer (108)'s order can best be filled by merchant 2, who runs his own participating ecommerce server (102-M1a). The order information can thus be transmitted automatically (usually using a computer network such as the Internet) between merchant 1 and merchant 2 either using network connections to the centralized server(s) (100) and database (106), or directly between their respective ecommerce servers (102-M1a) and (102-M2a). The system can also automatically apply previously negotiated fee splits to this process so that merchant 1 receives a booking commission, and merchant 2 receives its part of the fees as well.

In the event that the customer specifically elects a non-participating merchant, then the system can be designed with a manual order transfer process so that non-participating merchants may also be handled, at least with manual intervention.

Figure 4:
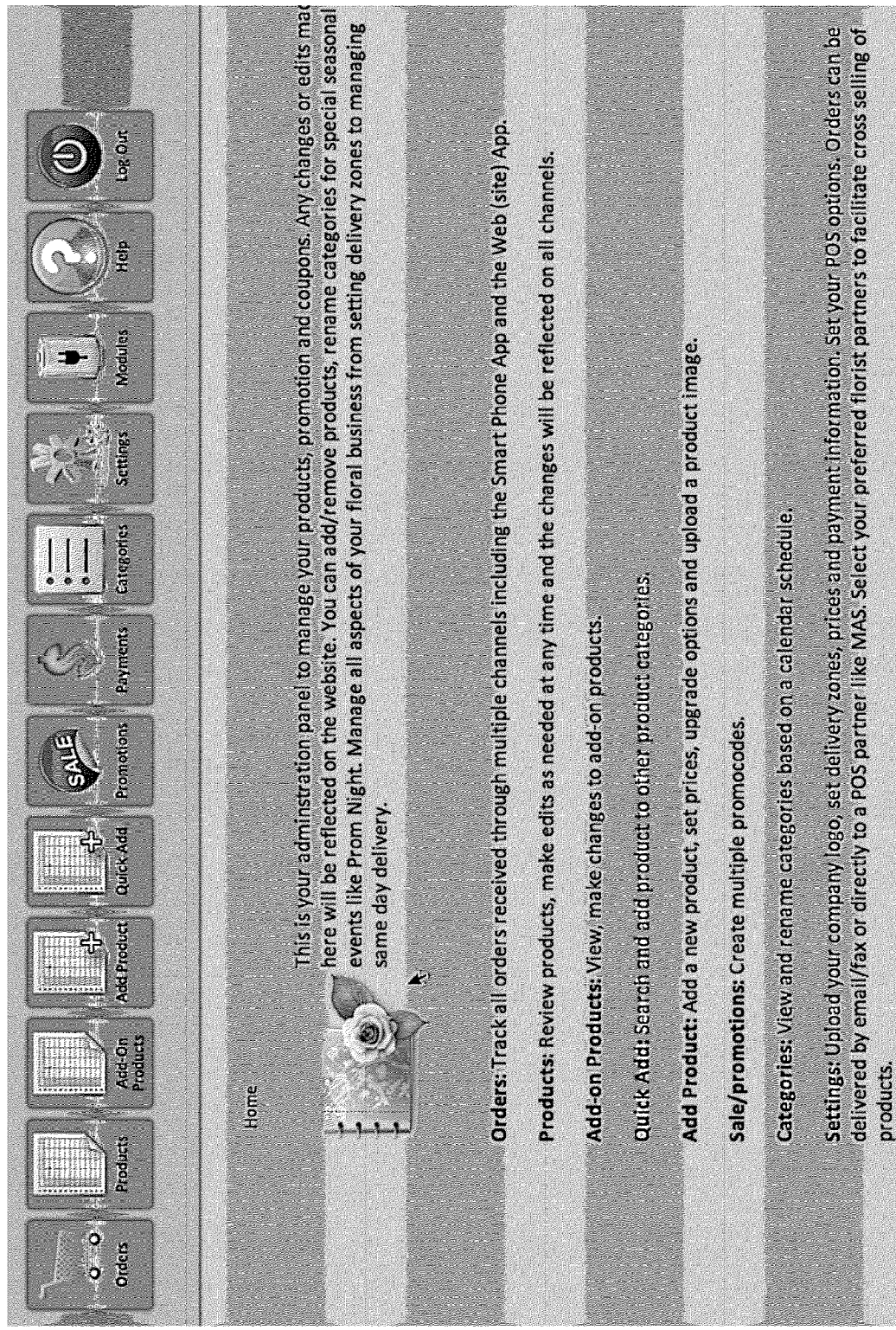
FIG. 4 shows the administration panel. This administration panel allows the merchant to access various functions such as managing orders, products, add-on products, quickly add products, set sale or promotional activities such as promo codes, view and rename categories, set up the merchant's website, and other functions.

FIG. 4 shows the merchant administration panel or interface (114) in more detail, and also explains the various system functions that are available. As previously discussed, this administrator panel allows the merchant to access various functions such as managing orders, products, add-on products, quickly add products, set sale or promotional activities such as promo codes, view and rename categories, set up the merchant's website, and other functions.

Figure 5:
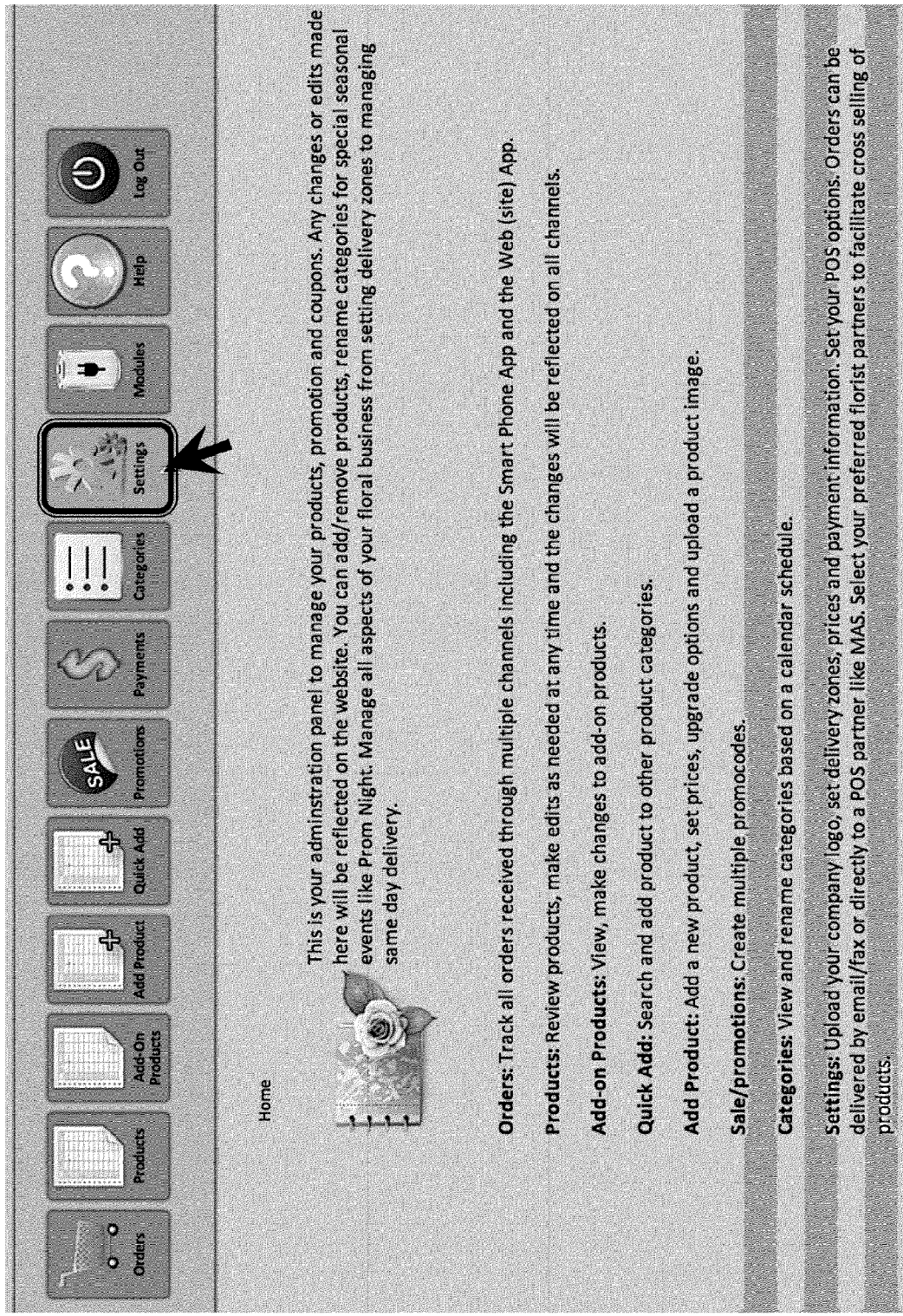
FIG. 5 shows how the merchant can select the settings functions to initially setup the merchant's ecommerce website. The merchant can upload the merchant's logo, set delivery zones, set prices and payment information, and set various point of sale (POS) options. The system also allows the merchant to select if orders can be delivered by email or fax or directly to a point of sale partner such as MAS. The system also allows the merchant to select preferred partners to facilitate cross selling of various products.

FIG. 5 shows how the merchant, usually on initial setup, can select the settings functions to upload the merchant's logo, set the merchant's delivery zones, set prices and payment information, and set various point of sale (POS) options. The system allows the merchant to select if orders can be delivered by email or fax or directly to various point of sale partners such as FTD, Teleflora, MAS (MASdirect, Dallas Tex., a provider of point of sale/order entry software for the floral industry) and the like. For florist applications, the system also allows the merchant to select preferred florist partners to facilitate cross selling of various products. This option will be discussed in more detail shortly.

Figure 6:
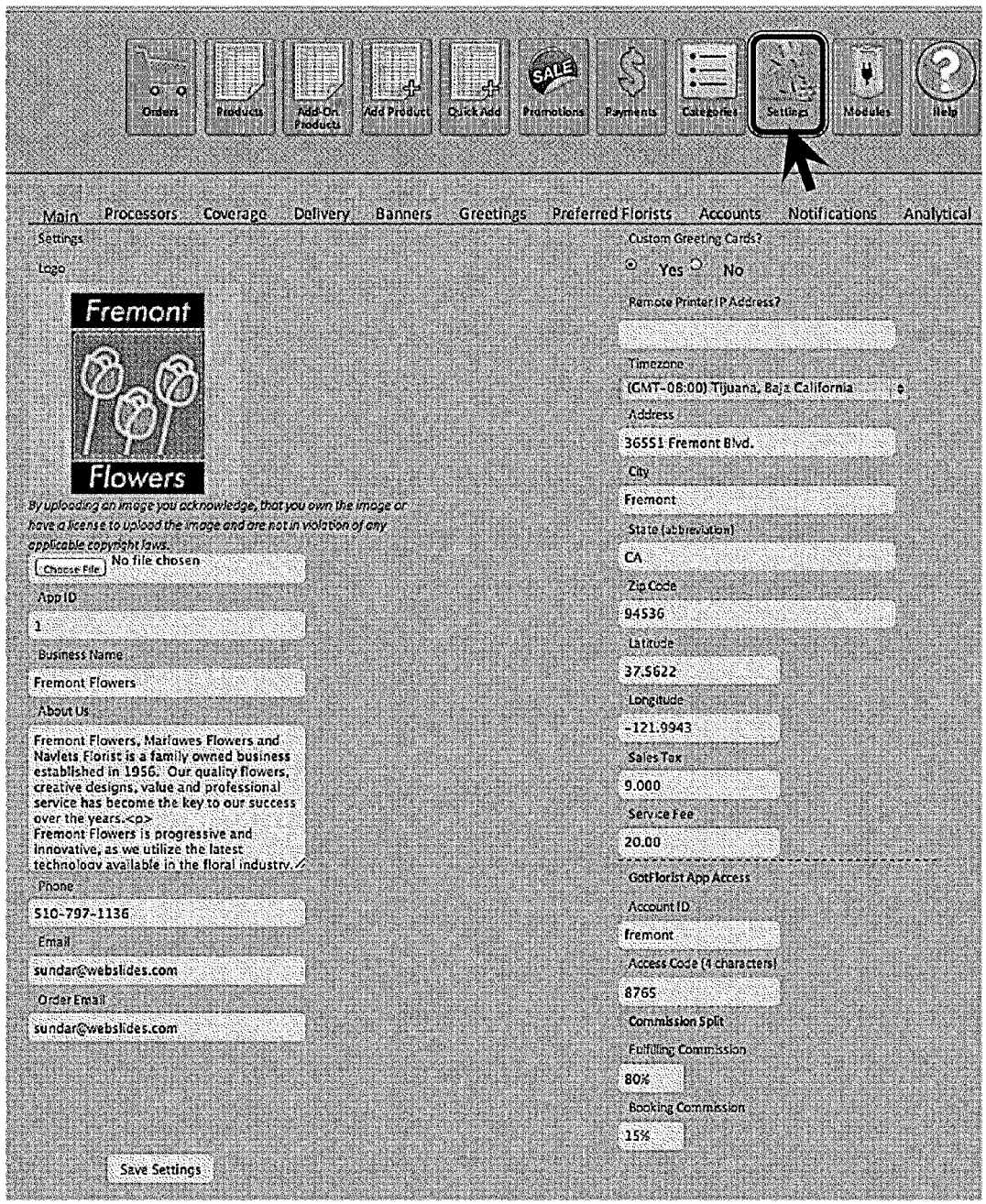
FIG. 6 shows how the merchant can use the system settings to specify the merchant's logo, enter in the merchant's business name, description, contact information, address, and various standard fees and commissions.

FIG. 6 shows the merchant using the system settings to specify the merchant's logo, enter in the merchant's business name, description, contact information, address, and various standard fees and commissions.

Figure 7:
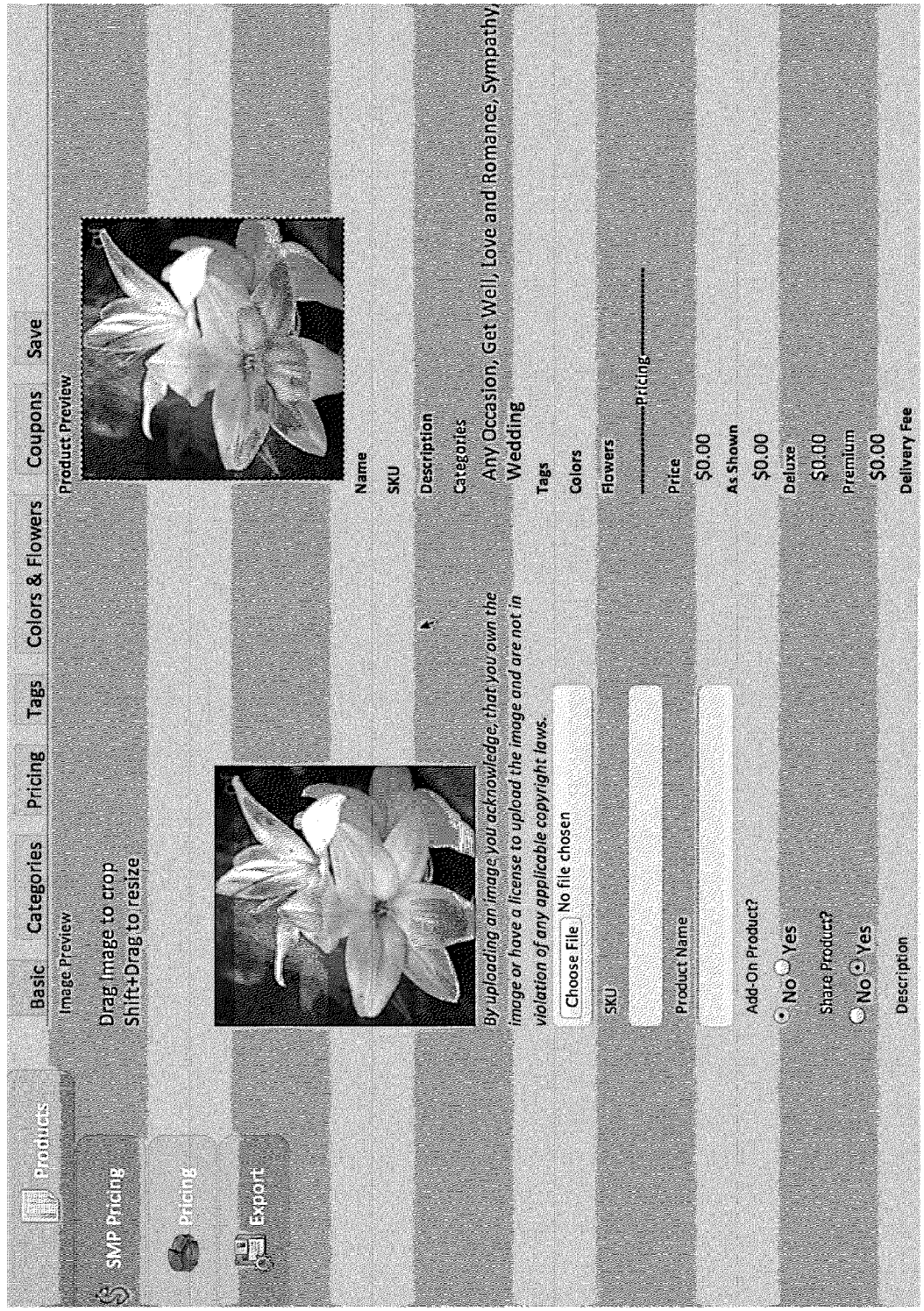
FIG. 7 shows how the merchant can use the system to further edit the images and other descriptions for a particular product.
Figure 8:
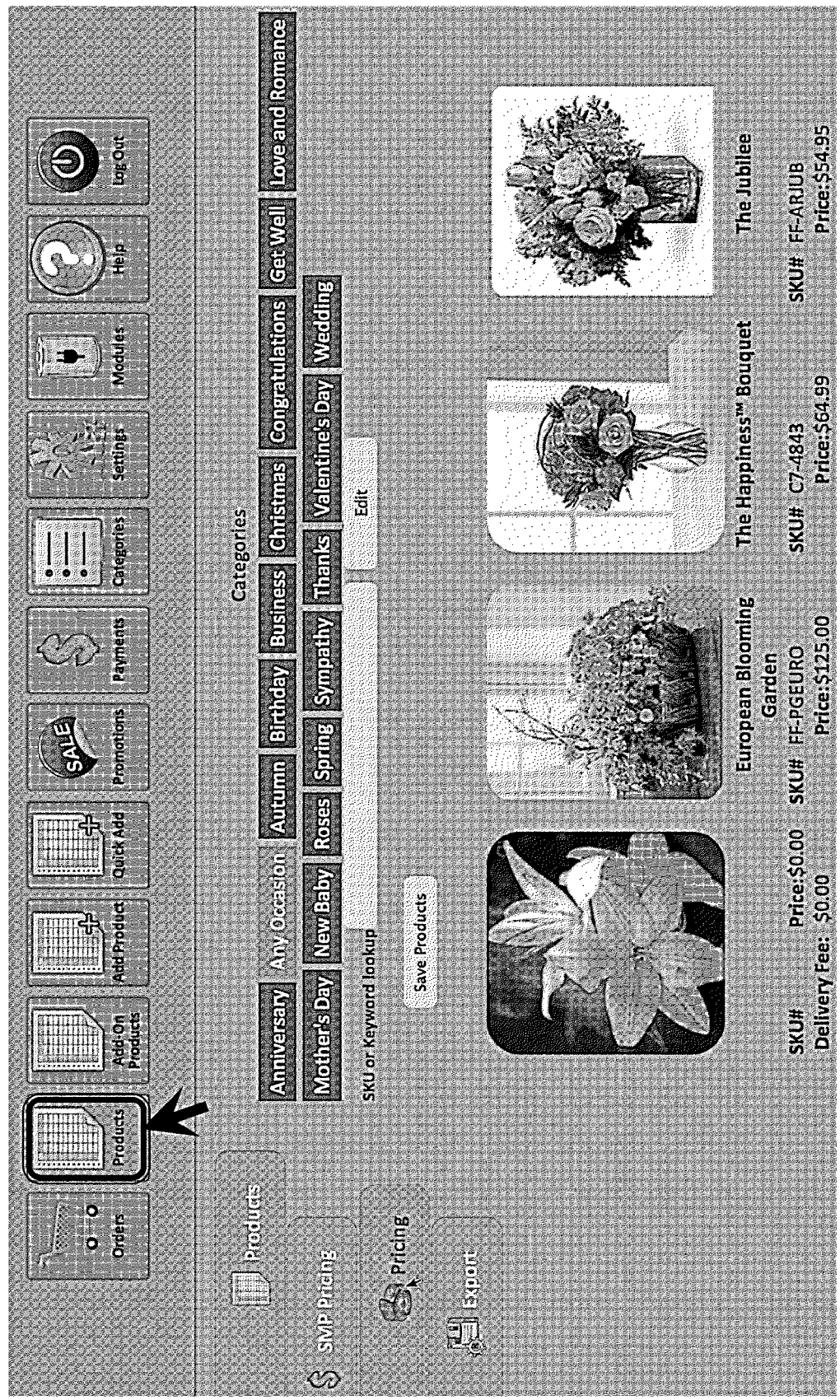
FIG. 8 shows the merchant now selecting a product pricing option.
Figure 9:
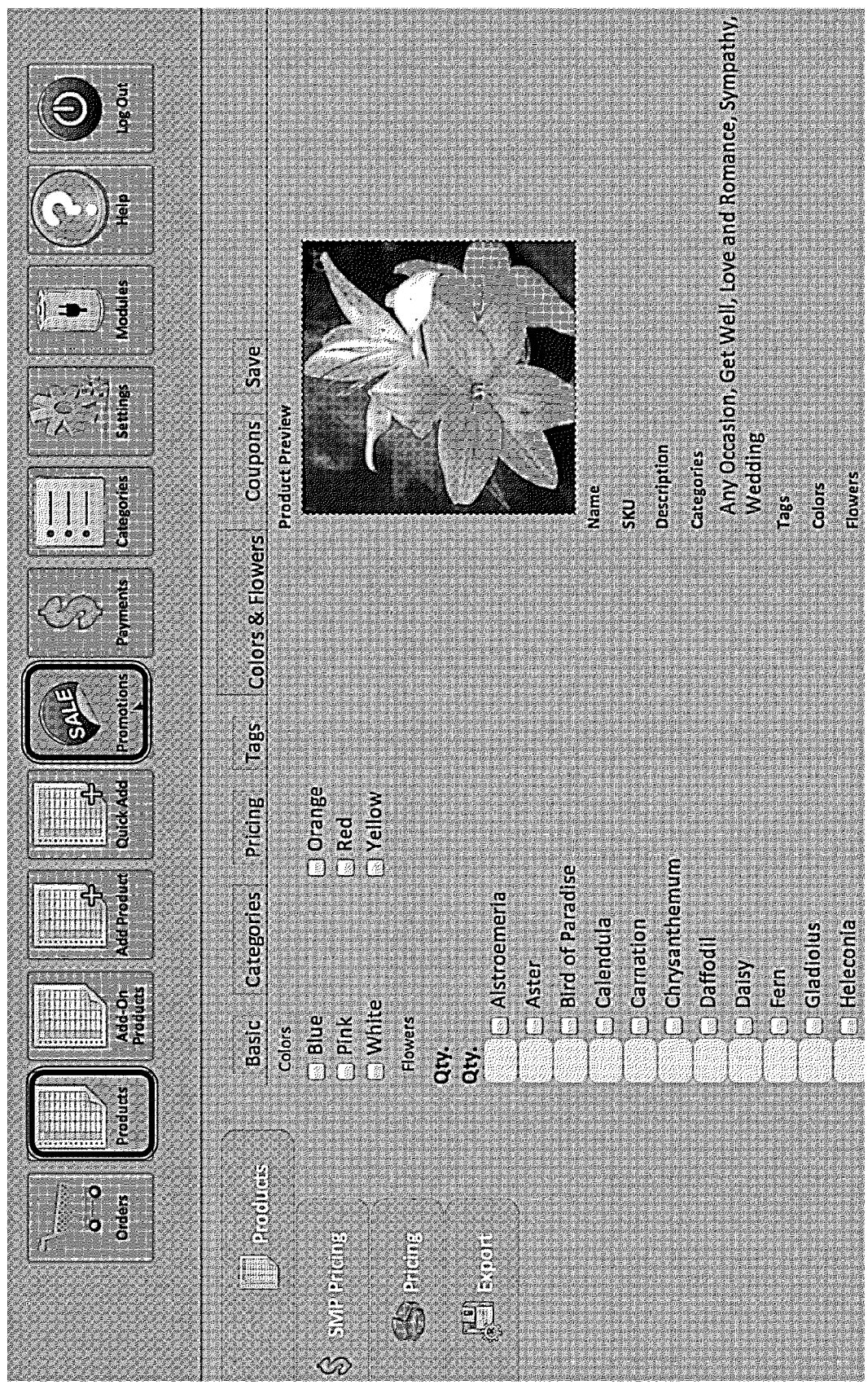
FIG. 9 shows how the merchant can use the system to describe the product (here a product arrangement) in more detail, and also set various sales and promotions.

The merchant can also enter in product information directly through the administration panel (114) as desired. FIG. 7 shows how the merchant can use the system to further edit the image, video, and other descriptions for a particular product. Additionally, as is shown in FIG. 8, the merchant can also enter in product pricing information and options through the administrator panel (114) as well. The merchant can use the interface to enter in quite detailed product information, as needed. For example, as shown in FIG. 9, the merchant can show the exact flowers used in a particular flower arrangement.

Calendar or schedule based automatic website updates: As previously discussed, the invention is based, in part, on the insight that for many local merchants of perishable products, a large fraction of the purchases are predictable from a calendar time standpoint. This especially true when delivery is part of the purchase, and when the products may be gifts. In particular, many purchases are based on important secular or religious holidays, such as Christmas, Hanukkah, New Years, Valentine's Day, Chinese New Year's, Easter, and the like.

During these times, in addition to updating the website to provide various calendar or schedule specific products, it is often also useful for the merchant to at least partially customize other portions of the ecommerce website for the occasion. This can be done using various banners and also various products or services related to these events. However doing this manually is very time consuming.

However because these events can be predicted in advance, and have a known sequence and duration, in addition to automatically updating the product mix to fit the occasion, the invention can also automate other calendar based web customizations as well. This can include both function and appearance customization. Both can be done using the previously discussed schedule driven calendar. Automated schedule driven appearance customization, for example, can be done using rapid banner customization tools that allow the merchant to automatically update the merchant's ecommerce website to switch its appearance according to a predetermined time schedule. Thus the merchant's ecommerce website can remain automatically current throughout the year with a minimal need for updating.

By contrast, most merchant ecommerce websites in use today are static. However the gift industry, for example, is largely based on standard occasions—mother's day, father's day, Valentine's Day, Christmas, thanksgiving, prom week, graduation day, and so on. These are typically the times when customers purchase flowers and other gifts for others, and these times in turn are driven by a calendar schedule.

Thus, for example, a local florist, knowing that prom week is coming up at a local high school, may have an incentive to update the florist's web site (e.g. various graphical banners on the website, and the like) to promote floral arrangements appropriate for a prom. Although, using prior art techniques, some small merchants have the time, expertise, and resources to do this, others do not.

The invention provides a server platform upon which the merchant can easily create a calendar based rules engine where the calendar date in turn drives changes in the merchant's website. For example, the merchant, knowing that valentine's day falls on February 14 of every hear, and that Christmas falls on December 25 of every year, can design in advance ecommerce site graphics (e.g. banners) and optionally products for these occasions, enter them into the calendar based rules engine. The rules engine will in turn automatically update the appearance of the merchant's website with graphical elements (e.g. banners) and optionally event specific products with no further effort on the merchant's part.

Thus in this embodiment, the centralized database (106) or other databases, such as other ecommerce specific databases) can also store various event specific notices such as the ecommerce site graphics, text banners, and the like. Additionally or alternatively, the product data can also have various types of event specific product data. Thus as an example, during the schedule times of product delivery (e.g. Valentine's Day, Christmas, etc.), the system's processor can also configure the website to display these various event specific notices (e.g. banners & other text or graphics). Generally it will be desirable to schedule these event specific notices during time when event specific products are available, of course, and the system may be designed to generally synchronize these products and notices. However if for some reason, a merchant desires to supply Halloween products during Valentine's Day, the system may also be designed to accommodate non-time synchronized scheduled products and event specific notices as well.

On a functional level, other functions, such product pricing, and delivery fees, may also be time varied according to a previously entered schedule, may also be done using these methods.

Figure 10:
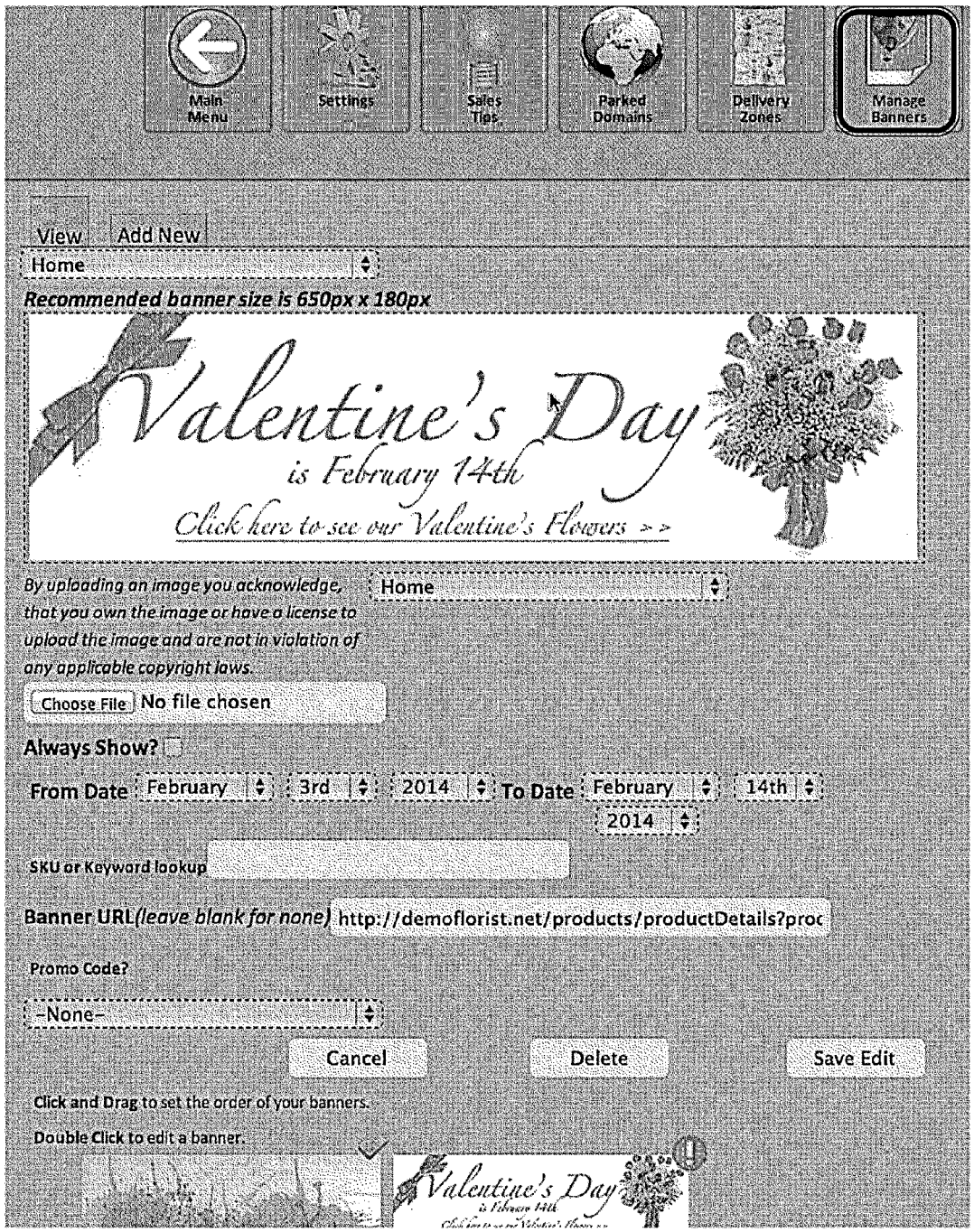
FIG. 10 shows how the merchant can use the system to quickly and easily produce various advertising banners that may be displayed on the website according to various predetermined schedules.

FIG. 10 shows how the merchant can use the system to quickly and easily produce various advertising banners that may be displayed on the website according to various predetermined schedules.

Figure 11:
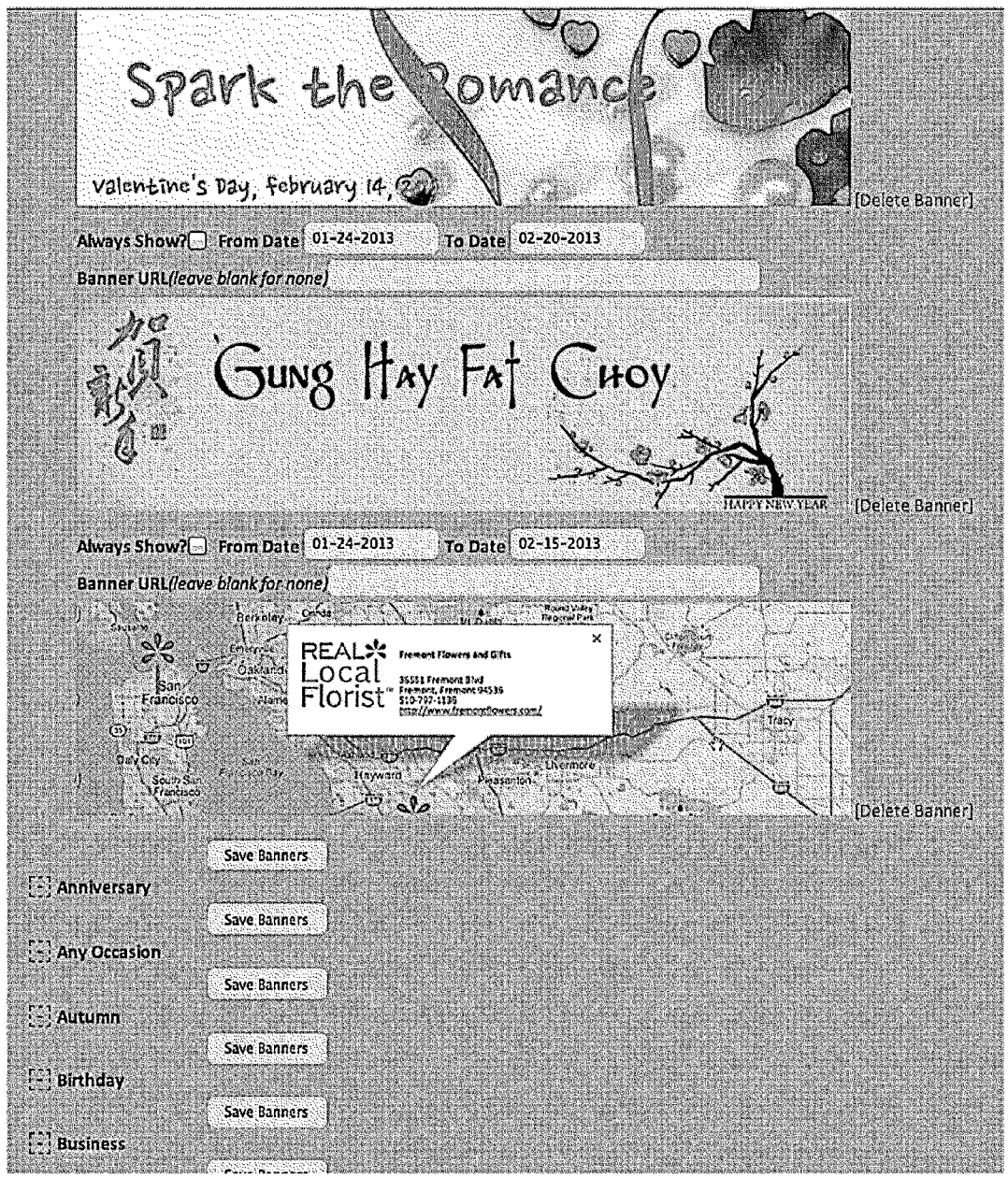

FIG. 11 shows how the system may store a variety of different merchant designed banners, and automatically switch to showing various banners on various days of the year. Here for example, the system shows a Valentine's Day banner on Valentine's Day, a Chinese New Year banner around the time of the Chinese New Year, and so on.

Figure 12:
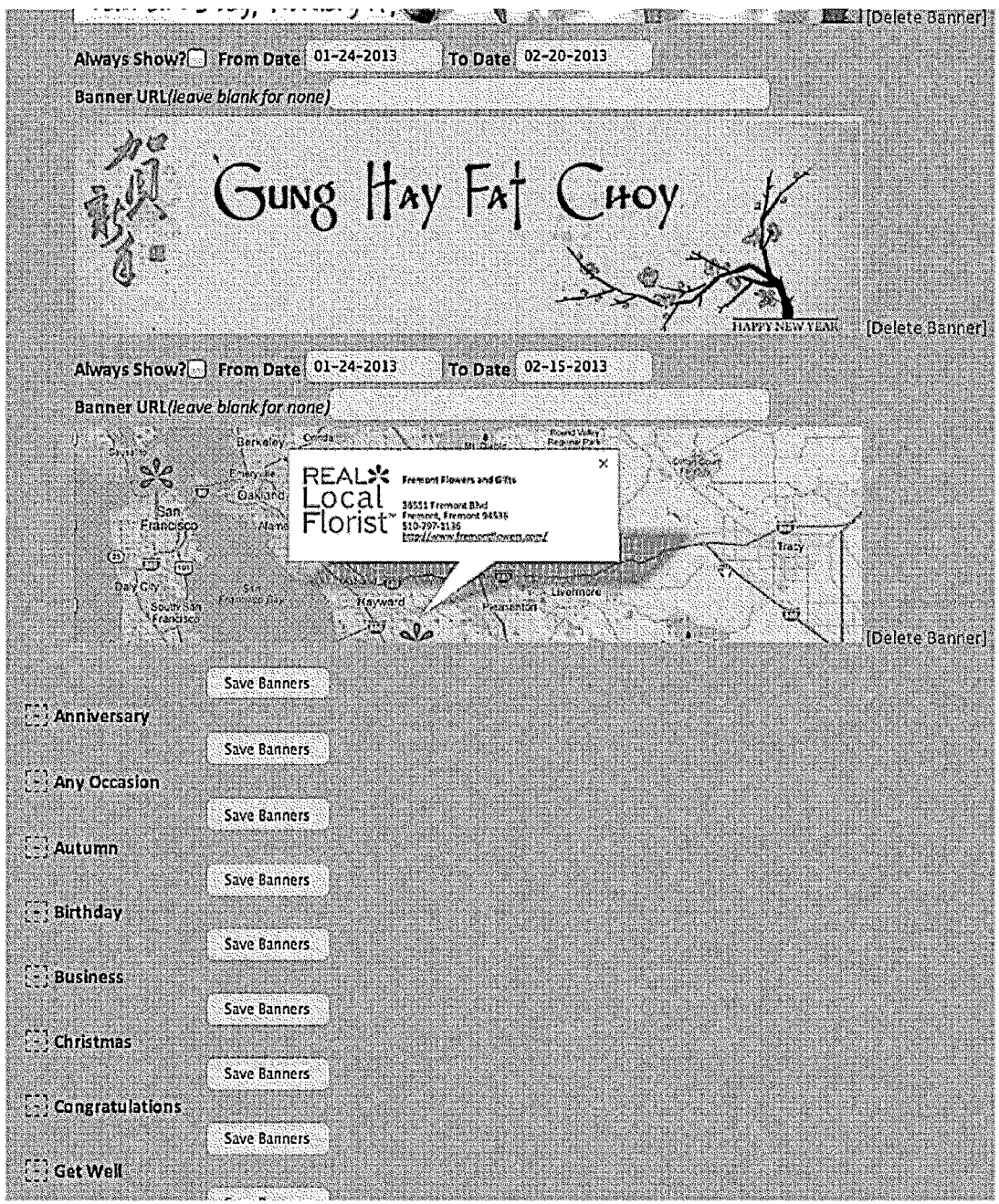
FIG. 12 shows how many different types of banners may be entered into the system and configured to automatically display at various dates and times.

FIG. 12 shows how many different types of banners may be entered into the system and configured to automatically display at various dates and times.

Figure 13:
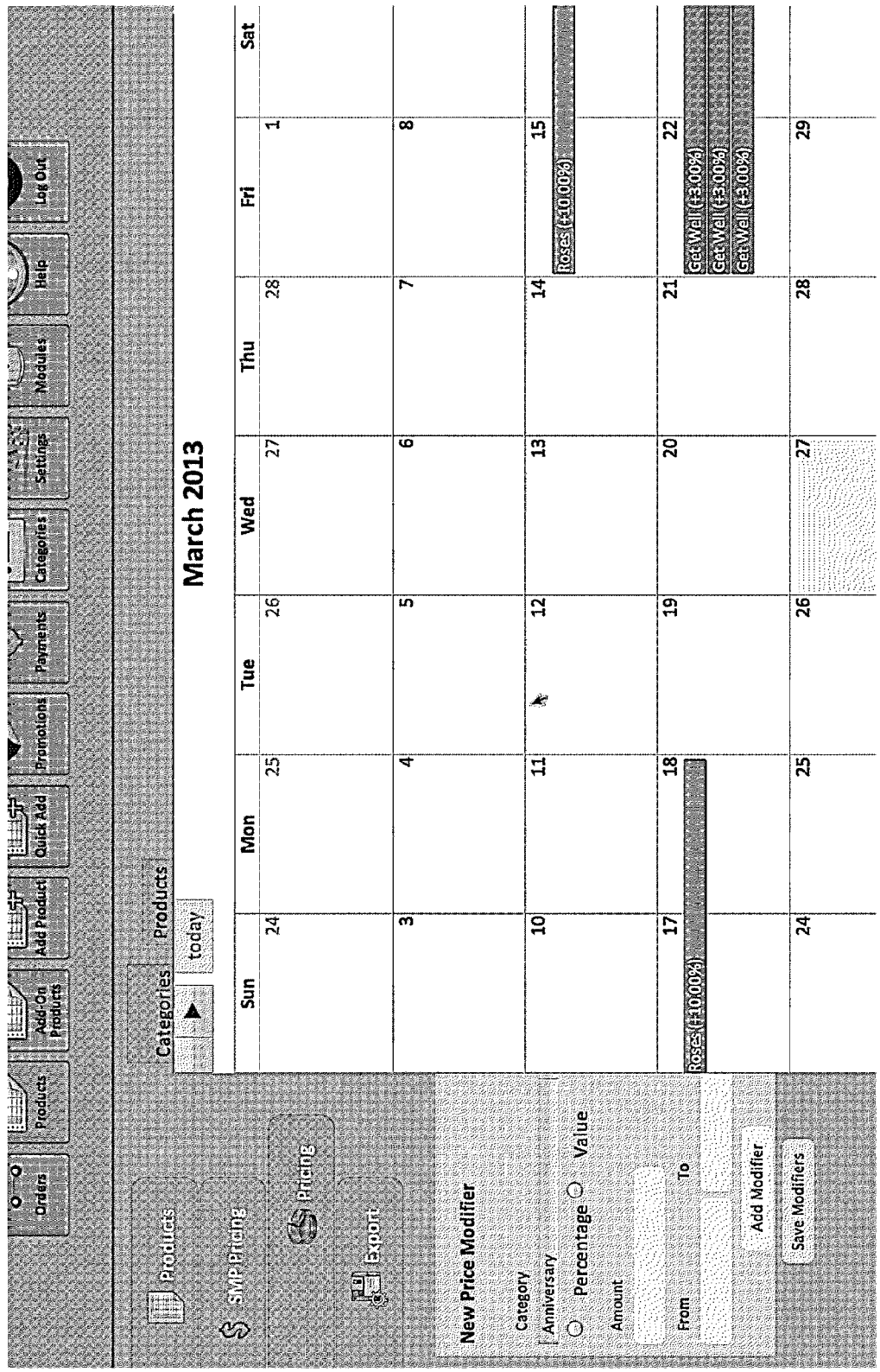
FIG. 13 shows how the merchant can modify the price as a function of date using the system's calendar function. Here the price of roses is altered by 10% right after Valentine's Day.

FIG. 13 shows how the merchant can modify the price as a function of date using the system's calendar function. Here the price of roses is altered by 10% right after Valentine's Day.

Figure 14:
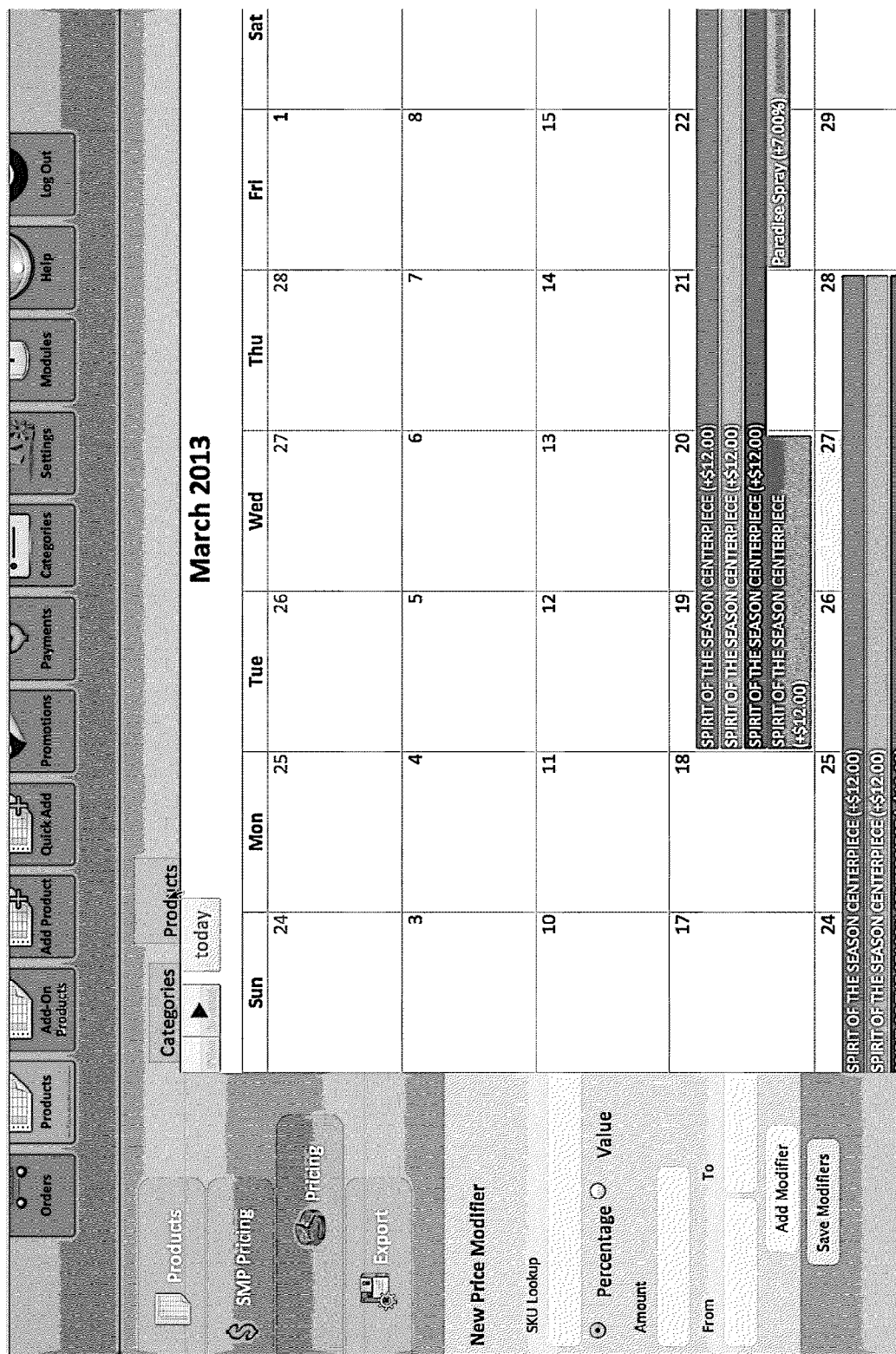
FIG. 14 shows the merchant adding other calendar sensitive pricing modifications to the calendar for various products.

FIG. 14 shows the merchant adding other calendar sensitive pricing modifications to the calendar for various products.

The invention can further provide various graphical editing tools, either as previously discussed in copending application Ser. No. 13/441,781 incorporated herein by reference, or other tools, to allow the merchant to easily customize these banners as well. Here for example, the merchant can simply use a web browser to upload a base image, type in the merchant' text script, edit with the system's graphic editing tools as needed, and create a new banner which can then be added to the merchant's ecommerce site.

Thus the invention provides a calendar (schedule) based engine where the calendar or other schedule can drive changes in the website on an annual basis. More than one type of calendar can be used—for example in addition to the standard Gregorian calendar, other calendars appropriate to the merchant's market, such as lunar calendars, various religious calendars, and the like can also be used.

Other embodiments of the invention provide other types of features as well. Some of these other features include more precise time, day of the week, and location based delivery cost estimations that can more accurately compute true merchant delivery costs in advance, and pass this knowledge to the customer so that the customer can make more accurate determinations as to what delivery options are most appropriate for the customer's needs and budgets.

Sophisticated delivery cost estimation engine: As previously discussed, the invention is also based, in part, on the insight that particularly with regards to local delivery; often the merchant's delivery costs are highly variable depending on day, time of day, and exact geographical location of the merchant and the recipient. Prior art ecommerce services do not sufficiently keep track of such costs, with the results that, for example for the florist industry, a florist that has had to accept an order with an unrealistically low delivery cost may be tempted to at least partially recoup the extra delivery costs by substituting a cheaper product, such as a less expensive bouquet, to the mutual dissatisfaction of everyone. The invention further provides a high level of customization that allows the merchant to precisely dial in these time and location variable delivery costs, and factor these costs in for the purchaser, so that the purchaser can make intelligent purchasing decisions that reduce the incentive make up for unrealistic delivery costs by substituting lower quality products.

Such a feature can be important because local merchants who also deliver their products have to contend with many different issues. Although prior art systems often based delivery fees on merely the distance traveled, in fact the problems are more complex than this. For example, in addition to distance, location and time of day are also major factors in delivery expenses. For example, the time required to deliver a product in a city can vary greatly depending on if it is rush hour or not.

As another example, if a florist gets an order and gets a $10 delivery fee to deliver to downtown San Francisco in the financial district at 10:00 AM, the florist will usually have to send two people in a car. One person drives the car and circles around the block while the other delivers the flowers. So the merchant will end up spending $30-$40 for this $10 delivery fee. So on a transaction basis, using prior art methods, the florist will lose money on the deal unless the florist substitutes a lower cost and inferior product to at least partially recoup the delivery fee losses.

To better cope with issues like this, the invention can allow the merchant to designate certain geographic areas and times as being extra fee cases. Further, the invention's delivery fee determination algorithms can also take into account other factors such as fluctuations in gas prices, merchant's expected overall profit margin on the deal, distance, location and the like to more realistically calculate true delivery costs and make this information available to the purchaser at the time of purchase. This way, for example, a purchaser may decide that rather than paying a huge amount to deliver flowers to a recipient located in the San Francisco financial district during rush hour, the recipient might rather send a fancier bouquet of flowers to the recipient's suburban home address at some time other than rush hour. By exposing true costs on the merchant's ecommerce website, more intelligent decisions can be made, and overall satisfaction of all parties involved can be improved.

Figure 15:
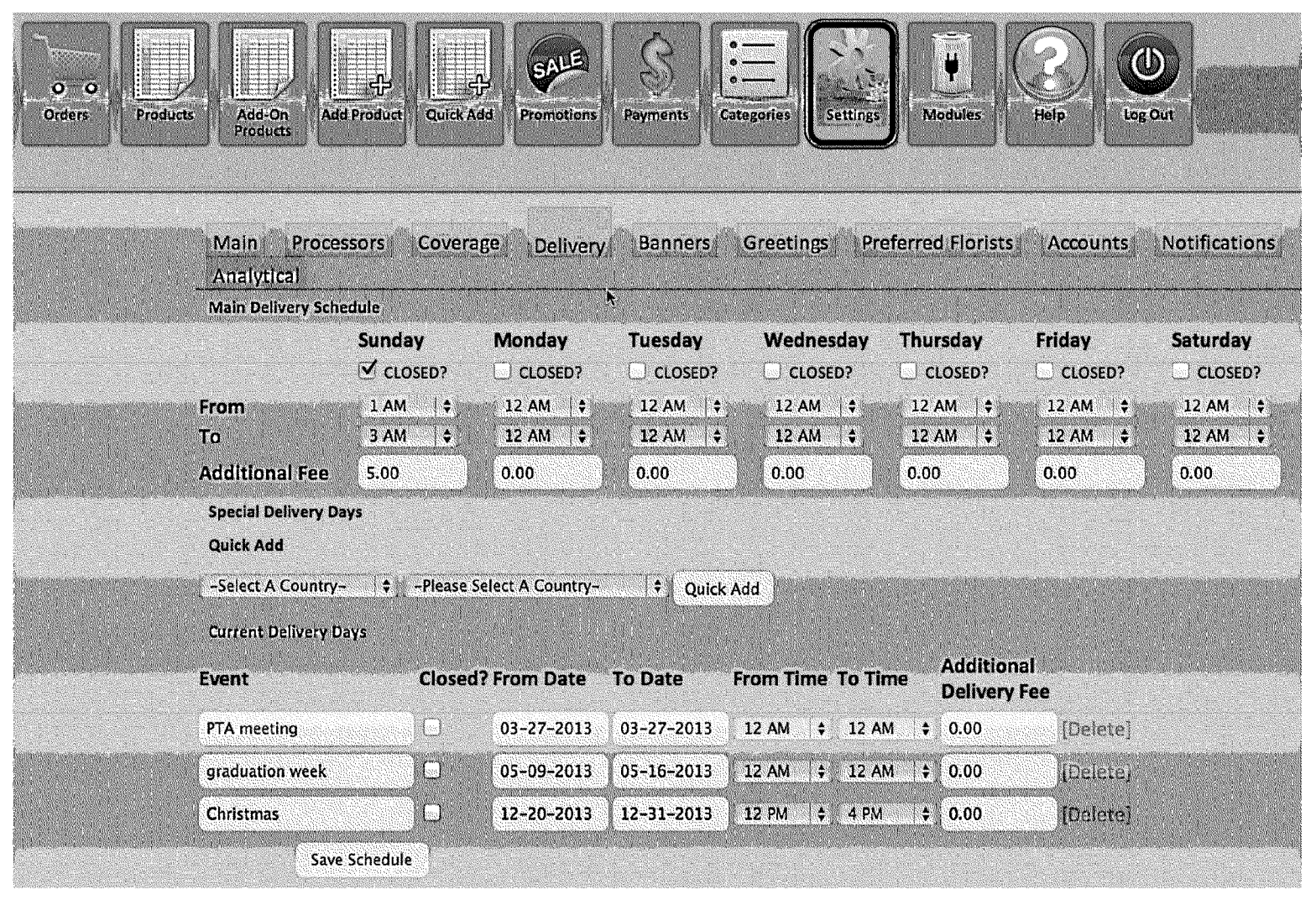

FIG. 15 shows how the merchant use the system settings to specify the merchant's days and times of standard delivery service, as well as extended days and hours of delivery service for additional charges.

Figure 16:
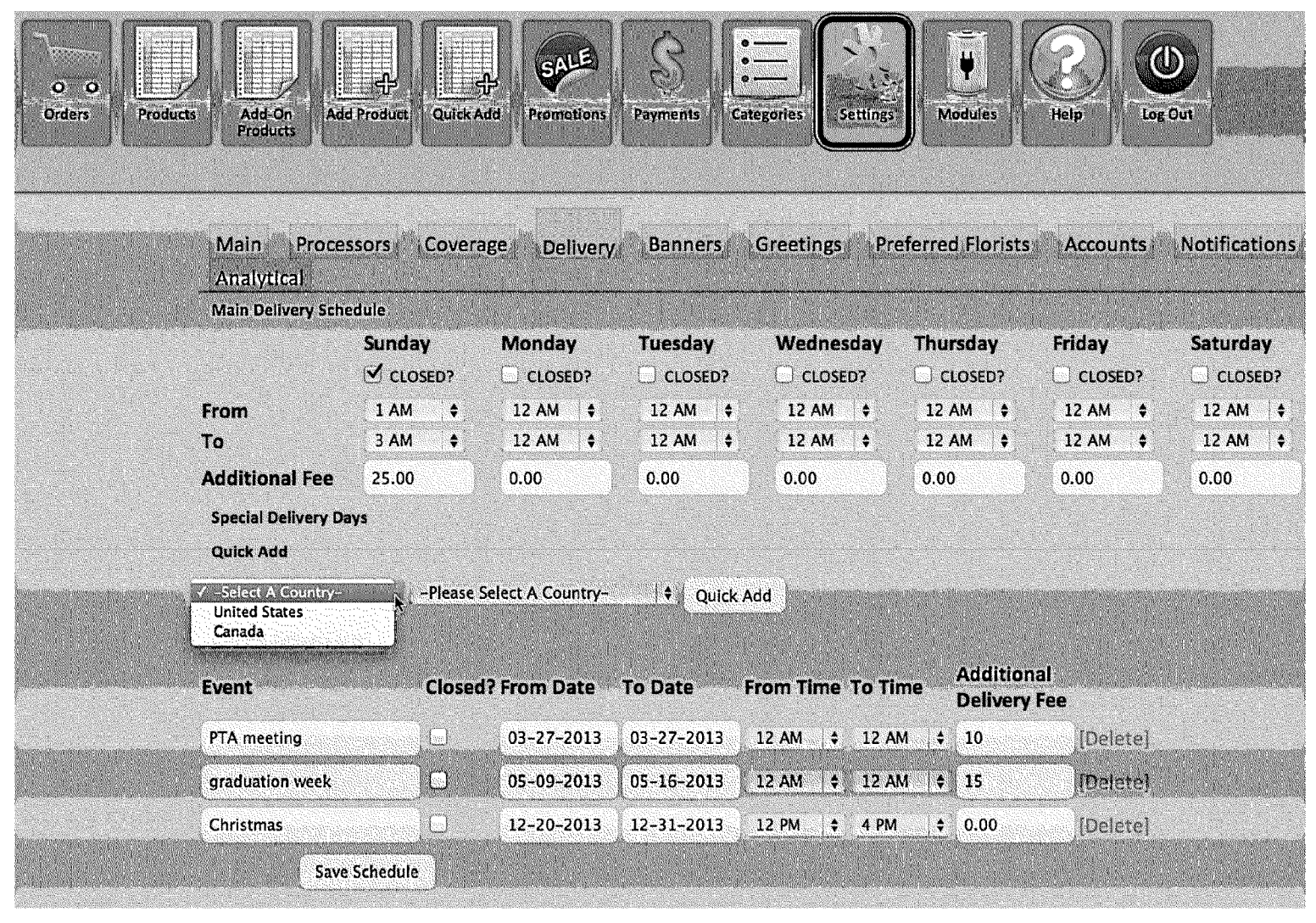

FIG. 16 shows how the merchant can also select countries or other geographical areas of service (e.g. US/Canada) using a pull down menu.

Rapid addition of new products to the ecommerce site using smartphones and ecommerce assistance apps: As previously discussed, the invention is also based, in part, on the insight that many local merchants are creative and innovative individuals who often have both the desire and ability to come up with various creative variations on otherwise standard products. However due to the cumbersome nature of present day ecommerce systems, the burden on the local merchant to customize the merchant's website to adequately showcase what otherwise might be a spontaneous creation tends to inhibit this creativity. For example, again using the floral industry as an example, a local florist may come up with a creative and cost effective new floral arrangement in a few minutes, but if the burden of advertising the new floral arrangement on the florist's ecommerce website is hours of work, then that new floral arrangement will never see the light of day. In another embodiment, the invention utilizes modern smartphone or mobile computerized tablet technology to provide easy to use apps that, in conjunction with the invention's calendar oriented server based platform, allow such a merchant to create a new product listing, complete with photographs, in a matter of a few minutes.

Figure 17:
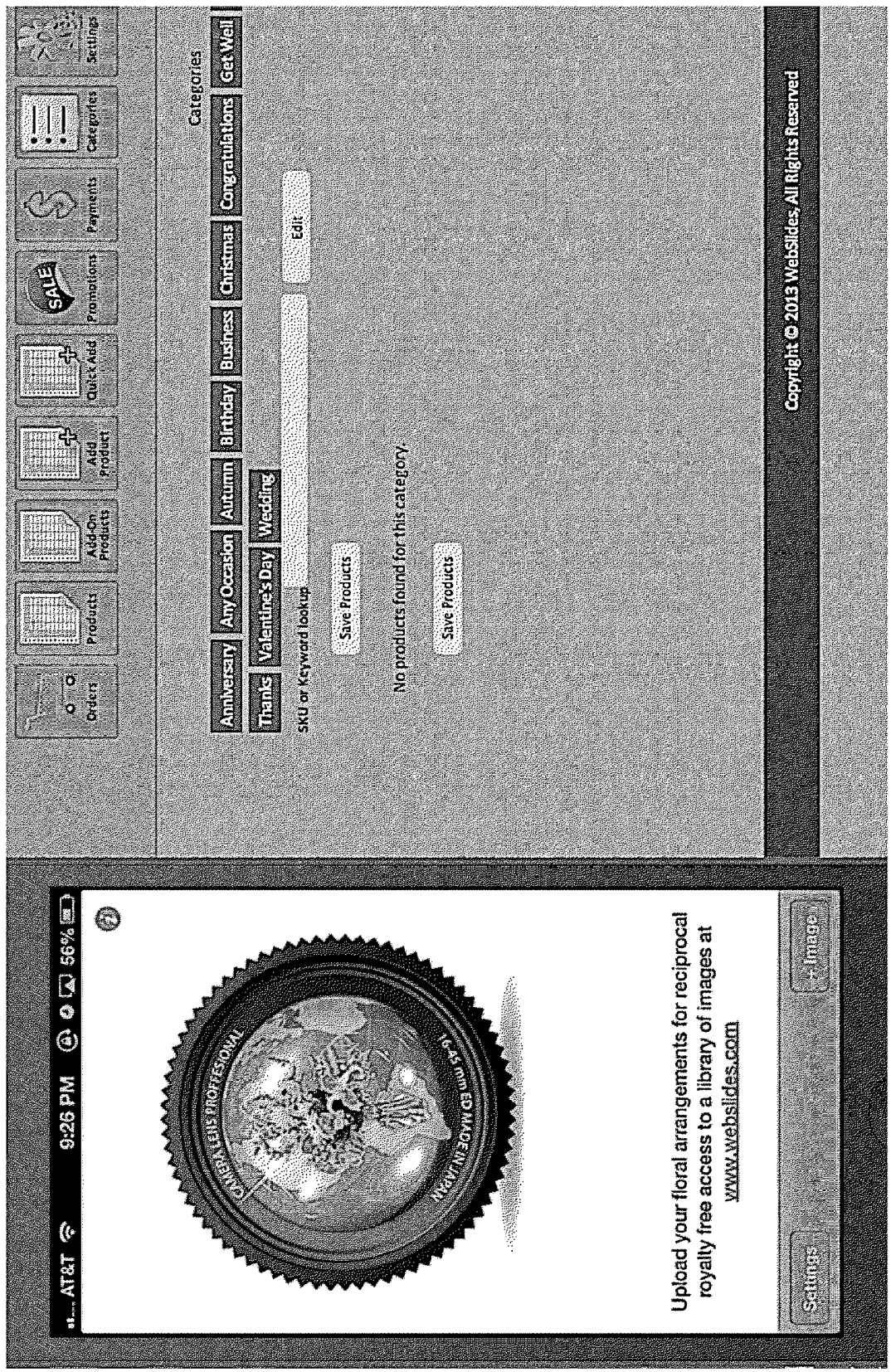
FIG. 17 shows how the merchant can use a smartphone or tablet app to photograph a product (such as a floral arrangement) and quickly upload the photo to the invention's ecommerce system. There the uploaded product photo can be rapidly incorporated into the merchant's online ecommerce site. Here the user is initializing the smartphone app.
Figure 18:
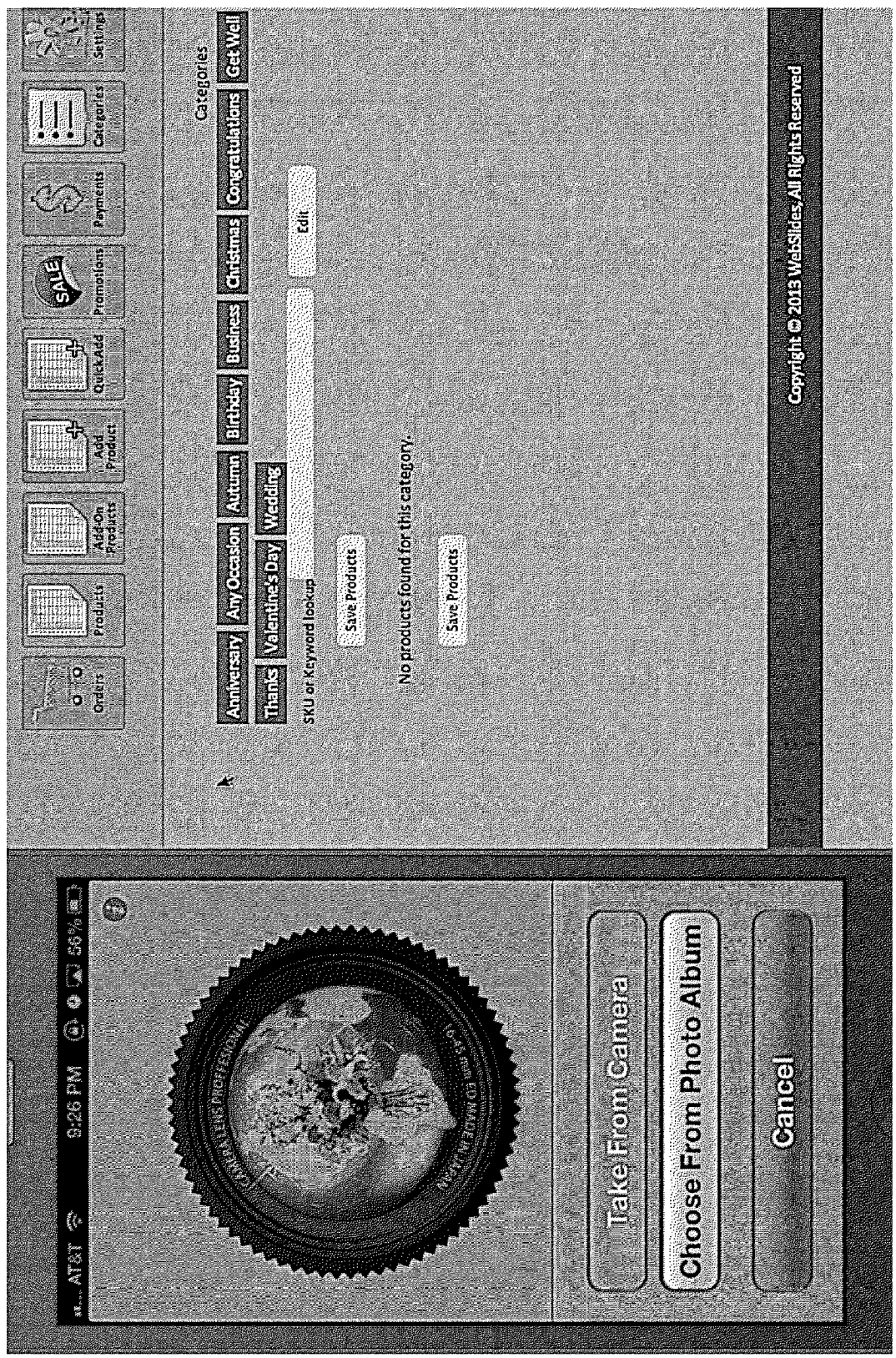
FIG. 18 shows how after the merchant has taken several photographs of the product, the merchant can then use the app to choose which photos to use from the smartphone or tablet's photo album.

FIG. 17 shows how the merchant can use a smartphone or tablet app to photograph a product (such as a floral arrangement) and quickly upload the photo to the system where the uploaded product photo can be rapidly incorporated into the merchant's online ecommerce site. Here the user is initializing the smartphone app FIG. 18 shows how after the merchant has taken several photographs of the product, the merchant can then use the app to choose which photos to use from the smartphone or tablets photo album.

Figure 19:
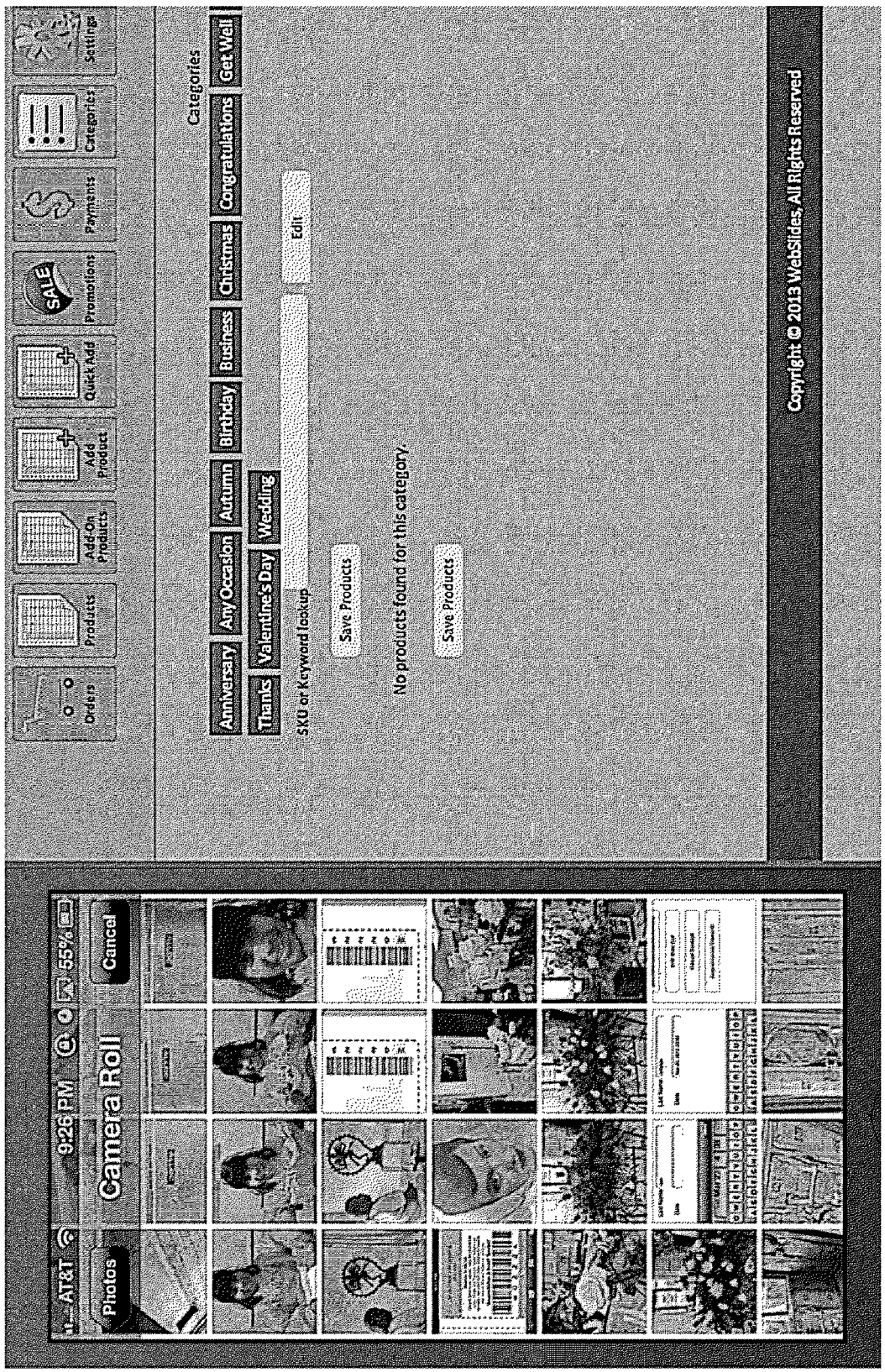
FIG. 19 shows the merchant looking through the smartphone's or tablet's photo album to find the best photo to upload for that particular product.

FIG. 19 shows the merchant looking through the smartphone's or tablet's photo album to find the best photo to upload for that particular product.

Figure 20:
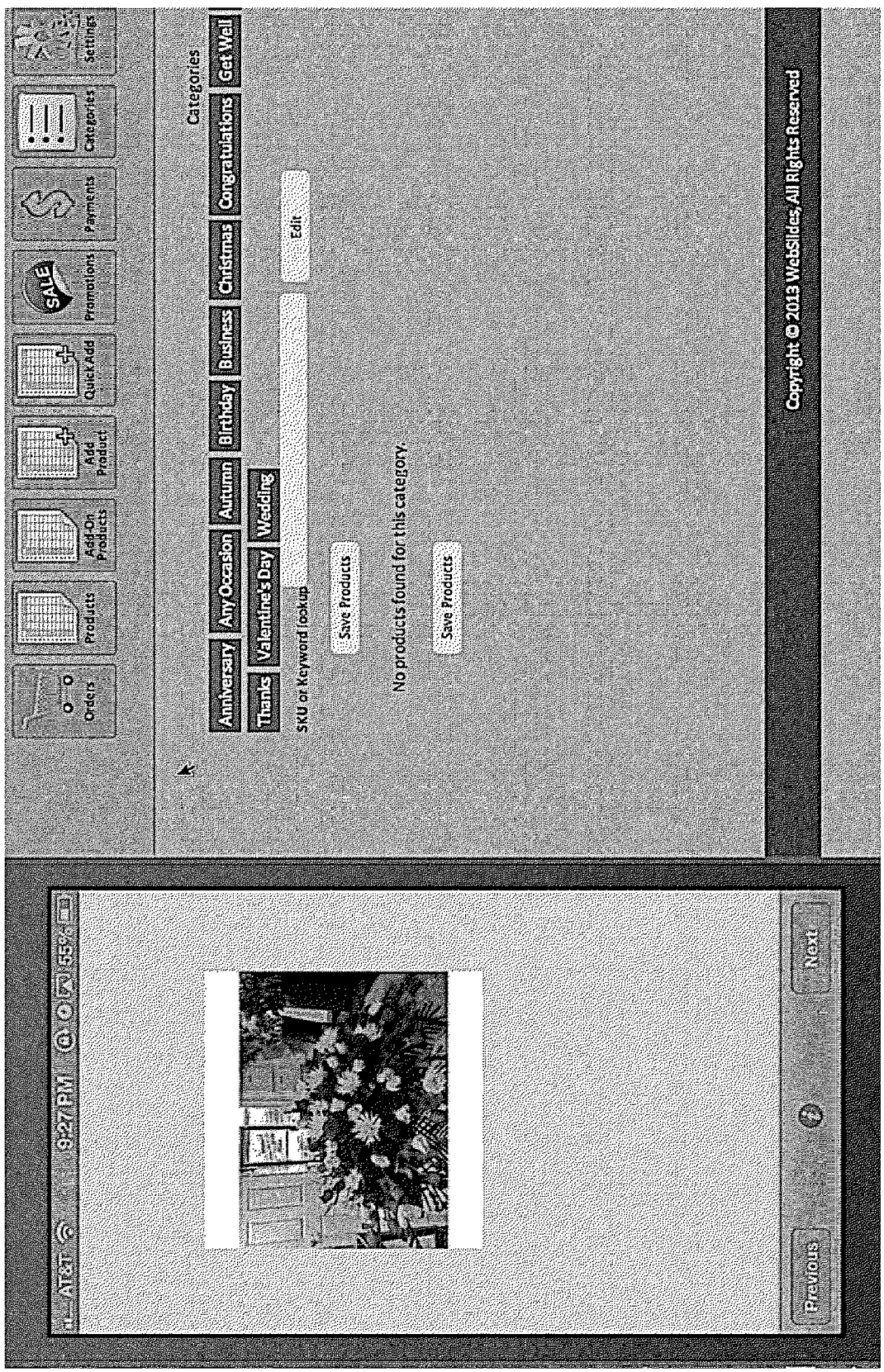
FIG. 20 shows that the merchant has selected the best photo from the photo album, and now can upload it to the invention's ecommerce system.

FIG. 20 shows that the merchant has selected the best photo from the photo album, and now can upload it to the system.

Figure 21:
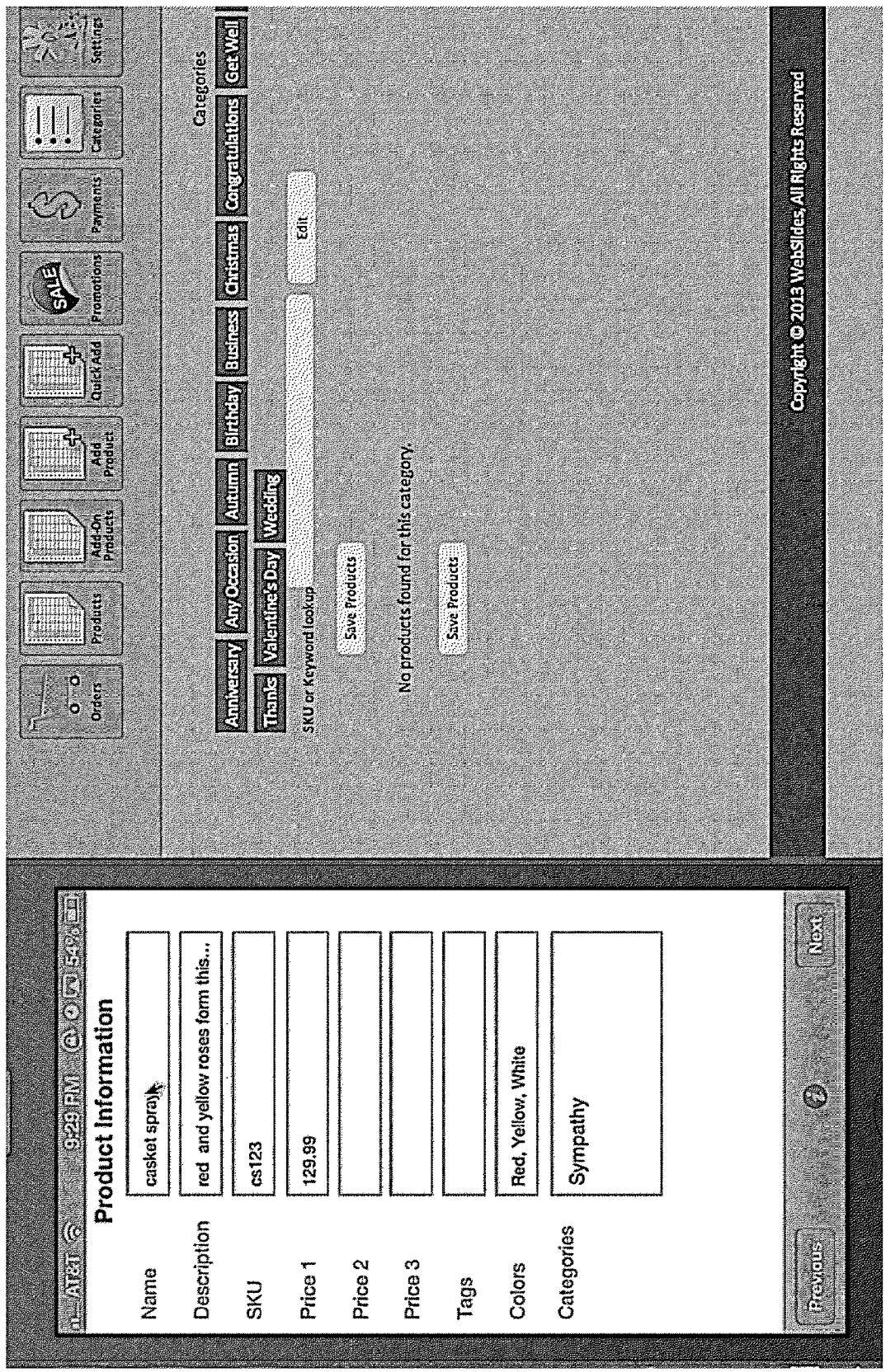
FIG. 21 shows that the merchant can also use the tablet or smartphone app to enter in a partial or full description of the product associated with the photo.

FIG. 21 shows that the merchant can also use the tablet or smartphone app to enter in a partial or full description of the product associated with the photo.

Figure 22:
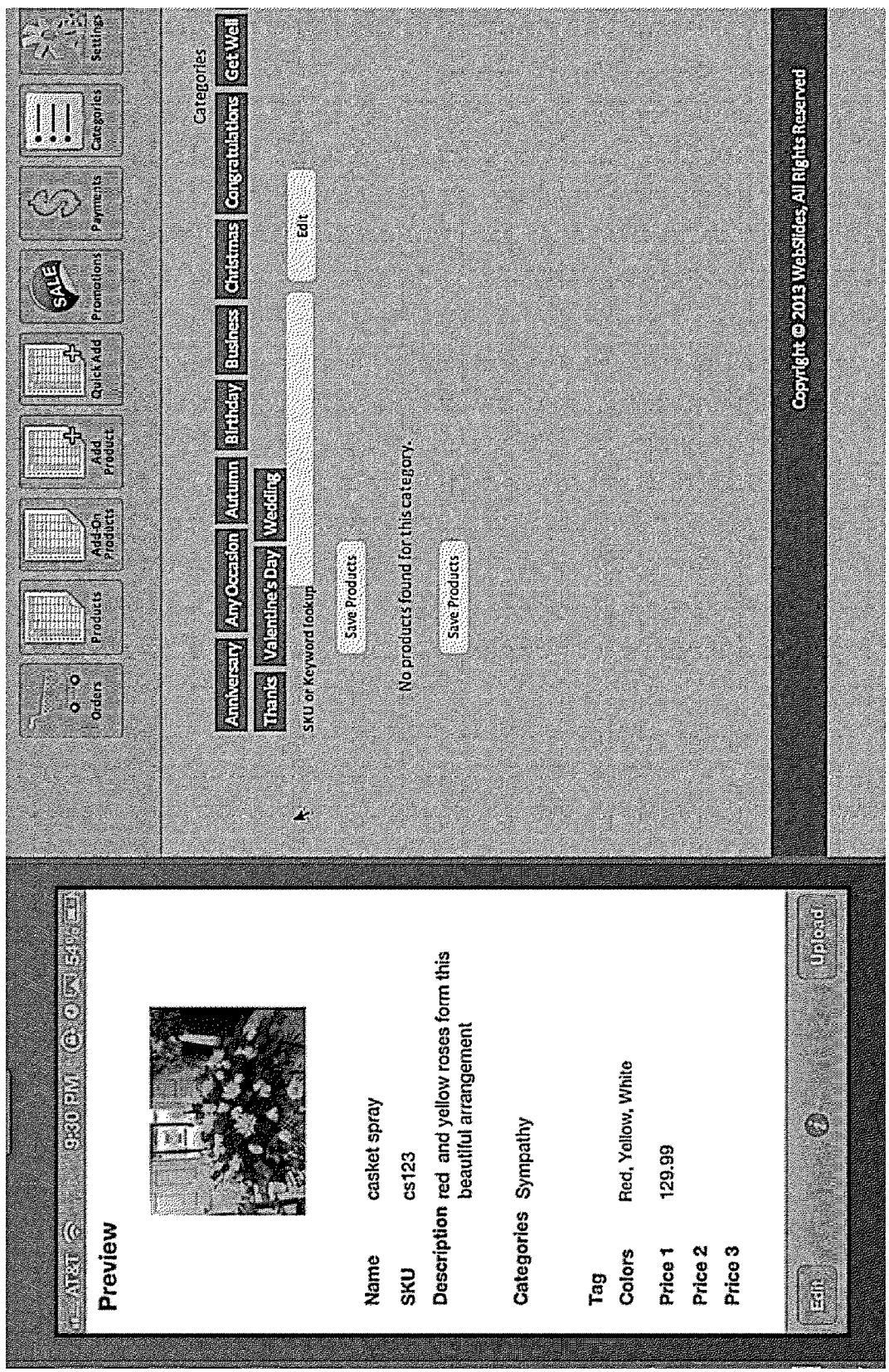
FIG. 22 shows that the merchant now has used the smartphone or tablet app to both select the product photo and enter in other product information.

FIG. 22 shows the merchant now has used the smartphone or tablet app to both select the product photo and enter in other product information.

Figure 23:
FIG. 23 shows that the merchant has now uploaded the product photo and description to the system.

FIG. 23 shows that the merchant has now uploaded the product photo and description to the system.

Figure 24:
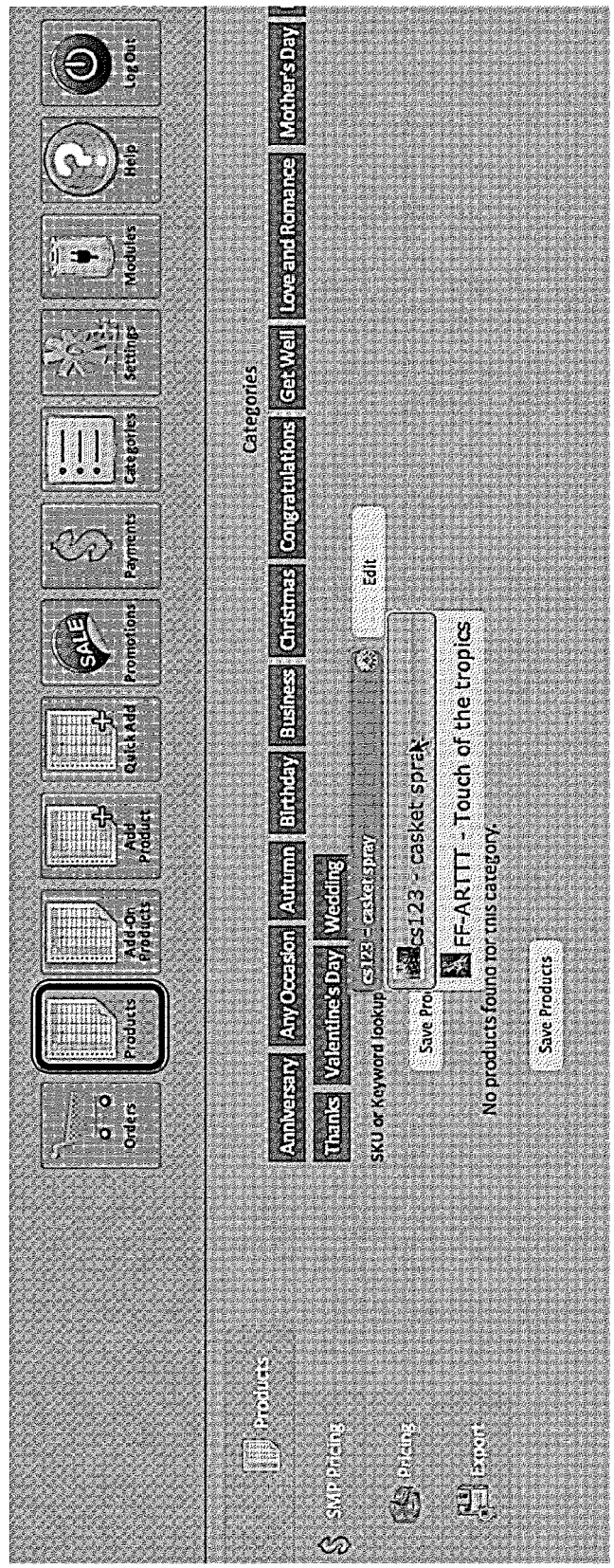
FIG. 24 shows the main system interface by which the merchant can now interact with the uploaded product photo and description.

FIG. 24 shows the main system interface by which the merchant can now interact with the uploaded product photo and description.

Figure 25:
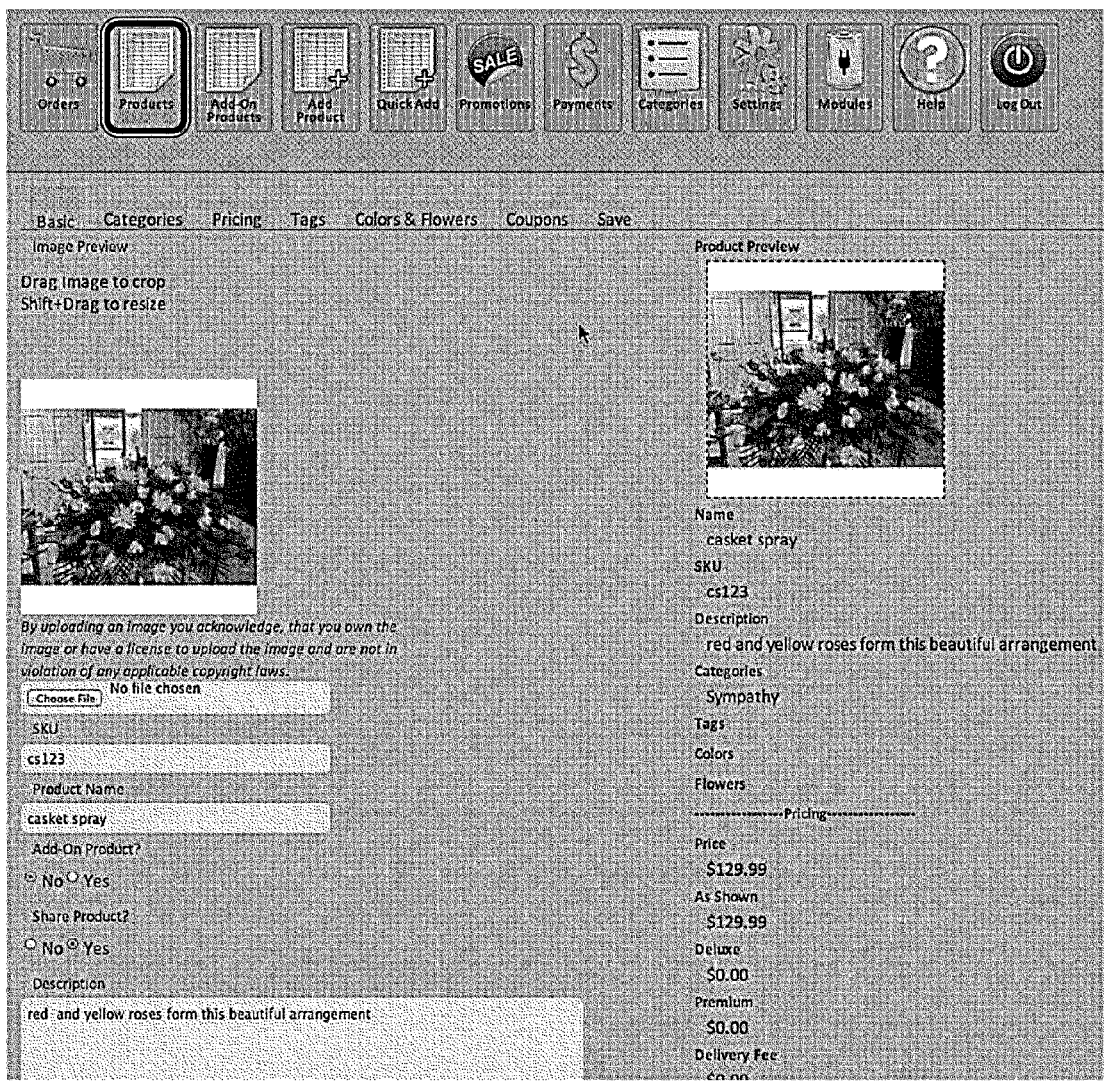
FIG. 25 shows the product photo and description that was previously uploaded by the merchant from their smartphone or tablet app. The merchant may optionally further adjust the photo or product description using the web browser based system interface as desired.

FIG. 25 shows the product photo and description that was previously uploaded by the merchant from their smartphone or tablet app. The merchant may further adjust the photo or product description using the main system interface as desired.

Easy formation of ecommerce networks with other participating merchants: As previously discussed, the invention is also based, in part, on the insight that local merchants often need to cooperate either with other local merchants or artisans, or with more distant merchants and artisans. For example, a local florist and a local baker may find it advantageous to cross promote each other's products and services on each other's websites so that, for example, a purchaser who wishes to send a gift of flowers could also have a cake delivered at the same time, and vice versa. Additionally, again using the floral industry as an example, more distant florists may wish to join forces to form their own network of connected floral services that can operate with little or no additional overhead (i.e. little or no middleman fees). Such low cost networks of otherwise local merchants can often operate quite efficiently due to the lack of middleman fees. At the same time, by joining forces, a merchant, such as a florist, in one area of the country can send business to another merchant (i.e. another florist) in another area of the country, pocket a decent commission for this, yet without middleman fees, enough money remains that the distant merchant can still provide a high quality requested product at a satisfactory profit margin as well. In another embodiment, the invention also provides an easy to implement system and method to allow formation of such cooperative networks. As a result, everyone, purchaser, first merchant, second merchant, and recipient is more likely to be satisfied due to the high efficiency and lack of middleman costs of the system.

Thus in another embodiment of the invention, the invention's internet based server platform is designed to allow merchants to easily form networks that allow them to automatically transfer orders to other preferred networks without paying any additional costs or overhead. The system may additionally implement a backup order system to non-preferred merchants using conventional fax, email, phone or SMS messages as well.

To elaborate, for the gifts industry, often customers wish to contact a local merchant and have the local merchant in turn work with a more distant affiliate merchant to deliver gifts, for example in a distant city and country. Here the cost structures should be appreciated. To do this, the local merchant will desire to have some commission, and of course the distant merchant, who will also wish to make a decent profit after delivery charges are factored in, will also desire to make a profit. Any additional funding drain from the system, for example to a web based middle man service, will end up decreasing merchant profit, or decreasing the value of the gift. Thus in another embodiment of the invention, the invention allows participating merchants to set up their own zero or at least low transaction fee network in which merchants can accept orders from customers, and relay the order to other more appropriately located merchants, with the assurance that the order will be carried out appropriately and that the profit margins and quality of the gift will not suffer.

Figure 26:
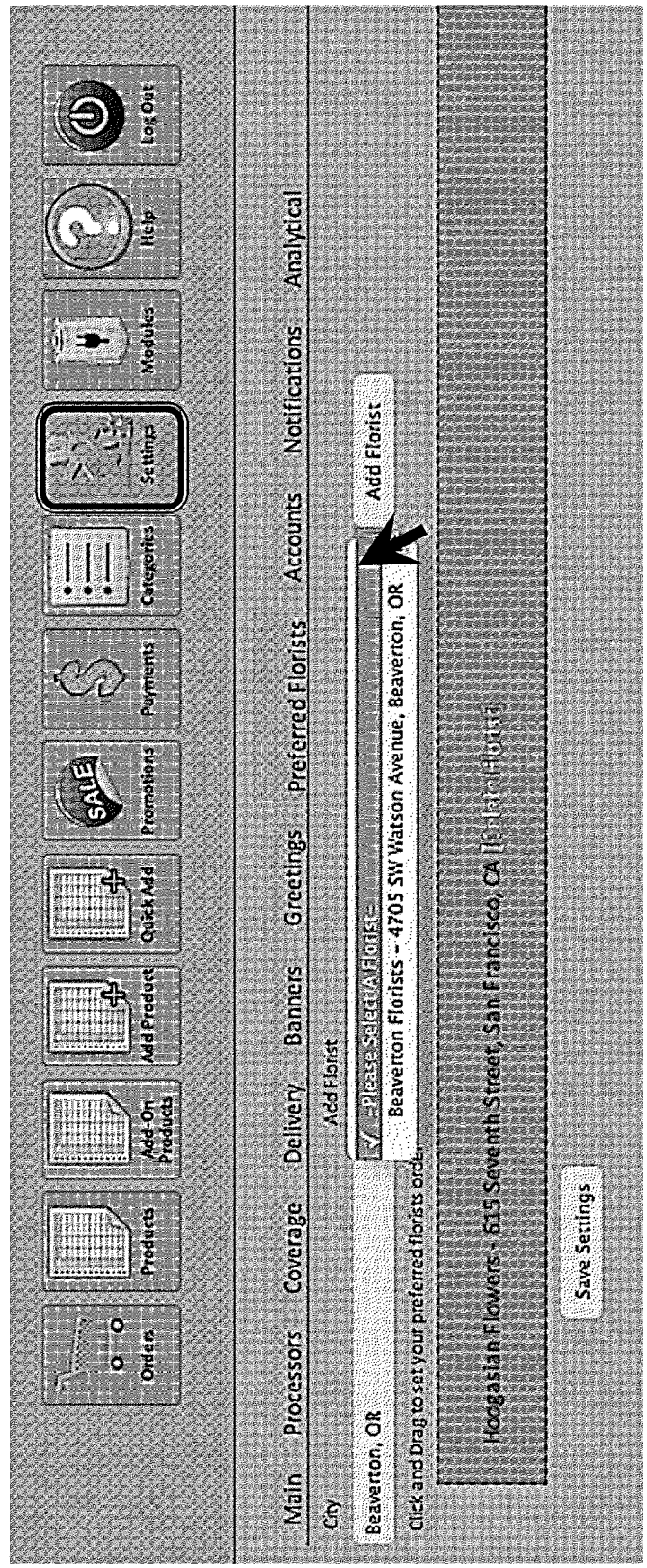
FIG. 26 shows how the merchant, again in the settings section, can also add a network link to another preferred florist.

FIG. 26 shows how the merchant, again in the settings section, can also add a network link to another preferred florist.

Figure 27:
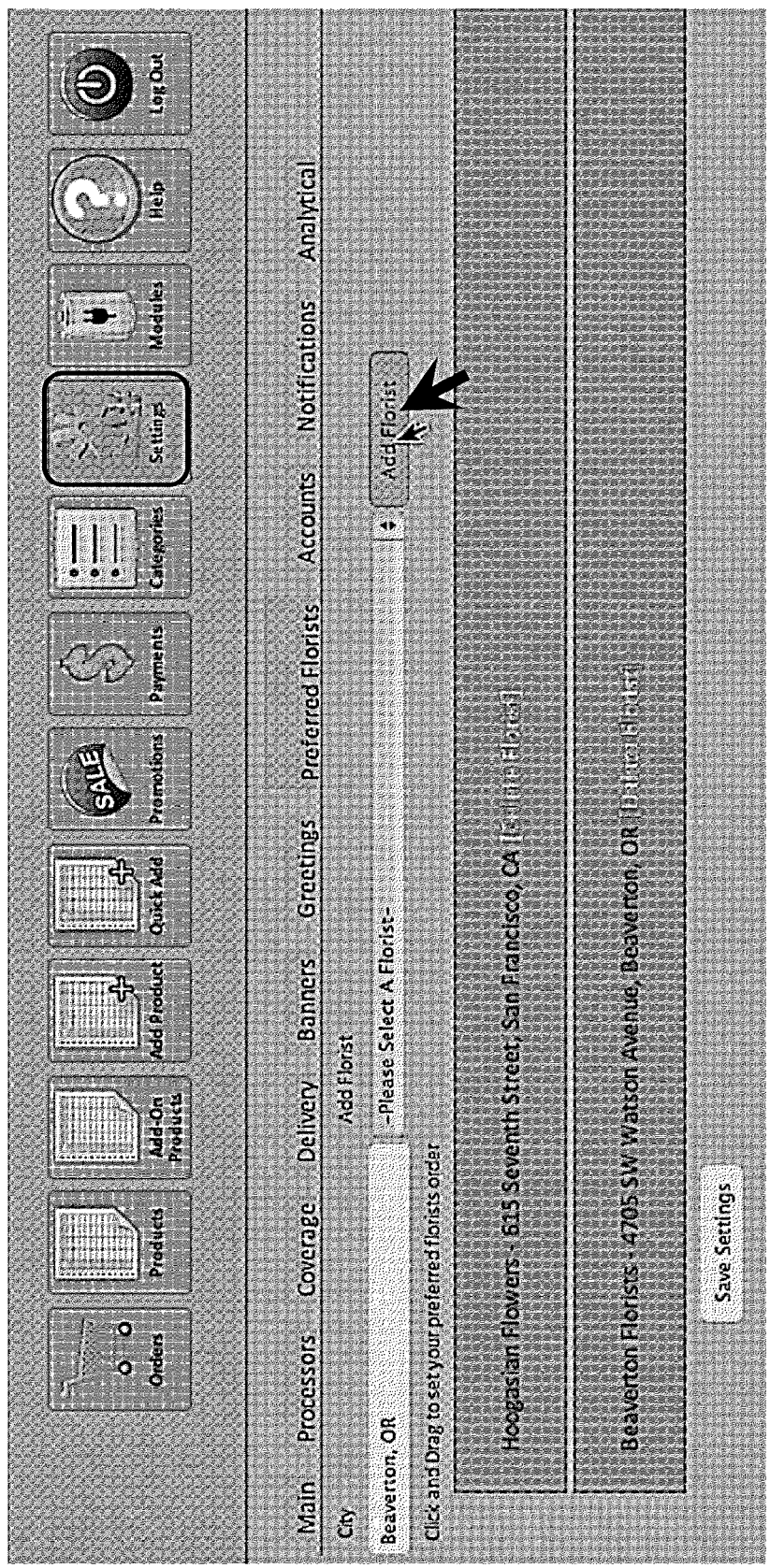
FIG. 27 shows the merchant continuing to add additional florists to that merchant's own preferred florist network, thus building up a unique network of favored florist partners.

FIG. 27 shows the merchant continuing to add additional florists to that merchant's own preferred florist network, thus building up a unique network of favored florist partners.

Figure 28:
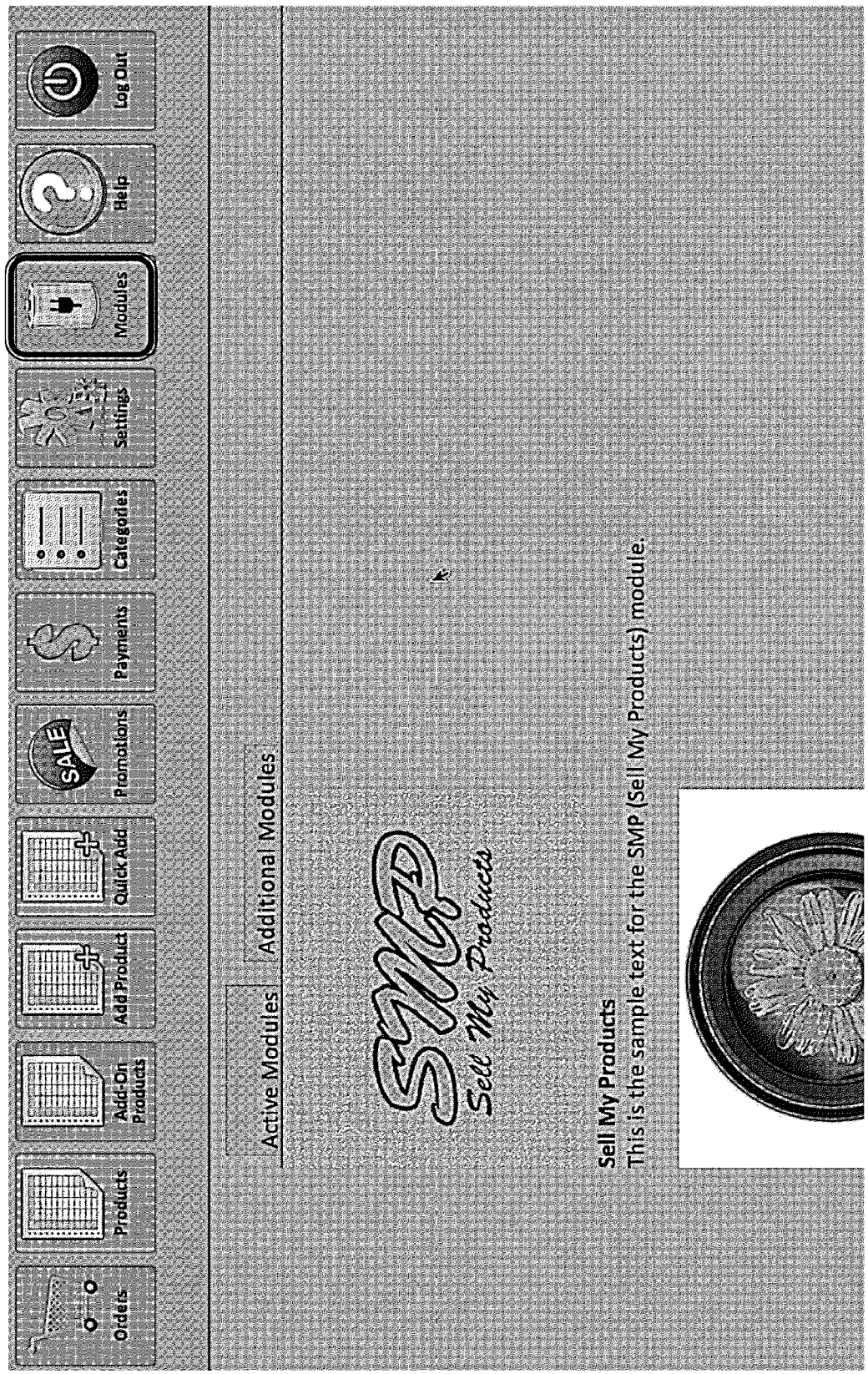
FIG. 28 shows the merchant now operating the system's "Sell My Products" (SMP) section to enter in information about that merchant's products that the merchant wishes to expose to other participating merchants on the invention's merchant network.

FIG. 28 shows the merchant now operating the sell my products (SMP) section to enter in information about that merchant's products. In some embodiments, this information can then be automatically transferred to another merchant's website when needed. For example, with regards to FIG. 1, if merchant M2 enters some of his products into the system, then this information may automatically be made available to merchant M1 when needed.

The invention's sell my product (SMP) option also allows non-merchant artisans, who may produce complementary products, but who do not wish to sell them directly to the public, to also network in with willing merchant and display the artisan's products as well, even though the artisan does not have its own merchant website or store.

Figure 29:
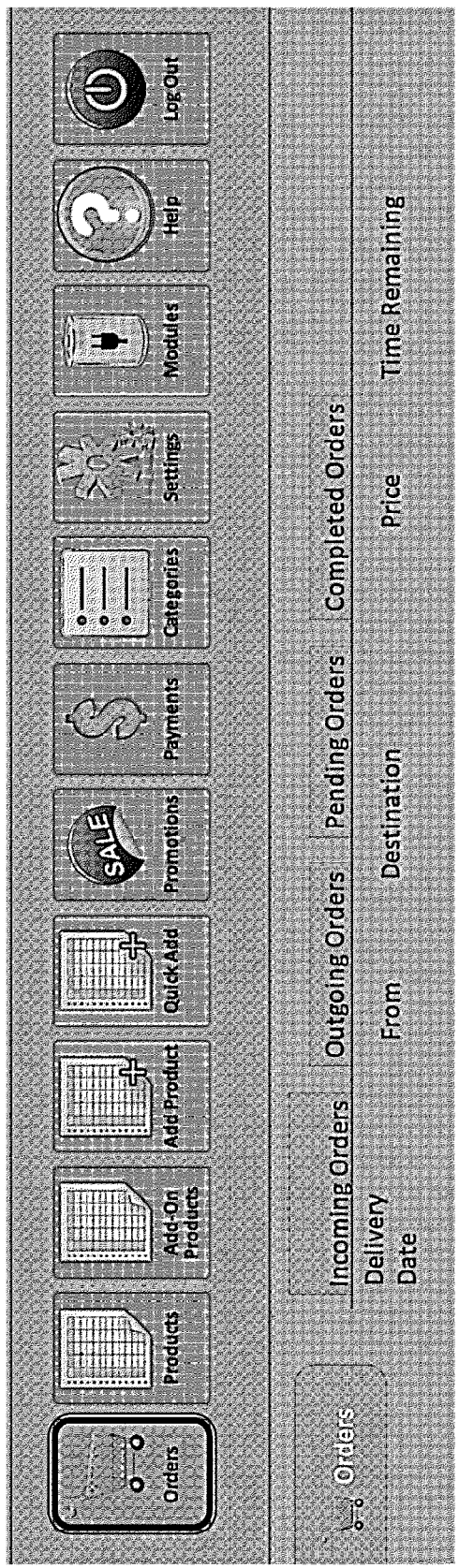
FIG. 29 shows a close up of the orders portion of the network system.

FIG. 29 shows a close up of the orders portion of the system.

Figure 30:
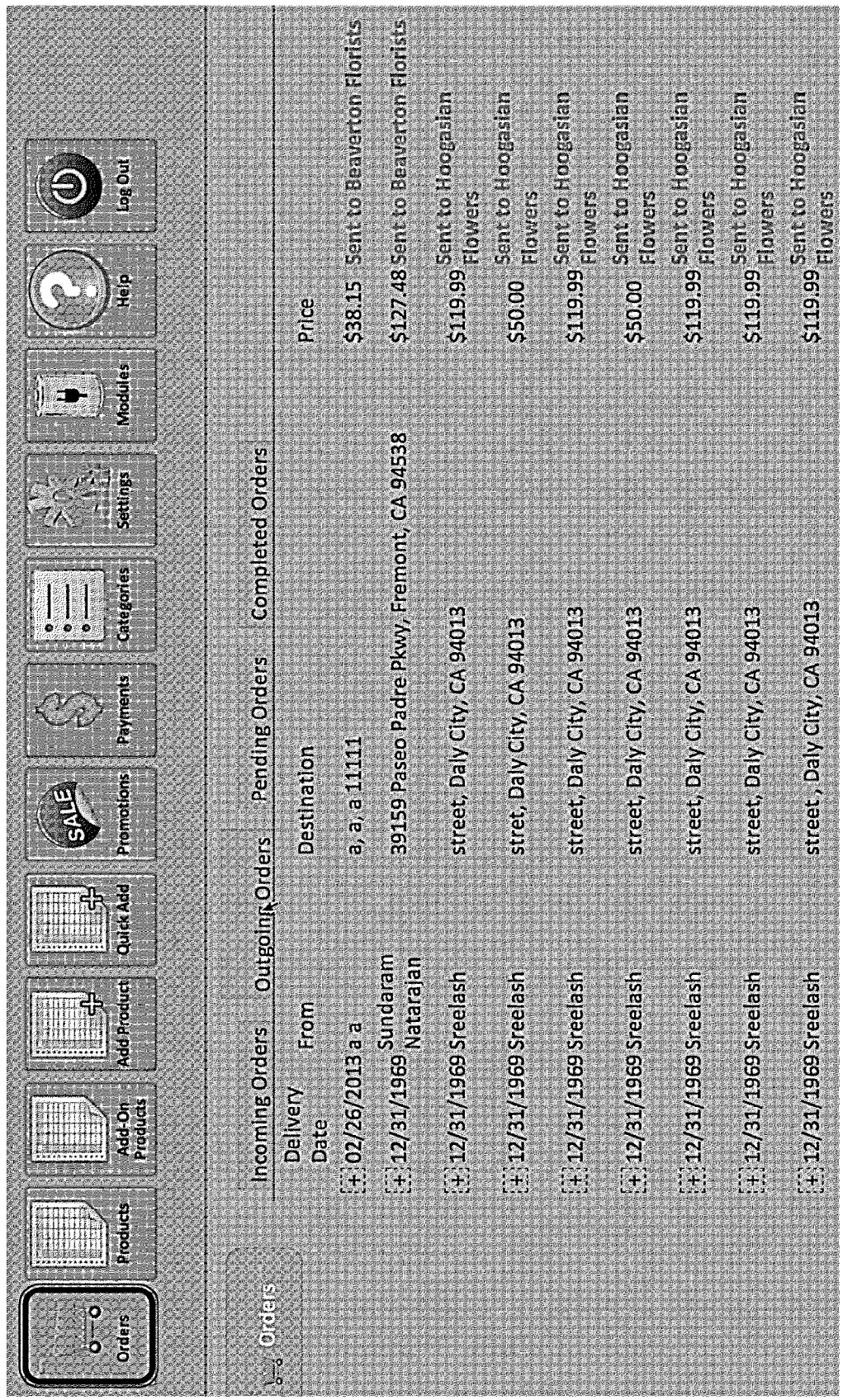
FIG. 30 shows how the merchant can review the system record of the merchant's various outgoing network orders.
Figure 31:
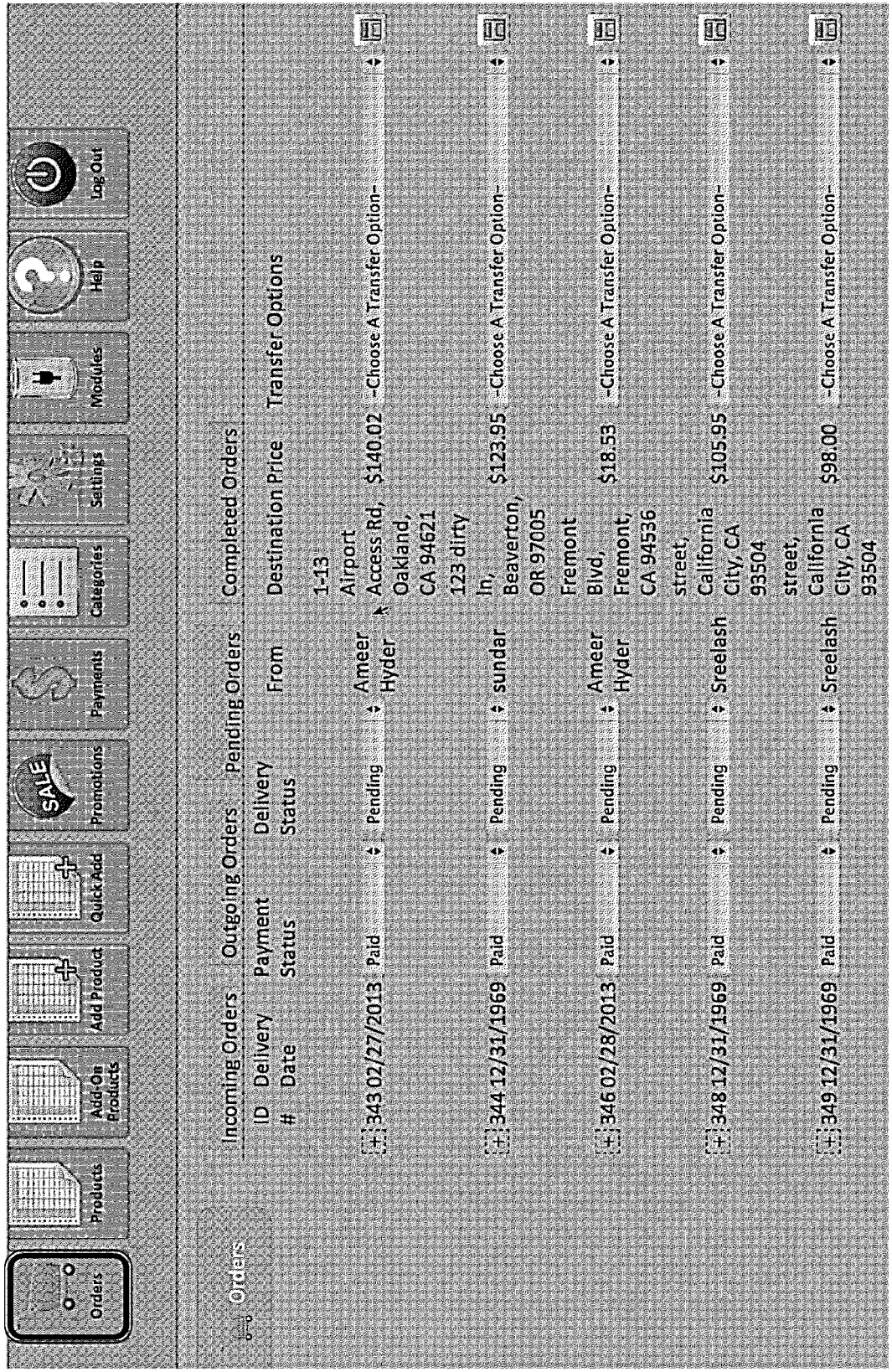
FIG. 31 shows how the merchant can review the system record of various pending merchant network orders.

FIG. 30 shows how the merchant can review the system record of the merchant's various outgoing orders FIG. 31 shows how the merchant can review the system record of various pending orders.

Figure 32:
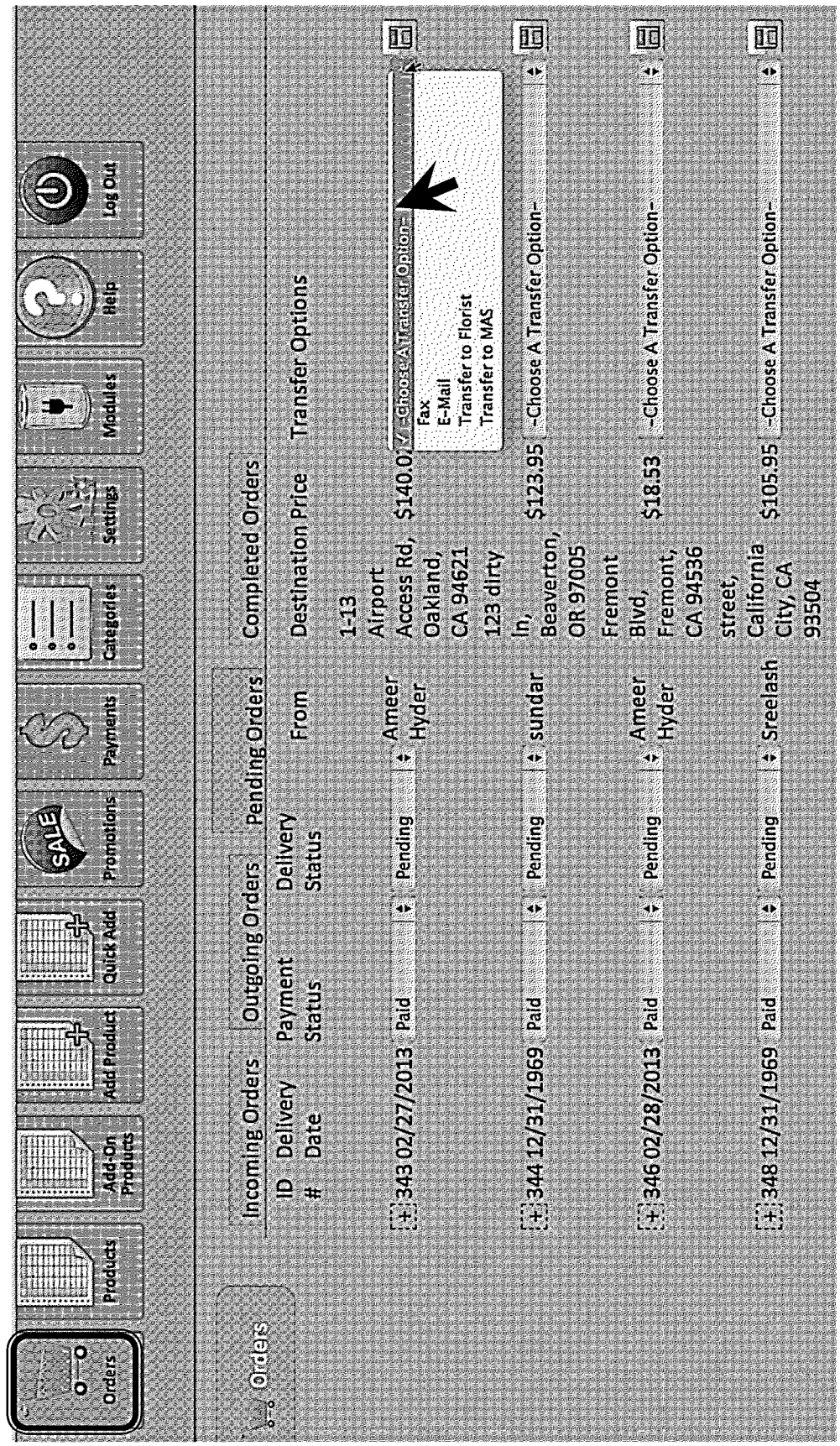
FIG. 32 shows how the initiating merchant can adjust how the various pending network orders are transmitted to another recipient merchant. Here various options such as transmit by fax, email, electronic transfer to the florist via the system, or transfer to the MAS system can be selected using a drop down menu.

FIG. 32 shows how the initiating merchant can adjust how the various pending orders are transmitted to the recipient merchant. Here various options such as transmit by fax, email, electronic transfer to the florist via the system, or transfer to an outside system (such as MASdirect, Dallas, Tex.) can be selected using a drop down menu.

Figure 33:
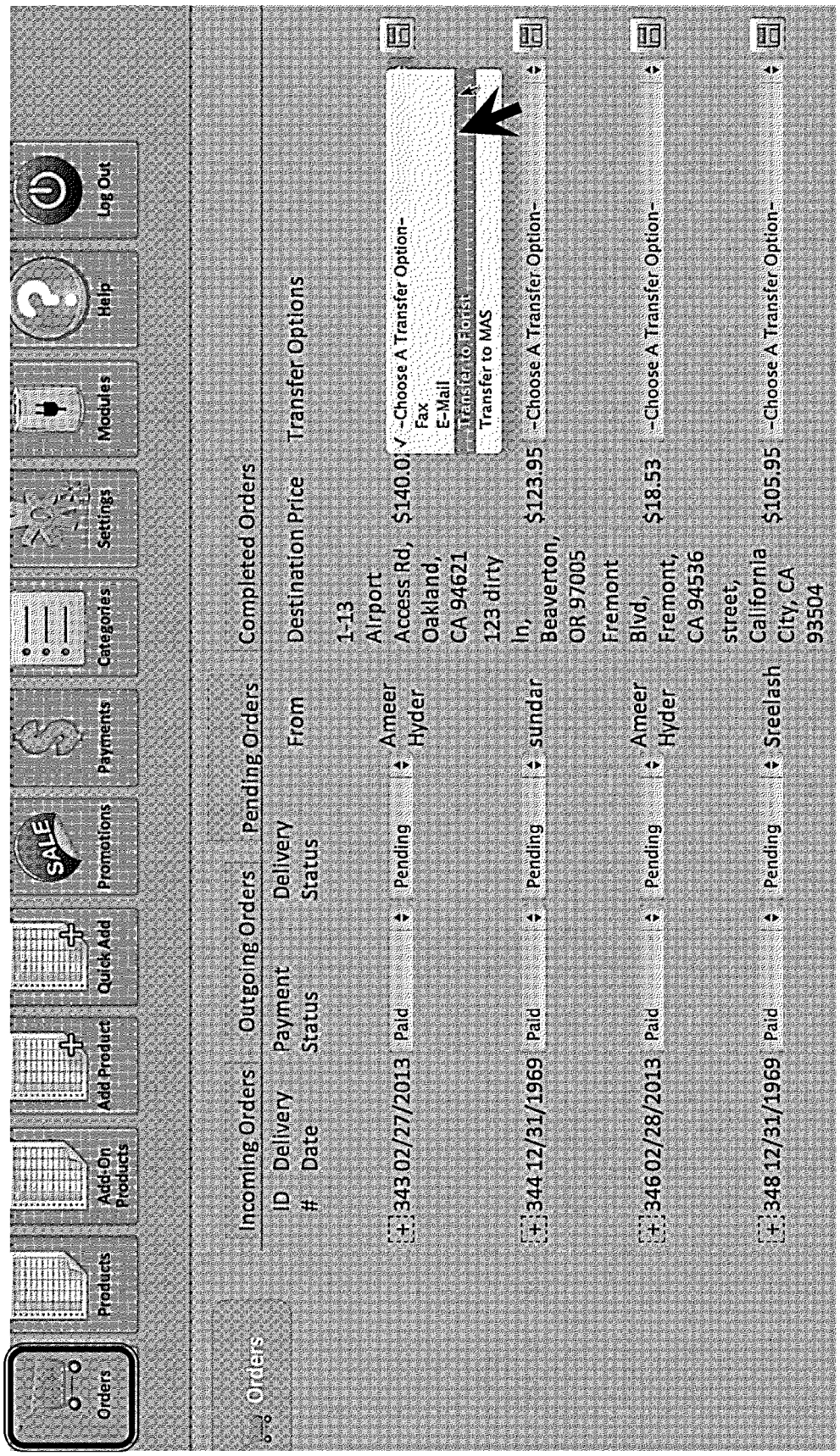
FIG. 33 shows the initiating merchant electing to have the system transfer the pending network order to the recipient merchant via the system's electronic transfer to florist option.

FIG. 33 shows the initiating merchant electing to have the system transfer the pending order to the recipient merchant via the system's electronic transfer to florist option.

Figure 34:
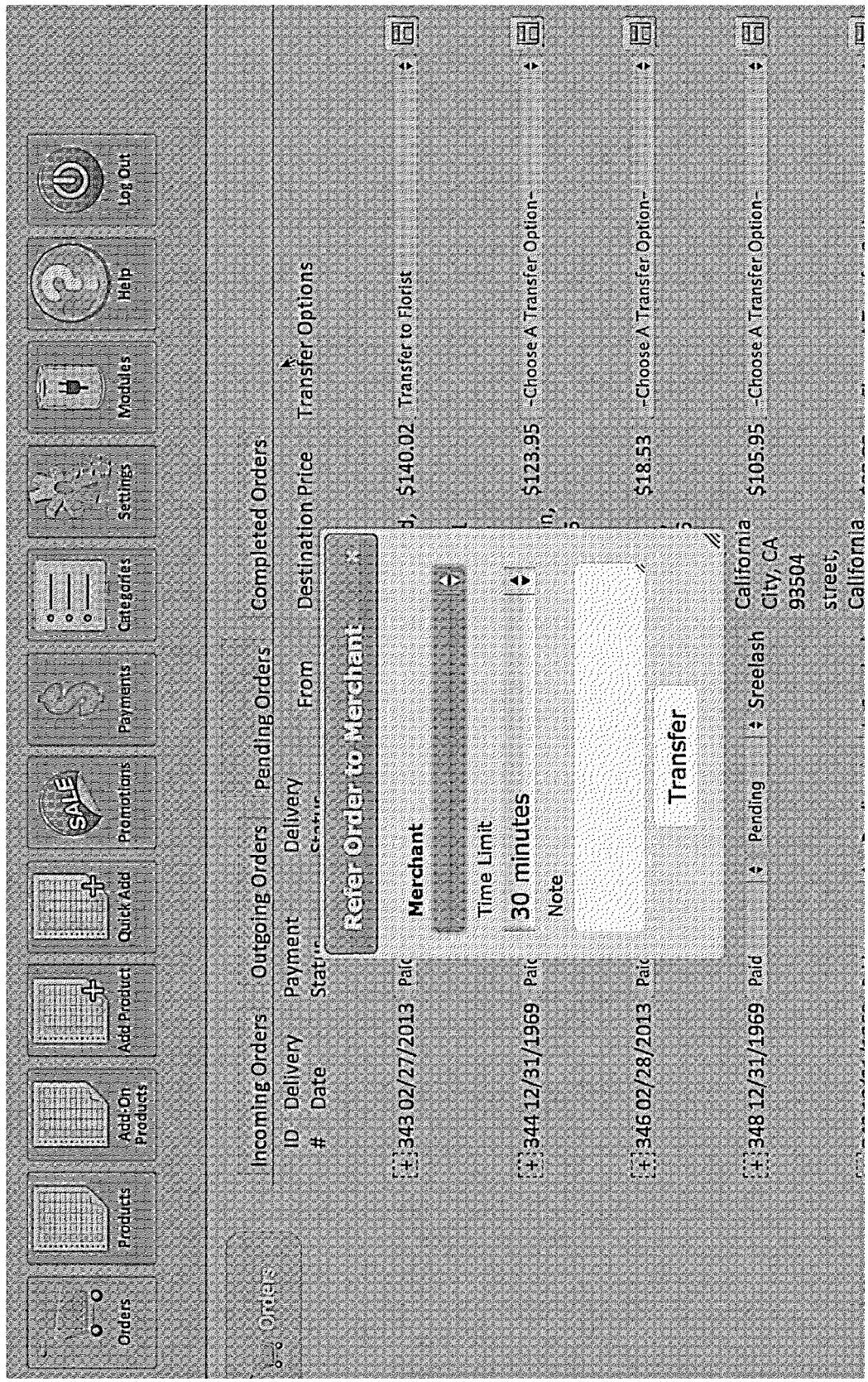
FIG. 34 shows that the initiating merchant can also set a time limit in which to transfer the order to the network recipient merchant.

FIG. 34 shows that the initiating merchant can also set a time limit in which to transfer the order to the recipient merchant.

Figure 35:
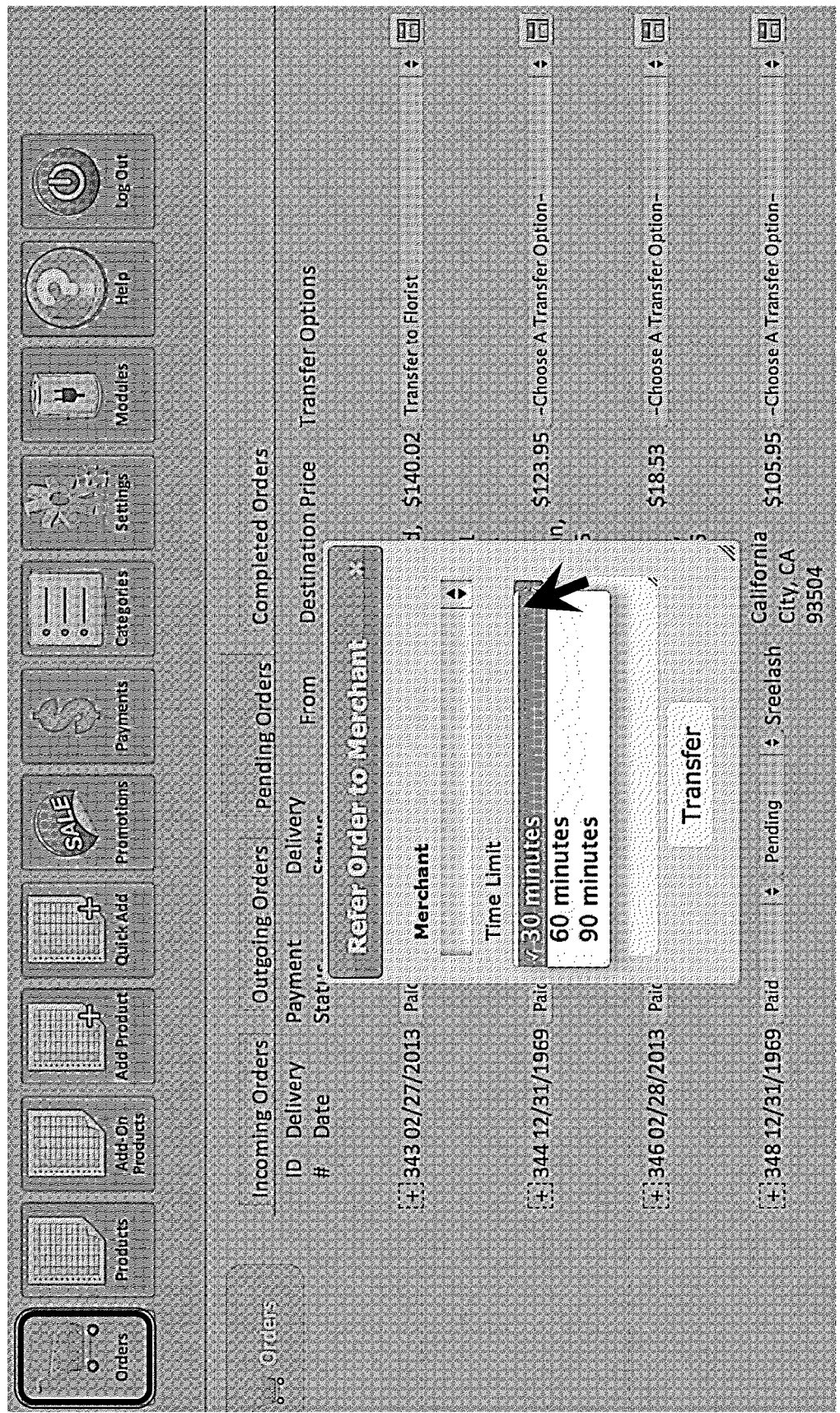
FIG. 35 shows the merchant here instructing the system that it must receive confirmation from the network recipient merchant within 30 minutes of placing the order, or else timeout.

FIG. 35 shows the merchant here instructing the system that it must receive confirmation from the recipient merchant within 30 minutes of placing the order, or else timeout.

Figure 36:
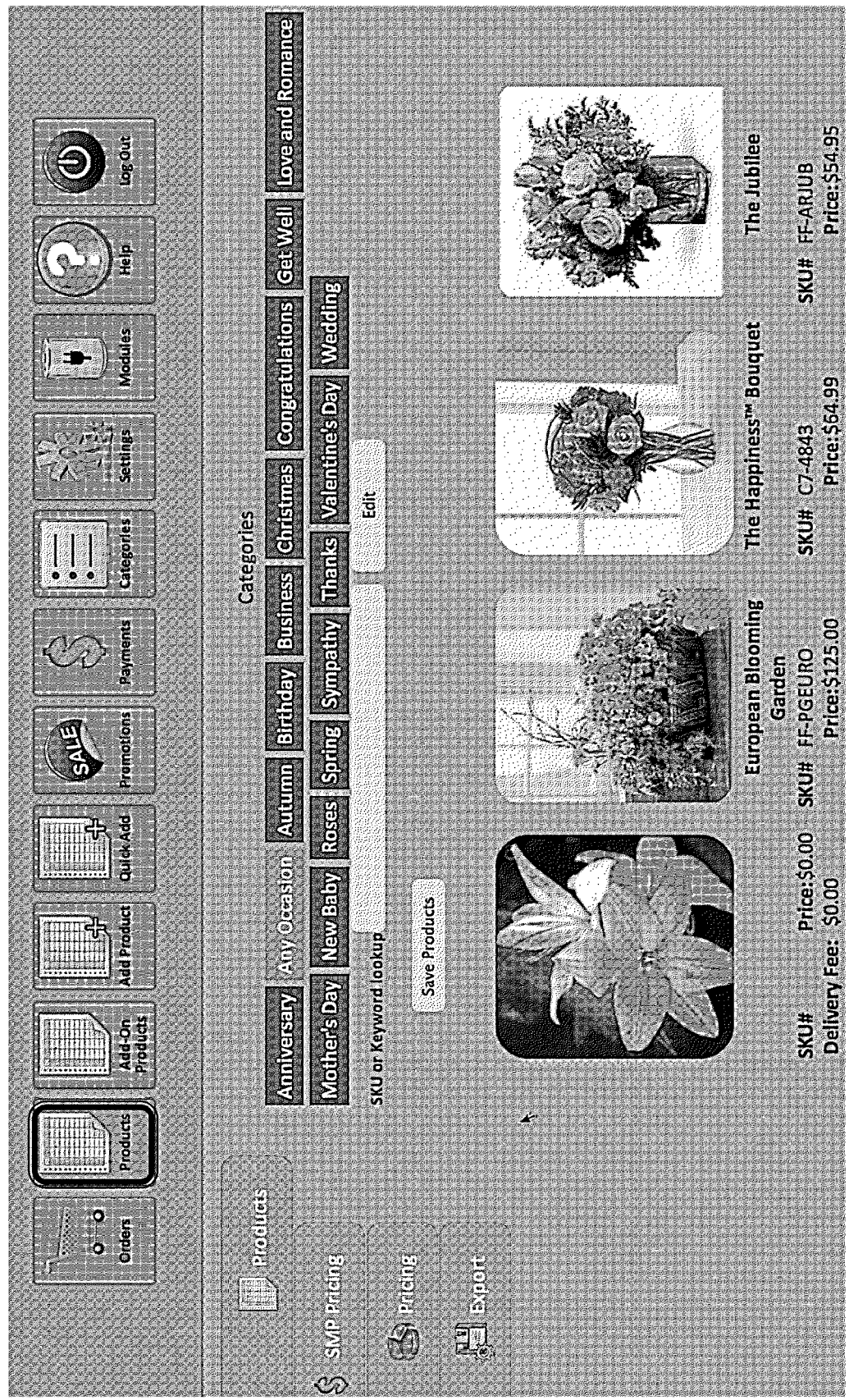
FIG. 36 shows the system's merchant products configuration interface.

FIG. 36 shows the merchant products configuration interface.

Figure 37:
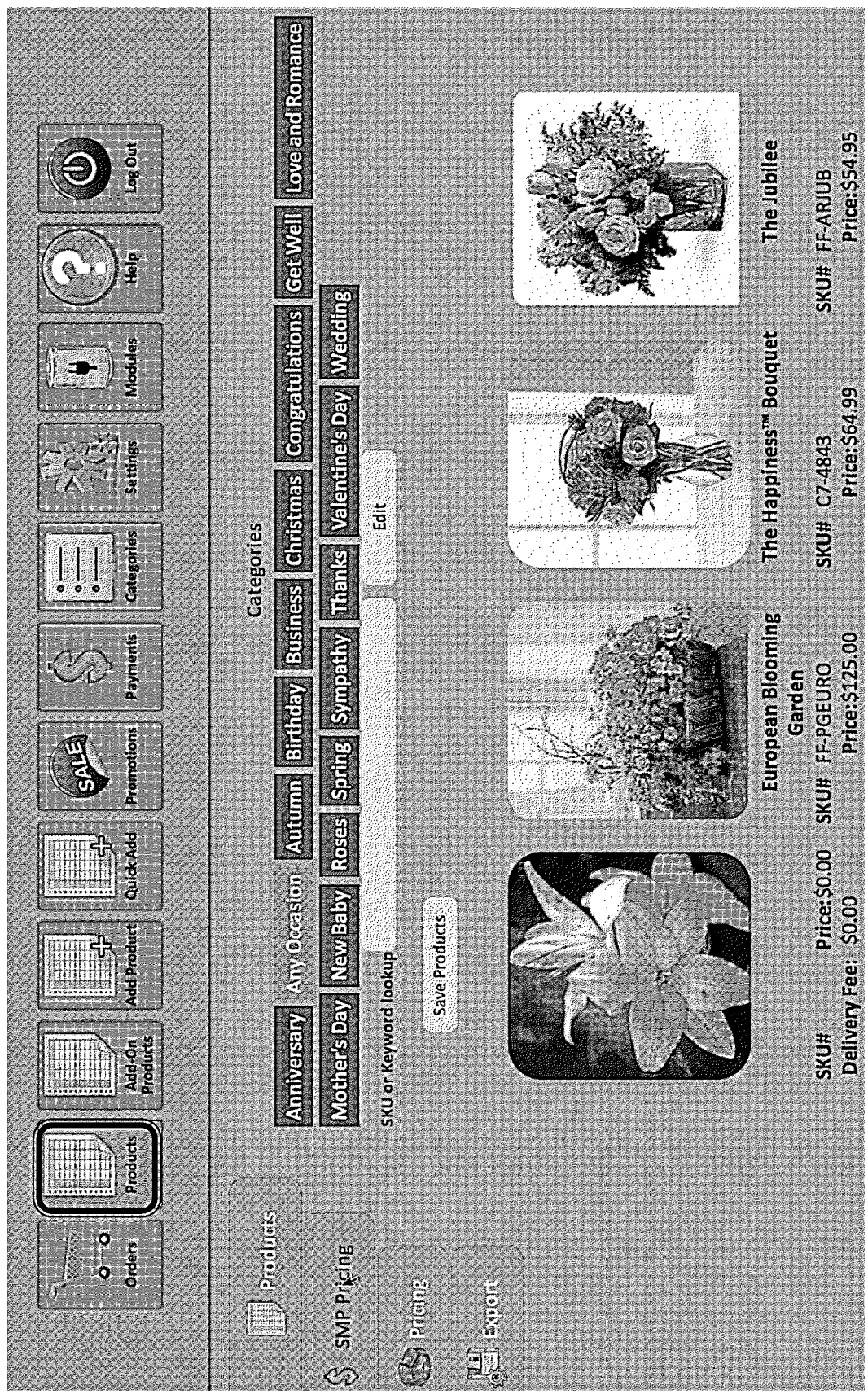
FIG. 37 shows the merchant adjusting the SMP (sell my products price) pricing for their various network sales of floral arrangements.

FIG. 37 shows the merchant adjusting the SMP (sell my products price) pricing for their various floral arrangements.

Figure 38:
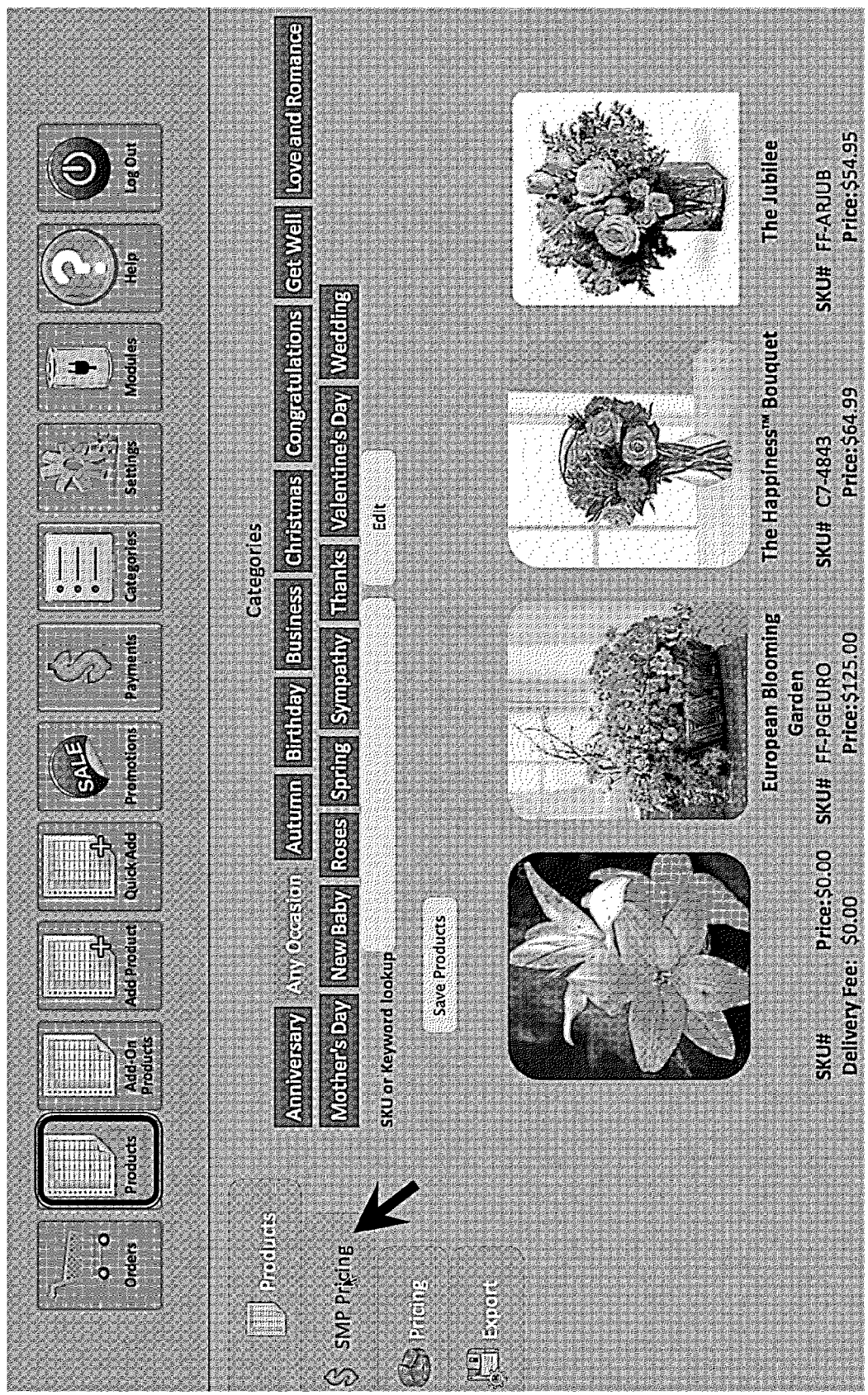
FIG. 38 shows the merchant further adjusting the SMP (sell my products price) pricing for their various network sales of floral arrangements.

FIG. 38 shows the merchant further adjusting the SMP (sell my products price) pricing for their various floral arrangements.

Figure 39:
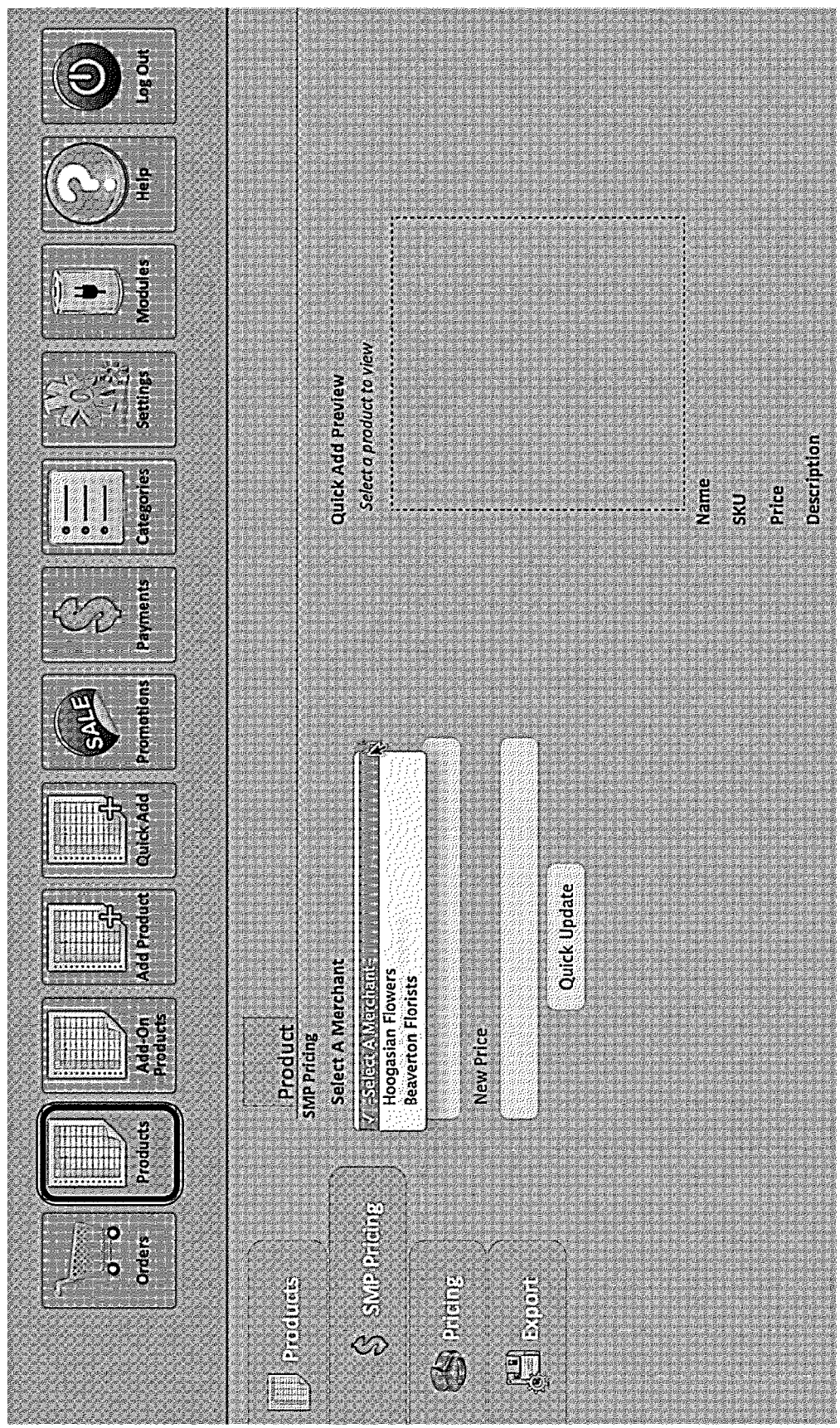
FIG. 39 shows the initiating merchant updating the system to show a floral arrangement that is provided by a partner network receiving merchant, along with pricing information.

FIG. 39 shows the initiating merchant updating the system to show a floral arrangement that is provided by a partner receiving merchant, along with pricing information.

Figure 40:
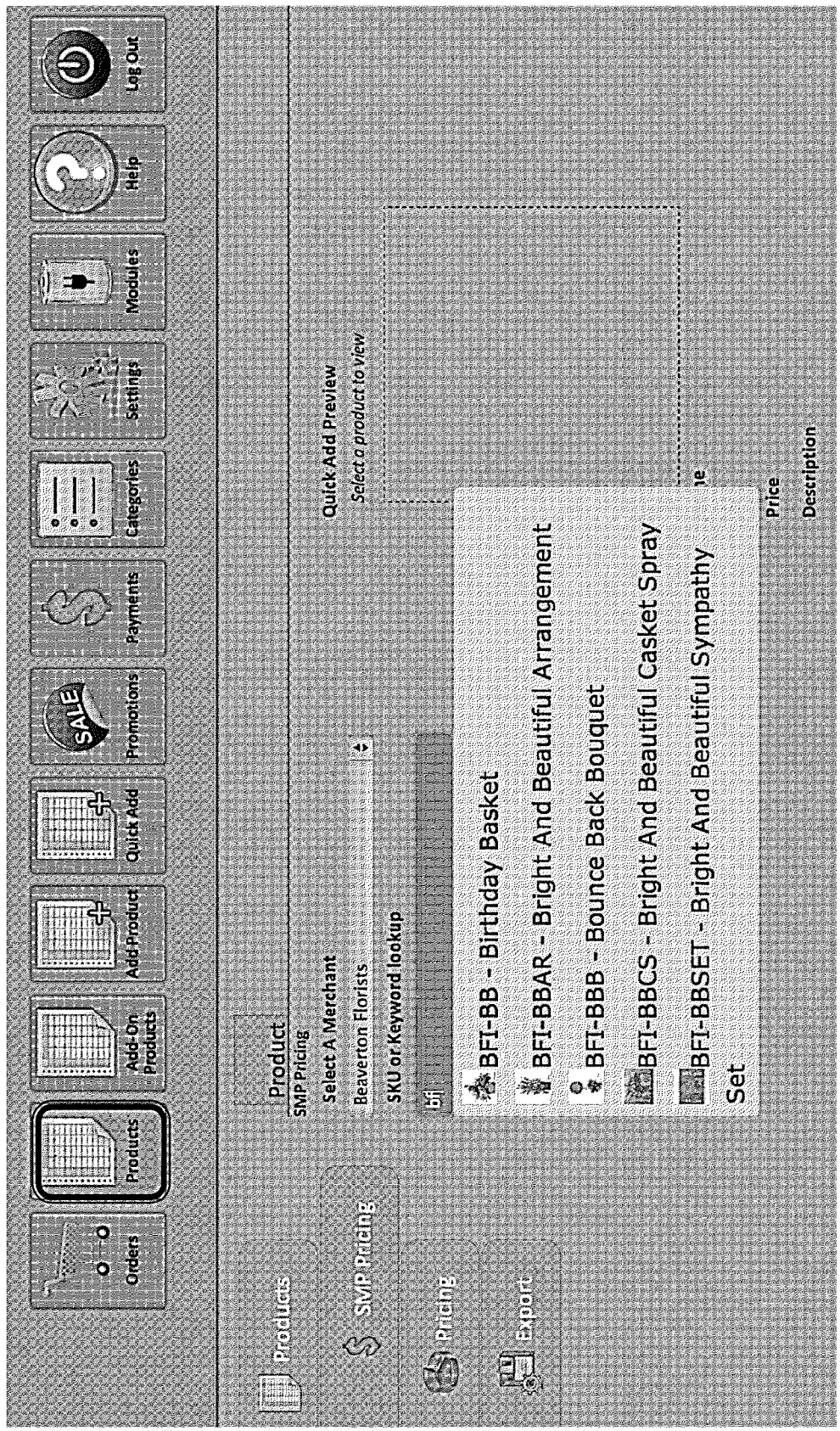
FIG. 40 shows the merchant updating more information about the product, here entering in a brief description from a drop down menu.

FIG. 40 shows the merchant updating more information about the product, here entering in a brief description from a drop down menu.

Figure 41:
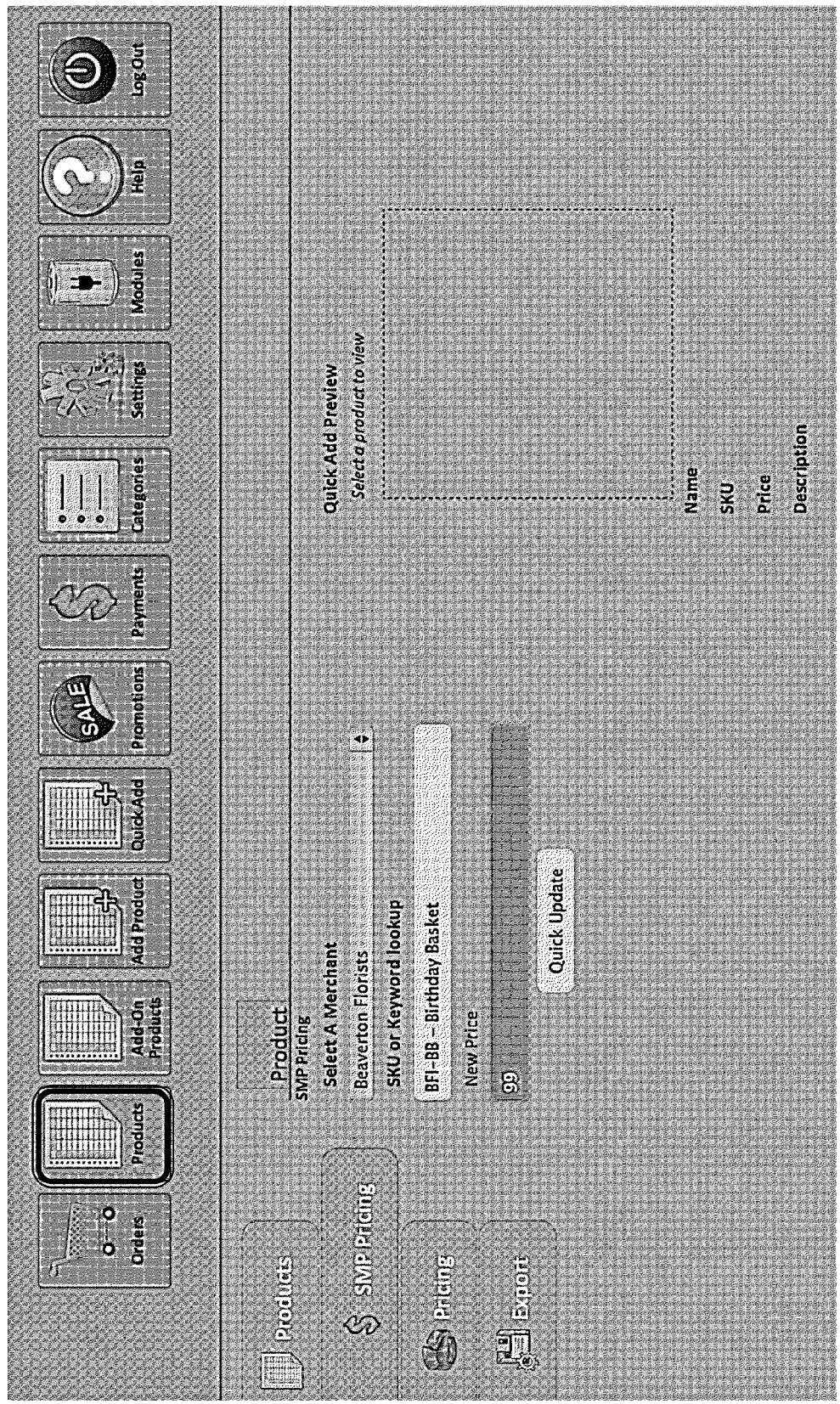
FIG. 41 shows the merchant now updating the price for the new product.

FIG. 41 shows the merchant now updating the price for the new product.

Figure 42:
FIG. 42 shows how the merchant may additionally cooperate with other local merchants and artisans to cross promote their products. Thus a buyer browsing a florist's site might also see advertisements from a local bakery for a cake, and decide to also send a gift chocolate cake to the recipient along with the flowers.

In addition to allowing groups of like but geographically distant merchants form networks, the system also allows different but complementary and geographically close merchants to form useful ecommerce networks as well. A good example is shown in FIG. 42, which shows a merchant website showing cross promotions from other local but complementary merchants. In the FIG. 42 example, the merchant, who is a florist, is showing complementary services from local ribbons, balloons stuffed bear, and bakery merchants. None of these other local merchants compete with the florist, but all sell mutually complementary products which are often sold together. The invention allows such related merchants to also form useful networks as well.

FIG. 42 shows how the merchant may additionally work with other local merchants and artisans to cross promote their products. Thus a buyer browsing a florist's site might also see advertisements from a local bakery for a cake, and decide to also send a gift chocolate cake to the recipient along with the flowers.

In some embodiments, entire networks of such artisans can use the inventions to form their own associations and market through a virtual merchant. Here the virtual merchant can be, for example, an art or wine festival that has registered on the invention's website as a merchant. This can allow, for example, for aggregations of local artists (e.g. painters and sculptors and the like to group together, with local merchants as desired, and easily promote ongoing virtual "art fairs" and the like.

No purchaser effort promotional code system: The invention is further based on the insight that prior art mechanisms of providing promotional codes for purchases are too cumbersome. According to prior art, if a company such as Intel received a group promotional code for a discount off of purchases, the employees of the company would have to obtain the promotional code and enter it in to receive discounts. However according to the invention's improved methods, the invention's ecommerce web server can optionally link promotions with the URL or email address from which the product purchase had originated. The system can then use the product purchase URL or email address to automatically assign promotional discounts, thus reducing purchaser effort. These promotional discounts may either be discounts on product price, discounts on shipping costs, or both. These promotional discounts may also be limited by various constraints, such expiring after a preset number of products, and the like.

Figure 43:
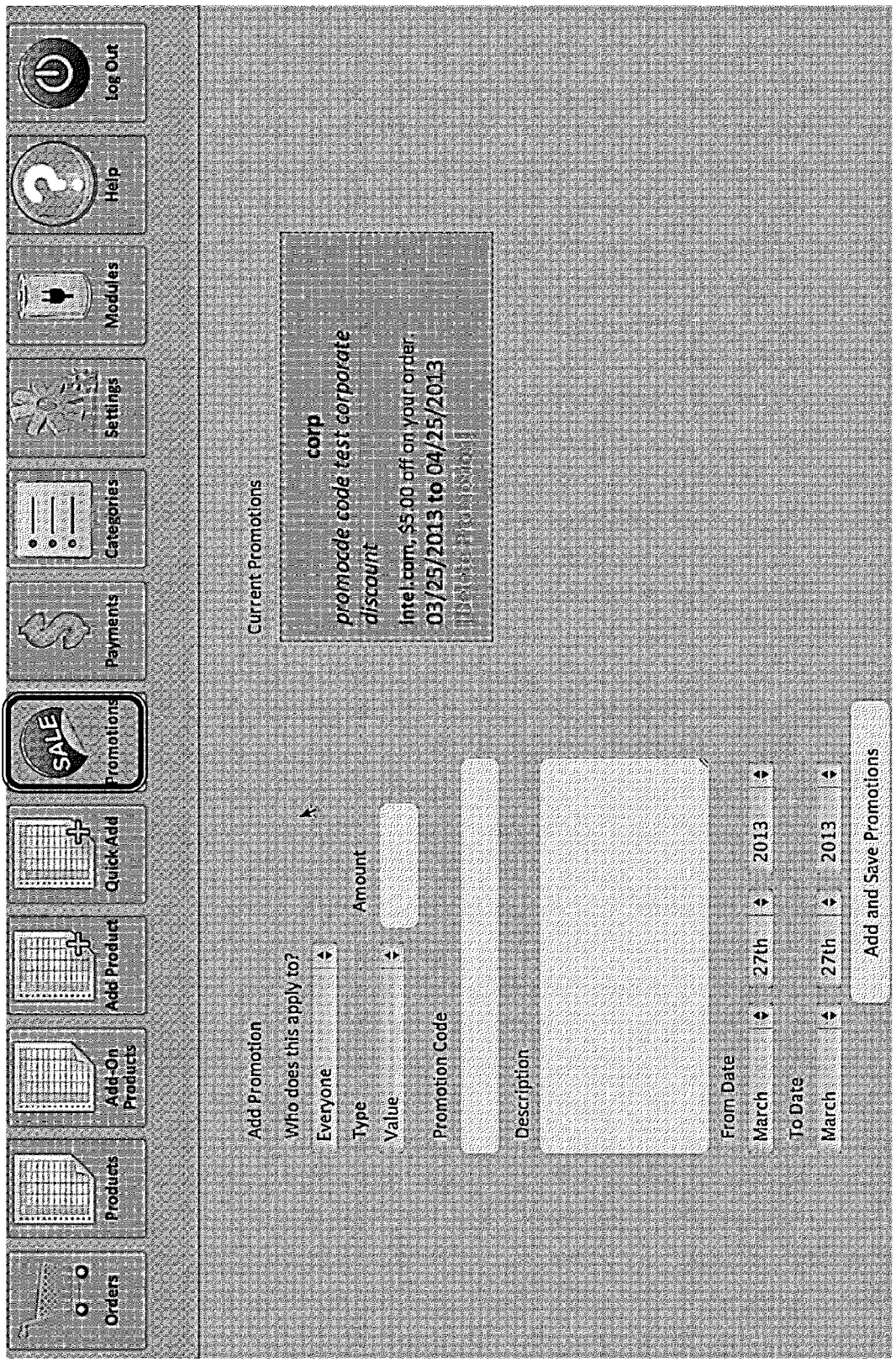
FIG. 43 shows the system's promotions interface in more detail. Here there is one promotion presently running, and the merchant is in the process of adding another promotion.

FIG. 43 shows the system's promotion interface in more detail. Here there is one promotion presently running, and the merchant is in the process of adding another promotion.

Figure 44:
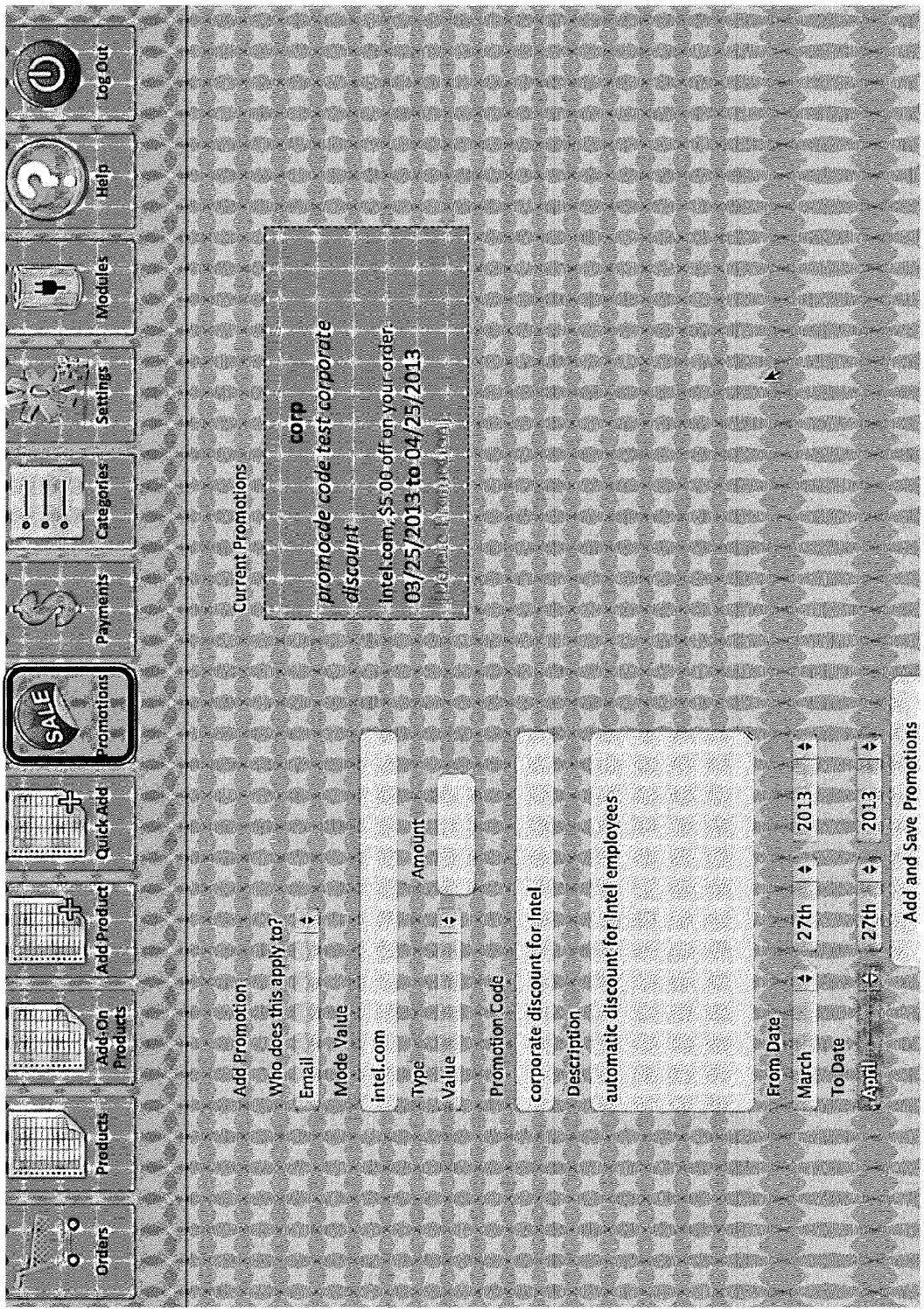
FIG. 44 shows the merchant adding additional information about the next promotion to the system's promotion interface. Here Intel is being given a corporation discount.

FIG. 44 shows the merchant adding additional information about the next promotion to the system's promotion interface.

Figure 45:
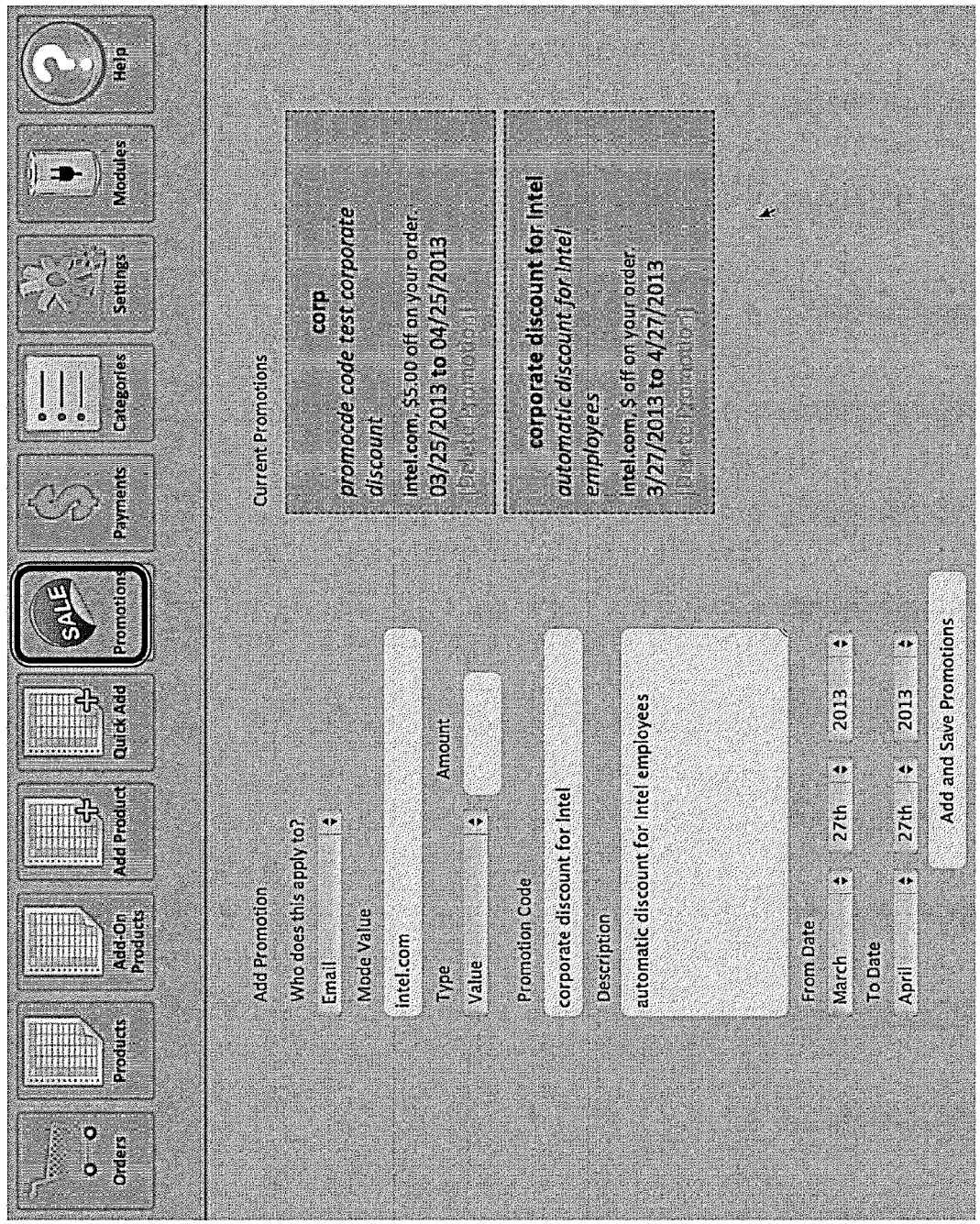
FIG. 45 shows that the merchant has now added another promotion to the interface. Here the promotion is for the company Intel, and the system automatically gives the promotion to all employees who access the system from the Intel domain, or provide an Intel.com email address.

FIG. 45 shows that the merchant has now added another promotion to the interface. Here the promotion is for the company Intel, and the system automatically gives the promotion to all employees who access the system from the Intel domain, or provide an intel.com email address.

Recipient delivery and gift customization: The invention is also based, in part, on the insight that although many such local merchant ecommerce based purchases will be for gifts for others, often such gifts need not be surprise gifts. When such gifts are not surprise gifts, it can often be further desirable to give the gift recipient at least some advance notice of the gift, as well as at least some ability to modify the time that the gift arrives, and even potentially modify the nature of the gift. Thus for example, a recipient of flowers may be able to redirect the time or day of arrival to a more appropriate time or day of arrival, thus ensuring that the flowers arrive when the recipient is not on vacation. Alternatively a recipient of a gift for a first flavor or type of cake might modify the cake to a more preferred type or flavor. In another embodiment, the invention also provides for such an ability to notify the recipient electronically, and to allow at least partial modification of the gift by, for example, going to the local merchant's website and selecting various alternative delivery or gift type options.

Easy customer gift card customization: As previously discussed, the invention is further based on the insight that at least with regards to gifts; often the gift recipient values the thought (i.e. affection, good intentions) behind the gift as much or more than the gift itself. However present industry practice of only providing standardized gift card designs somewhat defeats this purpose.

The invention further provides an easy to use user interface that allows the purchaser of the gift to custom design the art behind the gift cards delivered with the gifts, thus further providing evidence of the purchasers thought behind the gift to the recipient, and further enhancing the mutual satisfaction of both the gift giver and recipient. See FIG. 46 for further discussion.

The merchant can additionally upsell this function for an extra fee (i.e. $5.00), and make more money this way as well. This adds value.

Additional Discussion and Features

As previously discussed, in some embodiments, the invention allows the customer to specify if the gift for the recipient is to be a surprise gift or not. In the case where the gift is not a surprise gift, the system allows the recipient to modify the gift or delivery schedule. Here the system can send the recipient gets an email link notifying the recipient of the gift, and allowing the recipient to modify the delivery arrangement (within the price range), and delivery date.

In other embodiments, the system can also enable multiple customers to pool their funds and enable group purchases. Here, the system allows an initiating customer to specify the initial order, and also invite other participants to contribute as well. As more contribute, the size or cost of the gift can increase—for example a more elaborate floral arrangement can be automatically ordered and scaled according to the total amount of contributions.

In another embodiment of the invention, various smartphone or tablet apps, which can be fully customized to integrate the previously discussed "Sell My Product" (SMP) functionality has also been developed. The flow and functionality of such smartphone apps are essentially identical to the previously discussed web applications above.

Sequencing and ordering of categories of products for display on the web and smartphone apps: The order in which various products are displayed in the web browser implemented version or smartphone implemented version of the invention can be done by various methods. In one preferred method, this sequencing can be done by implementing visual drag and drop functionality. Alternatively, the sequencing may be done by other methods such as inputting numeric sequence numbers, alphabetically, by price, by category, and the like.

In some embodiments of the system, the following features may be implemented, such as:

The e-commerce platform may be a cloud based platform with associated mobile Apps. Important features can include 1) a cloud-based website and product detail/image storage system with universal mobile device integration; 2) a photograbber that auto-loads images with associated information to your website and mobile app anywhere, anytime; 3) an order transmission module that allows member merchants to sell another merchant's products at that merchant's prices and delivery fees; 4) a greeting cards module customizable with consumer's image, message, signature, etc.; 5) an automated funds transfer module for credit card payments and commission settlement; 6) an administrative panel accessible anywhere, anytime, using any web-connected device;

The system can additionally provide other features and functions including a cloud-hosted system with intrinsic security, PCI credit card compliance, and redundant data storage; and an ability to capture and upload new images, or use existing images with the options for sharing with other members.

In some embodiments, the entire platform may be based on a core central database that drives all channels of commerce. The invention can include various main modules such as:

1. Network Module—Merchants who populate the central database with products. This can include an administration panel that merchants can use to manage the look and feel of web sites. Alternatively or additionally, the administration panel and various mobile Apps can manage all aspects of product placement and pricing.

2. The system can also include WebService REST API with Location based technology. This type of API is used by websites, mobile Apps and Point of Sale software systems. This can be optionally used in conjunction with merchant oriented mobiles apps such as an image upload/product upload app that will be discussed shortly, and Point of Sale apps for the merchant's in-store use, the system can also make use of other consumer facing mobile apps such as gift apps. Data obtained with this location based API can also be very useful to store, along with product purchase data, for subsequent various sales tracking and market research activities.

The system can also include other modules such as a Sell My Products module, Custom Greeting Cards module, Order transfer module and the like.

As previously discussed, an additional feature of the invention is its Merchant Network. Additionally, in some embodiments, merchants may register for accounts at an administration site. The administration site may provide a control panel or dashboard that allows complete configuration and management of the website and smart phone Apps.

In general, as previously discussed, the system's administration panel can be used to manage the merchant's products, promotion and coupons. Any changes or edits made at the panel will be reflected on the website. For example, the merchant can also add/remove products, and rename categories for special seasonal events. The merchant can thus manage many aspects of the business from setting delivery zones to managing same day delivery.

As previously discussed, the system settings function to allow the merchant to upload the merchant's logo, set delivery zones, prices and payment information. Other functions include setting the merchant's Point of Sale (POS) software options. Merchant orders can be delivered by email/fax or directly to a POS partner. The merchant can also select various preferred merchant partners to facilitate affiliate sales through the system's "Sell My Products" module and also transfer orders received to other merchants who are members/registered on the network Other functions include options to setup merchant delivery coverage areas, zip codes, geographic regions and the like. The system allows merchants to manage web site banners, promo codes, delivery schedules and pricing. Many of these settings and configurations can be further based on the merchant's business calendar and schedule.

Additionally, as previously discussed, the system allows the merchant to set up a network of preferred partner merchants. Once these are set up, the merchant and system may then transfer orders automatically using the system's "Sell My Products" module. The system also allows all orders received through multiple channels to be tracked, including order's received using the system's Smart Phone App and the Web (site) App.

As previously discussed, the invention further allows the merchant to review products, make edits as needed at any time and the changes will be reflected on all channels. The system also allows the merchant to export the merchant's product database, and set dynamic pricing based on a calendar schedule.

In some embodiments, additional functions may further include an ability to sell Add-on Products, as well as to view, and make changes to various add-on/accessory products. Additionally, additional functions such as Quick Add, which allows the merchant to search and add products to other product categories, as well as to convert products from other member merchants to use on the merchant's own website/app. Other functions may include:

Add Product: Add a new product, set prices, upgrade options and upload a product image. Filter products for the mobile apps.

Sale/promotions: Create multiple promo codes. Automatic discounts/promo codes tied to a company's domain name Categories: View and rename categories based on a calendar schedule. Categories can be turned off based on a schedule.

In some embodiments, the invention may further make use of location based technology. This can take into account the buyer's location, the recipient's location and the merchant's location, and factor these into account in computing delivery charges. This data can also be stored, along with the product sales data, for subsequent sales tracking and market research purposes.

In one embodiment of such location based technology, a buyer may access the website using a web browser. The system may use the buyer's IP address to compute a corresponding geographical address, (Geographical IP, GeoIP). This can then be translated to latitude & longitude coordinates, and mapped to a zip code and street address. Once the street address is known, the software can determine all merchants within a given mile radius, thus allowing the buyer to select a merchant of interest. Alternatively a buyer may access an app using a smart phone. In this case, with permission, the system can use the smartphone's GPS coordinates to determine the buyer's location:

WebService API—In some embodiments, the system may use a comprehensive set of web service calls to support its various location based commerce schemes. These can also be used to communicate order information with payment gateways and point of sale software systems.

As previously discussed, in some embodiments of the "Sell My Products" functionality—the seller may not have its own website. Instead, any merchant or service provider can upload their products or services for sale by other member merchant. The system allows the merchant to upload these products or services; set pricing and set other items such as preferred commission splits.

This module may also be used to build a primary merchant's local marketplace where local merchants can be aggregated. Example can include, flowers, cakes, party supplies etc.

Custom Gift Cards—As previously discussed, in some embodiments, buyers can access a library of images or upload personal images and doodle directly on the image to create a custom gift card. The gift card can be printed in the recipient's location by the delivering merchant (which may be a remote merchant) prior to delivery of the product.

FIG. 46 shows more details of this custom gift card process. Here a database, such as the centralized database (106), can contain data for various gift card template images, graphic images, and text fonts. Indeed, to minimize royalties as well as to encourage merchant artistic expression, the system may also provide an interface, such as a web browser based administrator webpage, to allow the merchant or other administrator to upload additional gift card template images or graphic images as well. The ecommerce customer may also upload images.

In some embodiments, the gift card interface will appear only after the ecommerce customer has made a product selection, but before the final purchase is done (see FIG. 2C-272). If the customer elects the gift card option (which will often cost extra), the system outputs a gift card generation interface to the ecommerce computerized device (often to a web browser) (274).

Returning to FIG. 46, the gift card generation interface appearing on the ecommerce customer's computerized device is shown as (108a). As can be seen, this gift card generation interface is configured to allow the customer to select various gift card template images or graphic images, enter text to be rendered using various text fonts, as well as sketch drawings or handwriting on the card using a mouse touch sensitive interface, or the like. The output from this creation process can be an electronic gift card file which can be transmitted back to either server (102-M1a) and/or centralized server (100). Thus once the customer purchases the product, this electronic gift card file can be transmitted to a printer (134) associated with the product's shipping location (here this is Merchant 2's printer). This printer (134) can them print out the actual hard copy gift card (136). The system can also instruct Merchant 2, for example, to then bundle this card (136) with the product (130b) and deliver both to the recipient (132b) at the same time and location. Thus for example, the recipient can get a nice bouquet of flowers with an attached customized greeting card. Unlike the flowers which will quickly fade, the card can last forever, and will be more highly valued because it is customized.

Although various types of software may be used to create the customized greeting card, as previously discussed, in some embodiments the methods of commonly owned copending U.S. patent application Ser. No. 13/441,781, the entire contents of which are incorporated herein by reference, may be used.

In this embodiment, gift card generation interface can be configured to load previously stored gift card template images on a remote server (e.g. 100, 102-M1a) thus creating an image layer, and to then transmit an HTML copy of this image layer to the customer's web browser or app. There they can view this image layer, and use their web browser or app to both annotate the images, as well as to transmit an HTML copy of these annotations to the remote server.

The remote server can then use these annotations to create at least one annotation layer, and combining this with the image layer, create an annotated gift card document image. This annotated gift card document image can then be transmitted back to the customer, where they can accept (or modify) this annotated gift card document image. Once accepted, this image can then be transmitted to the printer (134) in the form of an electronic gift card file.

Alternatively, in some embodiments, either instead of or in addition to printing out a physical hard copy of the gift card (136), the system can also send an electronic version of the gift card to the recipient (132b) or other individuals, for example in the form of email.

Order transfer module—Merchants can view orders received and selective transfer them by email, fax or electronically to another merchant globally as long as the other merchant are a member. The transfer protocol can also support a time based threshold to facilitate acceptance or rejection.

Cloning automatically customized websites, and search engine optimization

In the modern world, where customers do large amounts searching for products using search engines such as Google, Bing, and the like, local merchants often find themselves in an intense if hidden value for online presence and good search engine ranking. To facilitate this, merchants often acquire multiple website domains (e.g. flowerstuff.com, flowerstuff.net, flowerstuff.org, myflowerstuff.com, localflowerstuff.com etc.), and then have these domains forwarded to the merchant's main ecommerce website. Search engines, however, are aware of this trick, and are designed to ignore such domain forwarding.

Figure 47:
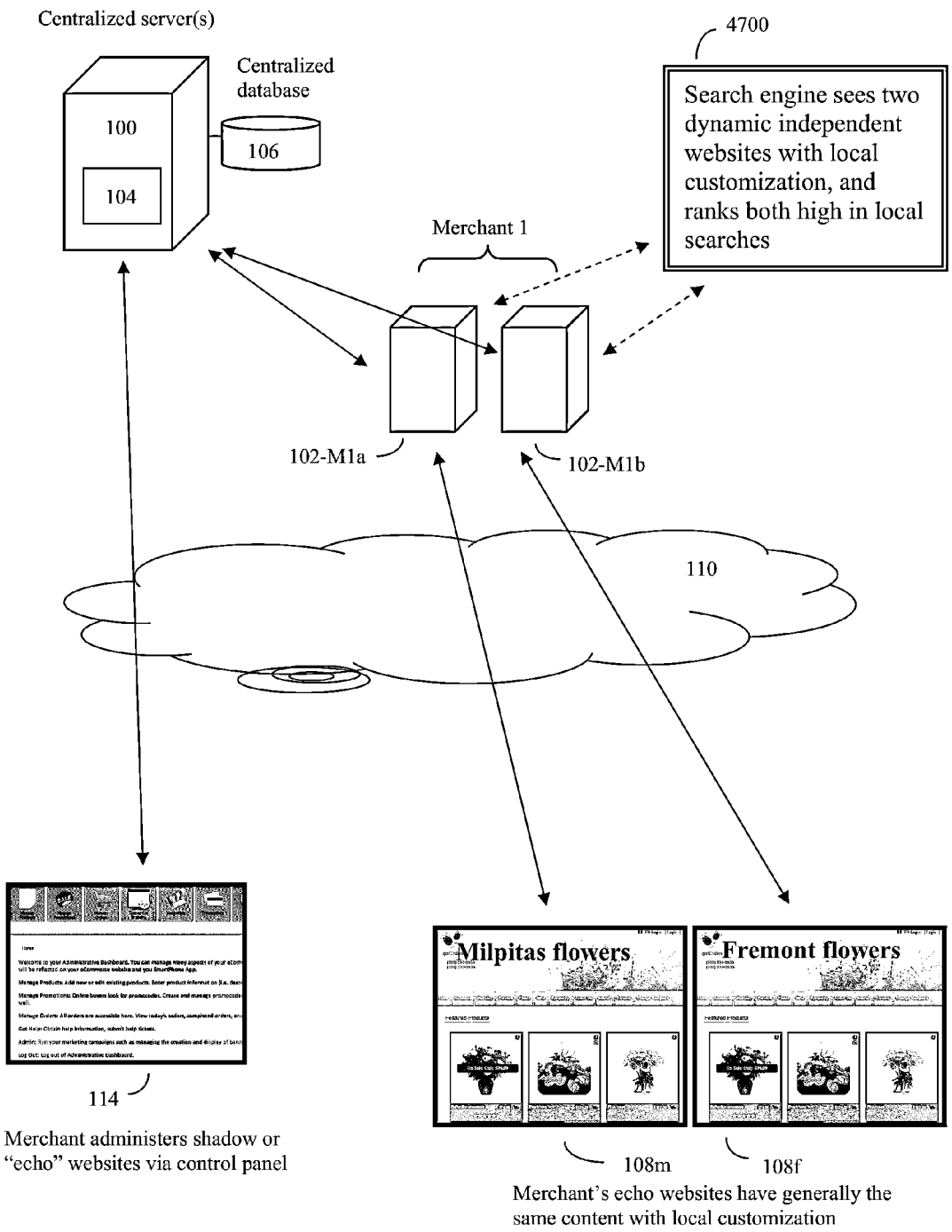
FIG. 47 shows an example of how the system can clone multiple related ecommerce websites, each automatically customized for a particular target audience. This feature helps drive sales to various specialized groups, and also is useful for search engine optimization purposes.

In some embodiments of the invention, the system may also be design to accommodate a plurality of commonly controlled (e.g. all owned by the same merchant, websites such as FIG. 1 websites/servers (102-M1a and 102-M1b). These "different" (but commonly controlled) ecommerce websites will generally have a plurality of commonly controlled URL, but generally at least some of these commonly controlled websites will be focused serving on different geographical regions or other different types of local groups. For example Merchant M1 may focus website (102-M1a) on serving a first town, and website 102-M1b on serving a neighboring town only a few miles away (also within his geographic service area). An example of this embodiment is shown in more detail in FIG. 47.

In this embodiment, the centralized database (106) can also store geographic region or other type customized data for at least some of these websites (e.g. commonly controlled ecommerce websites focused on different geographic regions). The geographic region customized data can be as simple data with location specific names and graphics (e.g. "Milpitas Flowers", "Fremont Flowers"). The system may also be configured so that this geographic region (or other type) customized data may be further managed from a web browser based administrator webpage, often the same administrator web page used to administer other system functions (114).

Thus, instead of just producing one website composed of various dynamic sections, the system may be configured to produce multiple websites (e.g. 102-M1a, 102-M1b) composed of the same various dynamic sections as before, but then additionally customized by the geographic region (or other type) customized data. Thus an ecommerce customer (108*m*) from the California city of Milpitas might contact website (102-M1*a*) (say Milpitasflowers.com) and, due to the geographic region customization data, receive a Milpitas customized website. By contrast, an ecommerce customer (108*f*) from the nearby city of Fremont might contact website (102-M1*b*) and, again due to the geographic region customization data, receive a Fremont customized website. However both websites would be controlled by the same merchant, and be served by the same merchant (M1). After the initial geographic customization was done, this would require almost no effort on the merchant's part replicate one dynamic website (with automated customization) to become multiple websites.

However the search engines (470), instead of seeing a redirected website, will in this example see two independent dynamic but region customized websites, and thus tend to rank both websites higher in the search engine results. This search engine optimization process may be further facilitated by exposing at least some of this geographic region (or other type) customized data to the search engines using schemas recognized by said search engines. Useful search engine schemas may include microdata tags, first introduced in HTML5. These may follow schema.org formats, or other formats as desired.

Note again that the geographic automatic localization is intended to be a specific example, and is not otherwise intended to be limiting. Websites could just as easily be customized to appeal to young or old customers left handed or right handed customers, customers who belong to various special interest groups, and the like. Any automatic customization scheme is contemplated.

Posting to Social Networks

In some embodiments, the system may also be configured to allow a merchant to automatically post updates (such as the introduction of new products) to various online social networks such as Facebook, twitter, Pinterest, and the like. In this embodiment, often the centralized database (106) will store links to various social networks of interest, as well as the merchant's login information to the various social networks of interest.

In this embodiment, depending on system settings, when the merchant uploads a change to the merchant's product data, either the centralized server (100) or individual merchant ecommerce servers (e.g. 102-M1*a*) can automatically transmit information pertaining to these product changes to the various selected social network websites. Additionally, these postings can also be calendar/schedule driven so that the merchant can plan and schedule a variety of different postings ahead of time.

The invention claimed is:

1. A method of managing at least one schedule driven dynamic layout ecommerce website for at least one merchant, said method comprising:

using at least one processor, centralized database, centralized database server, and automated website creation software to configure at least one schedule driven dynamic layout ecommerce website, said at least one ecommerce website comprising at least some web pages with dynamic sections, said at least one ecommerce website hosted by either said centralized database server or alternative ecommerce website servers;

wherein at least some one said dynamic sections are associated with corresponding product and product data, said product data comprising product description, product price, product shipping locations, schedule times of product availability at said product shipping locations and product inventory data at said product shipping locations;

said product data additionally linked to product delivery time and location constraints relative to at least one said product shipping location;

said product delivery time and location constraints comprising product delivery charge and surcharge information for certain delivery times and locations relative to said at least one product shipping location;

said product data and product delivery time and location constraints being stored in said centralized database, and wherein said product data and said product delivery time and location constraints are entered or updated using a network connected computerized device running either a web browser based administrator webpage or mobile app;

for each dynamic section associated with said corresponding product, using said at least one processor to examine said product data for schedule times of product availability and determine if said product is available and in inventory, and if, during said schedule times, said product is available and in inventory, then configuring said at least one ecommerce website to display at least some data from said dynamic sections associated with said corresponding ecommerce product on at least one web page of said at least one ecommerce website, and otherwise not displaying data from said dynamic sections associated with said corresponding ecommerce product;

wherein in response to a product purchase request comprising a product identifier and a requested delivery location and delivery time from an ecommerce customer interacting with said at least one ecommerce website using an ecommerce computerized device running an ecommerce customer web browser or app, using said at least one processor to determine said at least one product shipping location, examine said product delivery time and location constraints relative to said at least one product shipping location, and use said requested delivery location and delivery time relative to said at least one product shipping location to compute product delivery charges and surcharges for said product, and display at least a sum of said product delivery charges or surcharges for said product on said at least one ecommerce website;

wherein when said ecommerce customer purchases said product using said ecommerce website, using said at least one processor to record the sale of said product, said product shipping location, changes in product inventory data at said product shipping location, requested product delivery time and requested delivery location in said centralized database; and using said at least one processor to transmit notification of the sale of said product to said ecommerce customer, as well as to at least one computerized device associated with distribution of product from said product shipping location.

2. The method of claim 1, wherein said schedule times of product availability vary according to calendar event dates comprising repeating holidays and time predictable events;

wherein said centralized database further comprises at least one of event specific notices; or said product data further comprises event specific product data;

further, during said schedule times of product availability, using said at least one processor to configure said ecommerce website to display said event specific notices or event specific product data when said schedule times of product availability correspond to calendar event dates.

3. The method of claim 1, further using said at least one processor to configure said ecommerce website to provide a gift card generation interface to create electronic gift card data files associated with a product selected by said ecommerce customer;
   wherein said centralized database further comprises a plurality of gift card template images, graphic images, and text fonts;
   further providing, on said web browser based administrator webpage, an interface to allow said administrator to upload additional gift card template images or graphic images to said centralized database;
   wherein said ecommerce customer interacts with said ecommerce website and makes at least one product purchase using said ecommerce customer web browser or app;
   further using said at least one processor to provide, after said at least one product purchase request, a gift card generation interface on said ecommerce customer web browser or app;
   said gift card generation interface configured to allow said ecommerce customer to select said gift card template images or graphic images, or enter text to be rendered using said text fonts, thereby enabling said ecommerce customer to generate an electronic gift card file;
   using said at least one processor to receive said electronic gift card file;
   where upon purchase of said at least one product selected by said ecommerce customer, using said at least one processor to transmit said electronic gift card file to a printer associated with said product shipping location, and printing out a gift card corresponding to said electronic gift card file; and
   further using said at least one processor to provide instructions to bundle said gift card with said product for subsequent delivery at said requested delivery location.

4. The method of claim 3, wherein said gift card generation interface is configured to direct said at least one processor to load previously stored gift card template images on either said centralized server or said ecommerce website web server, creating an image layer, and transmitting an HTML copy of said image layer to said ecommerce customer web browser or app;
   viewing said image layer within said ecommerce customer web browser or app;
   using said ecommerce customer web browser or app to annotate said images, transmitting an HTML copy of said annotations to either said centralized server or said ecommerce website web server;
   using said annotations at either said centralized server or said ecommerce website web server to create at least one annotation layer, and combining said at least one annotation layer with said image layer producing an annotated gift card document image;
   transmitting an HTML copy of said annotated gift card document image to said ecommerce customer web browser or app; and
   using said ecommerce customer web browser or app to accept said annotated gift card document image;
   and using said at least one processor to transmit said annotated gift card document image in the form of said electronic gift card file to a printer associated with said product shipping location.

5. The method of claim 1, further using said at least one processor and said centralized database to provide a web based point-of-sale interface;
   wherein said product data further comprises product sales recommendation information associated with at least some of said products;
   said point-of-sale interface configured to enable said at least one merchant's authorized ecommerce clerk to use an internet connected computerized device to retrieve said product data, along with said product sales recommendations associated with at least some of said products, and use said product sales recommendation information to manually provide information to said ecommerce customer;
   said point-of-sale interface further configured to enable said authorized ecommerce clerk to use said at least one processor to determine said at least one product shipping location, examine said product delivery time and location constraints relative to said at least one product shipping location, and use said requested delivery location and delivery time relative to said at least one product shipping location to compute product delivery surcharges for said product;
   said point-of-sale interface further configured to enable said authorized ecommerce clerk to purchase said product for said ecommerce customer;
   wherein when said authorized ecommerce clerk purchases said product for said ecommerce customer using said point-of-sale interface, further using said at least one processor to record said product sale, said product shipping location, changes in product inventory data at said at least one product shipping location, product delivery time and location in said centralized database; and
   using said at least one processor to transmit notification of said product sale to said ecommerce customer and at least one computerized device associated with said product shipping location.

6. The method of claim 1, wherein said least one ecommerce website comprises a plurality of commonly controlled ecommerce websites with a plurality of commonly controlled URL, at least some of said commonly controlled ecommerce websites focused on different geographical regions;
   wherein said centralized database further comprises geographic region customized data for at least some of said commonly controlled ecommerce websites focused on different geographic regions;
   wherein said geographic region customized data may be further managed from said web browser based administrator webpage;
   wherein, when for each dynamic section associated with a corresponding ecommerce product, using said at least one processor to examine said product data and determine if said product is available and in inventory, and if said product is available and in inventory, then also configuring said at least some of said commonly controlled ecommerce websites to also display said dynamic sections associated with said corresponding ecommerce product, along with said geographic region customized data on at least some of the web pages of said at least one dynamic layout ecommerce website.

7. The method of claim 6, further making at least some of said geographic region customized data available to search engines by exposing at least some of said geographic region customized data to said search engines using schemas recognized by said search engines.

8. The method of claim 6, wherein said schemas comprise HTML5 or greater microdata tags.

9. The method of claim 1, wherein said centralized database further comprises links and merchant login information to at least one merchant's social network website;
wherein, when said at least one merchant changes said product data, using said at least one processor and said links and merchant login information to said at least one merchant's social network website to automatically transmit information pertaining to said changes to said at least one merchant's social network website.

10. The method of claim 1, wherein said at least one merchant comprises a plurality of cooperating merchants, each carrying at least some common products or commonly configurable products;
further using said at least one processor to transmit product purchase requests received from a first ecommerce website under first merchant control by a first merchant to a second ecommerce website under second merchant control by a second merchant;
wherein said second ecommerce website serves a geographic area closer to said requested delivery location than the geographic area served by said first ecommerce website;
wherein each said merchant has uploaded product data and product delivery time and location constraints for their respective locations to said centralized database;
further using said centralized database to use said product data and said product time and delivery constraints uploaded by said second merchant to examine said product delivery time and location constraints relative to said at least one product shipping location relative to said second merchant, and use said requested delivery location and delivery time relative to said at least one product shipping location relative to said second merchant to compute product delivery surcharges for said product, and display said product delivery surcharges for said product on said at least one ecommerce website under first merchant control by said first merchant.

11. The method of claim 1, wherein said product data further comprises time varying product price modifiers, said time varying product price modifiers configured to vary according to a merchant determined predetermined schedule, and entered into said centralized database through said web browser based administrator web page.

12. The method of claim 1, wherein said product data further comprises product promotional price data or product delivery promotional data, and promotional trigger data;
wherein when said ecommerce website receives promotional trigger data from said ecommerce customer, said at least one processor uses either said product promotional price data or said product promotional delivery data to modify either said product price or said product delivery charges or surcharges for said product.

13. The method of claim 1, further storing a history of product purchases in said centralized database;
further using said at least one processor to analyze and report said history of product purchases according to merchant selected analysis criteria.

14. The method of claim 1, wherein said product data is entered using a mobile app configured to run on a smartphone or network connected tablet computer equipped with a user interface and at least one video camera;
said mobile app configured to use said at least one video camera to obtain at least one of either images or video of a product;
said mobile app further configured to use said user interface to obtain at least some other product data, and upload at least one of either images or video of said product to said centralized database.

15. The method of claim 1, wherein said centralized database and at least one processor are configured in an administration server, and said administration server is configured to use said at least one processor to use said centralized database to modify ecommerce software running on a plurality of different websites, and to transmit product purchase data between said plurality of different websites.

16. The method of claim 15, wherein said administration server serves said web browser based administrator webpage.

17. The method of claim 1, wherein said method further comprises an computerized ecommerce method for allowing an ecommerce customer to order gifts from at least one merchant and deliver said gifts to at least one recipient;
said merchant having a merchant geographic location, and said at least one recipient having at least one recipient geographic location;
said method further comprising:
at least one web server running ecommerce software;
calendar based automatic ecommerce website updates;
a delivery cost estimation algorithm based on date, time of day, and said merchant geographic location, and said at least one recipient geographic location;
wherein said merchant may configure said ecommerce software by uploading photos or video and/or a description of said product using a smartphone running an ecommerce uploading app;
wherein said merchant may further configure said ecommerce software to form network connections with other merchants, transfer orders for gifts to said other merchants, and receive orders for gifts from said other merchants.

18. The method of claim 1, wherein said merchants are florists, and wherein said products are floral arrangements.

19. The method of claim 1, wherein said centralized database further comprises at least one event specific notice;
each event specific notice comprising graphics, video, or text to be displayed on one or more web pages produced by said ecommerce website, along with an event specific notice schedule giving at least the day or days on which said event specific notice is to be displayed on said one or more web pages automatically produced by said ecommerce website;
further using said at least one processor to configure said ecommerce website to automatically display said at least one event specific notice on one or more web pages produced by said ecommerce website according to said event specific notice schedule.

20. The method of claim 19, wherein said event specific notice schedule either corresponds to schedule times of product availability for at least one product, or wherein said event specific notice schedule is independent of said schedule times of product availability for said at least one product.

* * * * *